United States Patent
Solondz

(10) Patent No.: US 9,577,773 B2
(45) Date of Patent: Feb. 21, 2017

(54) STATION ASSISTED INTERFERENCE MEASUREMENT

(71) Applicant: Verizon Patent and Licensing Inc., Basking Ridge, NJ (US)

(72) Inventor: Max A. Solondz, New Vernon, NJ (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 295 days.

(21) Appl. No.: 14/271,100

(22) Filed: May 6, 2014

(65) Prior Publication Data

US 2015/0326463 A1 Nov. 12, 2015

(51) Int. Cl.
*H04B 17/345* (2015.01)
*H04L 12/26* (2006.01)
*H04W 72/08* (2009.01)

(52) U.S. Cl.
CPC ....... *H04B 17/345* (2015.01); *H04L 43/0829* (2013.01); *H04L 43/12* (2013.01); *H04L 43/50* (2013.01); *H04W 72/082* (2013.01)

(58) Field of Classification Search
CPC ....... H04B 1/04; H04B 1/1027; H04W 24/10; H04W 24/88
See application file for complete search history.

(56) References Cited

U.S. PATENT DOCUMENTS

| 2007/0275717 | A1 | 11/2007 | Edge et al. | |
| 2009/0135972 | A1* | 5/2009 | Tanaka | H04B 1/1027 375/346 |
| 2014/0355468 | A1* | 12/2014 | Li | H04W 24/10 370/252 |
| 2015/0341814 | A1* | 11/2015 | Yu | H04W 24/10 370/252 |

OTHER PUBLICATIONS

IEEE 802.11y-2008. Wikipedia [online] [retrieved on Apr. 8, 2014]. Retrieved from the Internet: <URL: http://en.wikipedia.org/wiki/IEEE_802. 11y-2008.

* cited by examiner

*Primary Examiner* — Andrew Lai
*Assistant Examiner* — Leon Andrews

(57) ABSTRACT

A station assisted interference measurement scheme is described containing a system and devices that facilitate the measurement of interference levels or path loss values between nearby potentially interfering transmitting transceivers and candidate victim receivers. Such interference levels or path loss values are used to assist intelligent assignment of communication channels in an authorized shared access system (ASAS). Using control signals from a controller of the ASAS, suspected interfering devices transmit specialized signals on specific channels at specific times that may have a waveform and/or bit format different from typically used data communication signals. A candidate victim receiver may receive one or more of the specialized signals and measure a signal parameter of the received specialized signal. The controller of the authorized shared access system uses the measured signal parameters to determine interference between devices and improve the assignment of communication channels to mitigate interference.

20 Claims, 19 Drawing Sheets

100

300

400

500

500C

TDD Case 2: TDD Downlink Interference from System 'B' to System 'A'

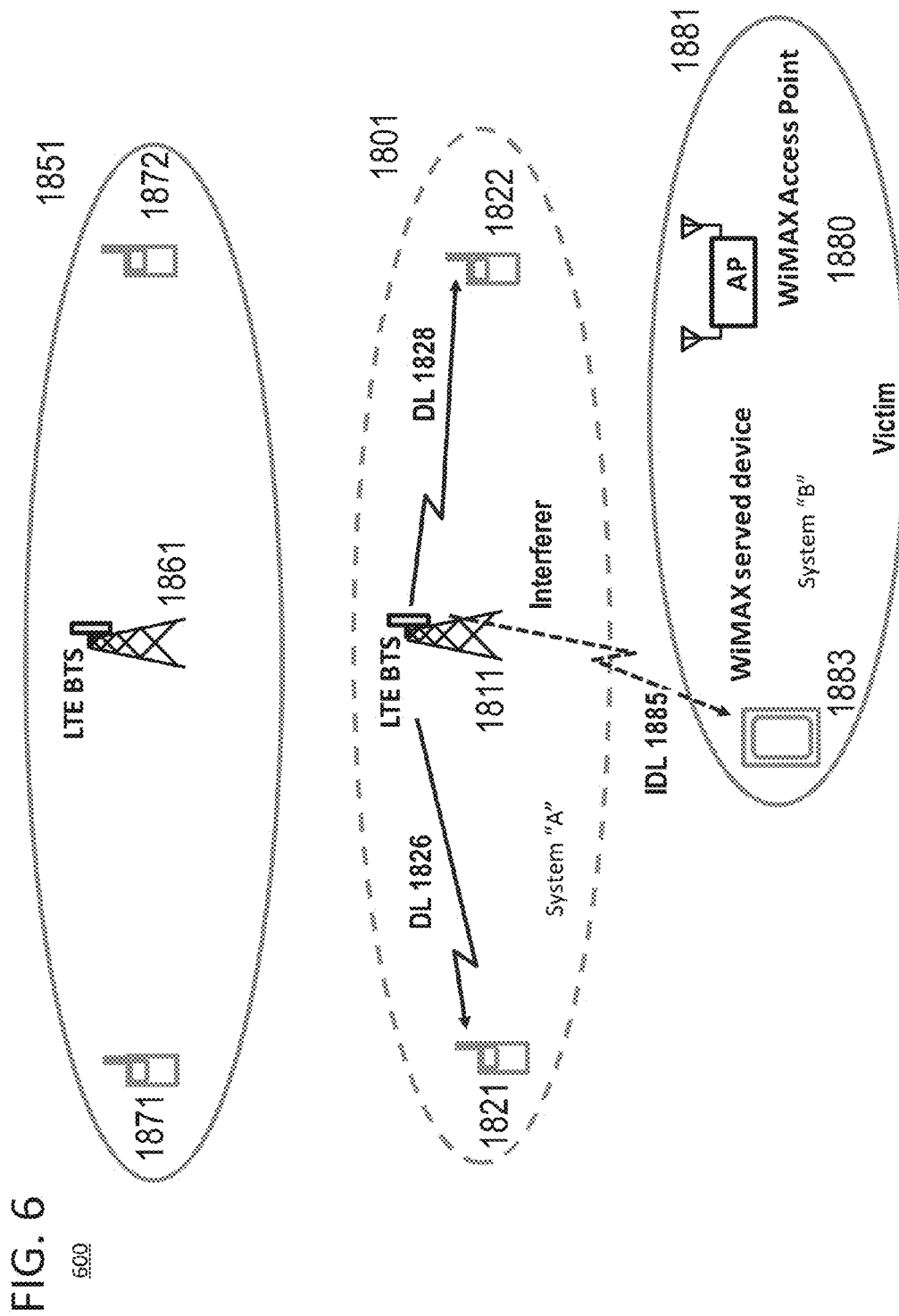
FDD Case 1: System 'A' DownLink interference into nearby System 'B'

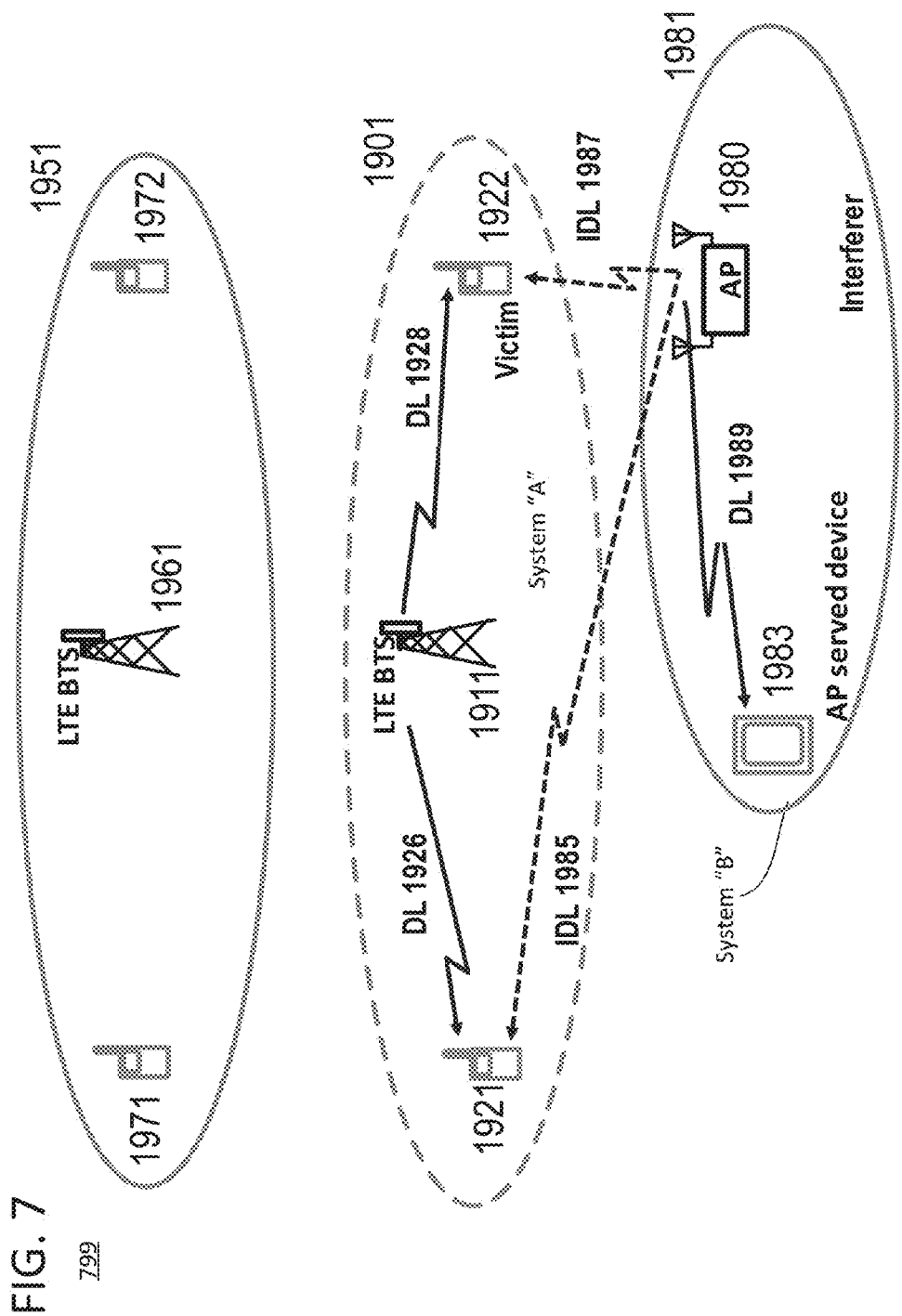

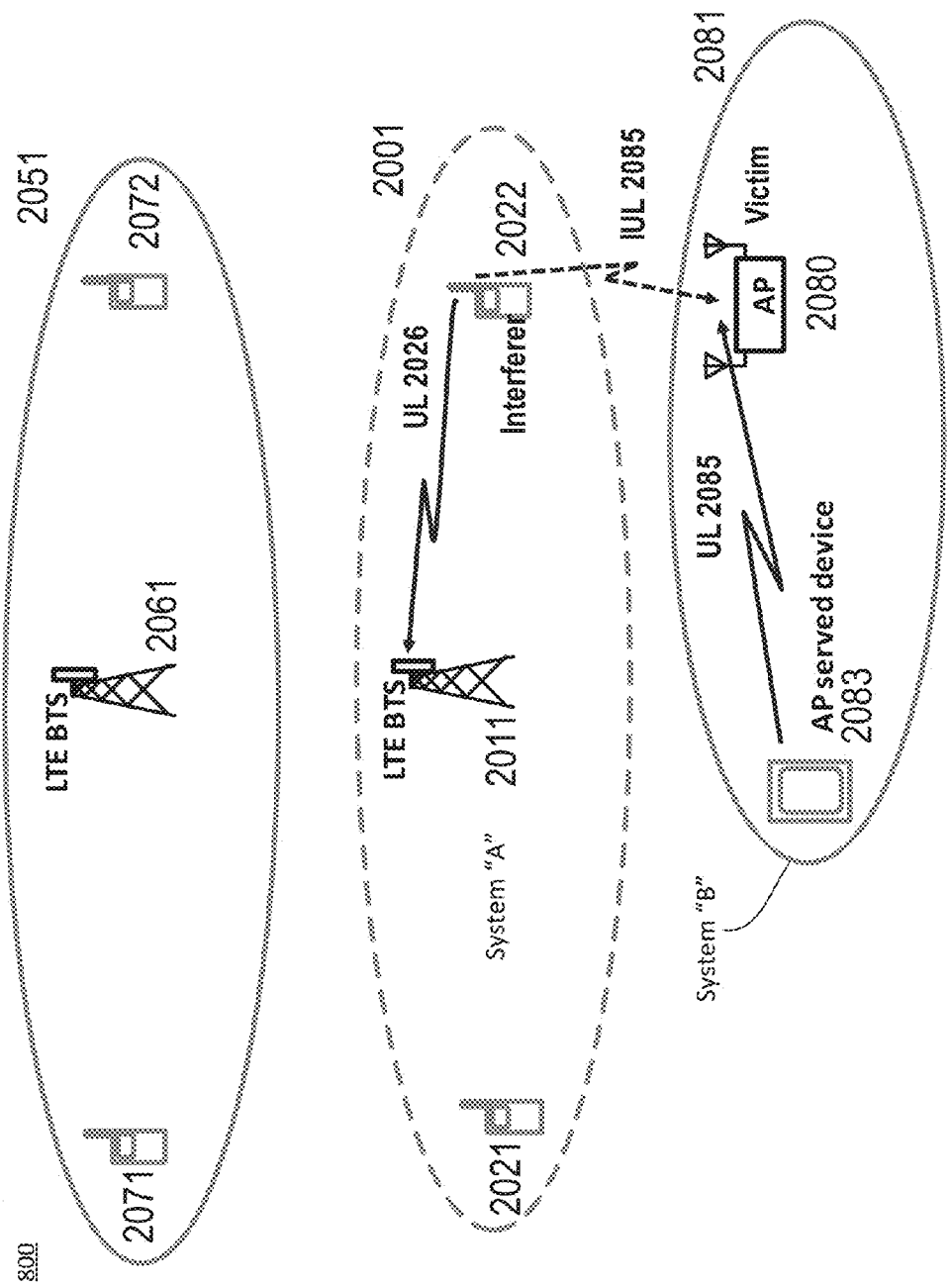

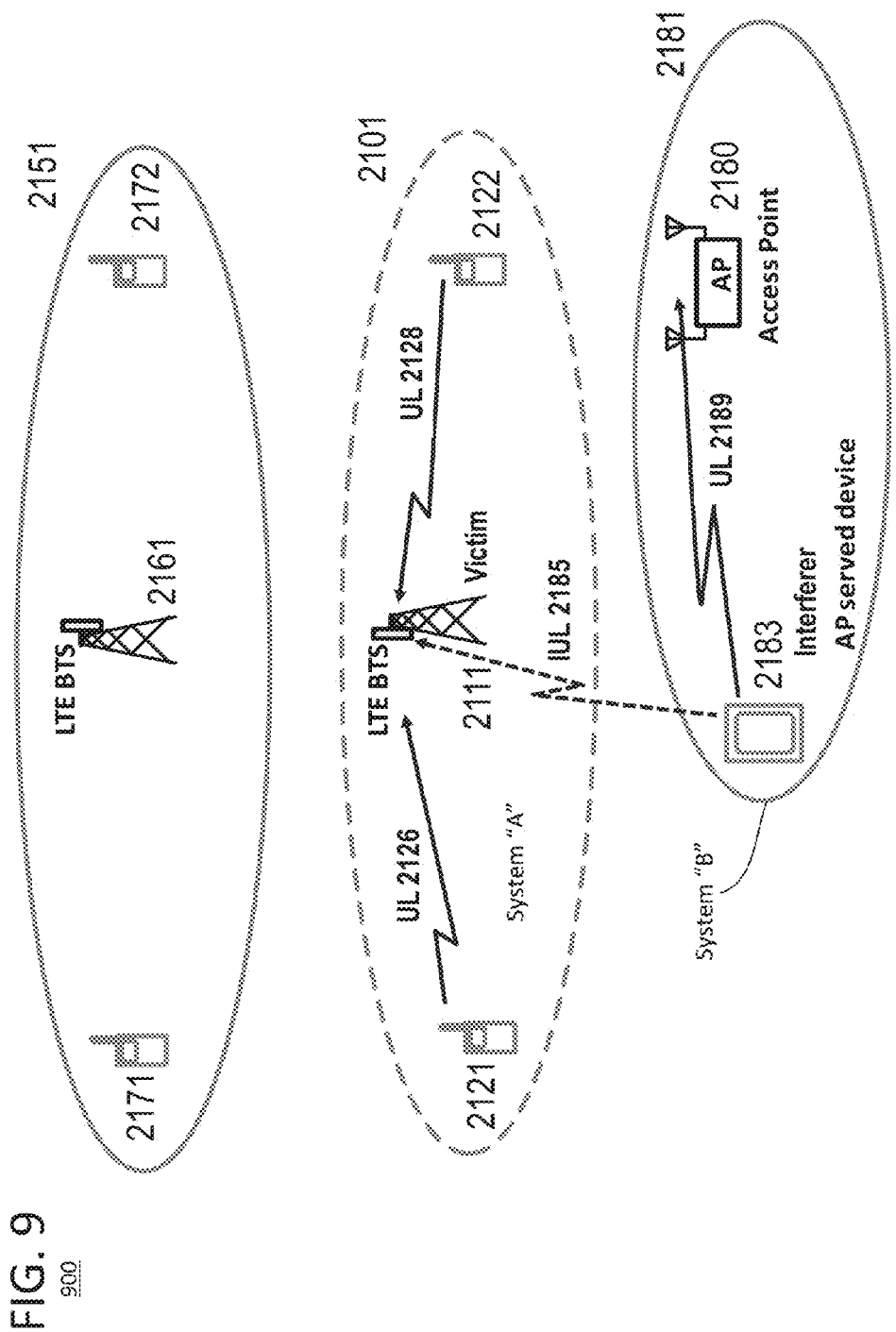

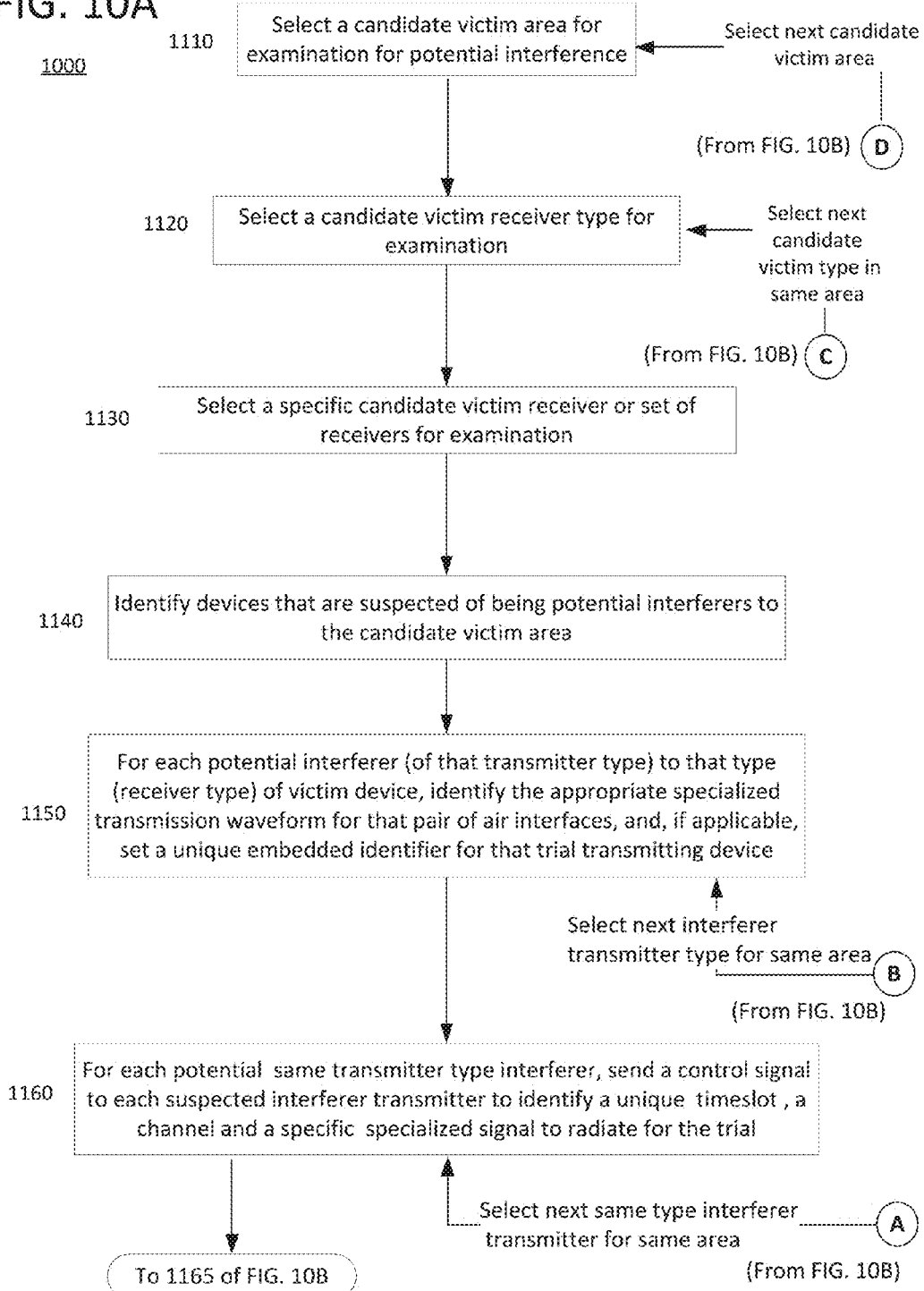

700

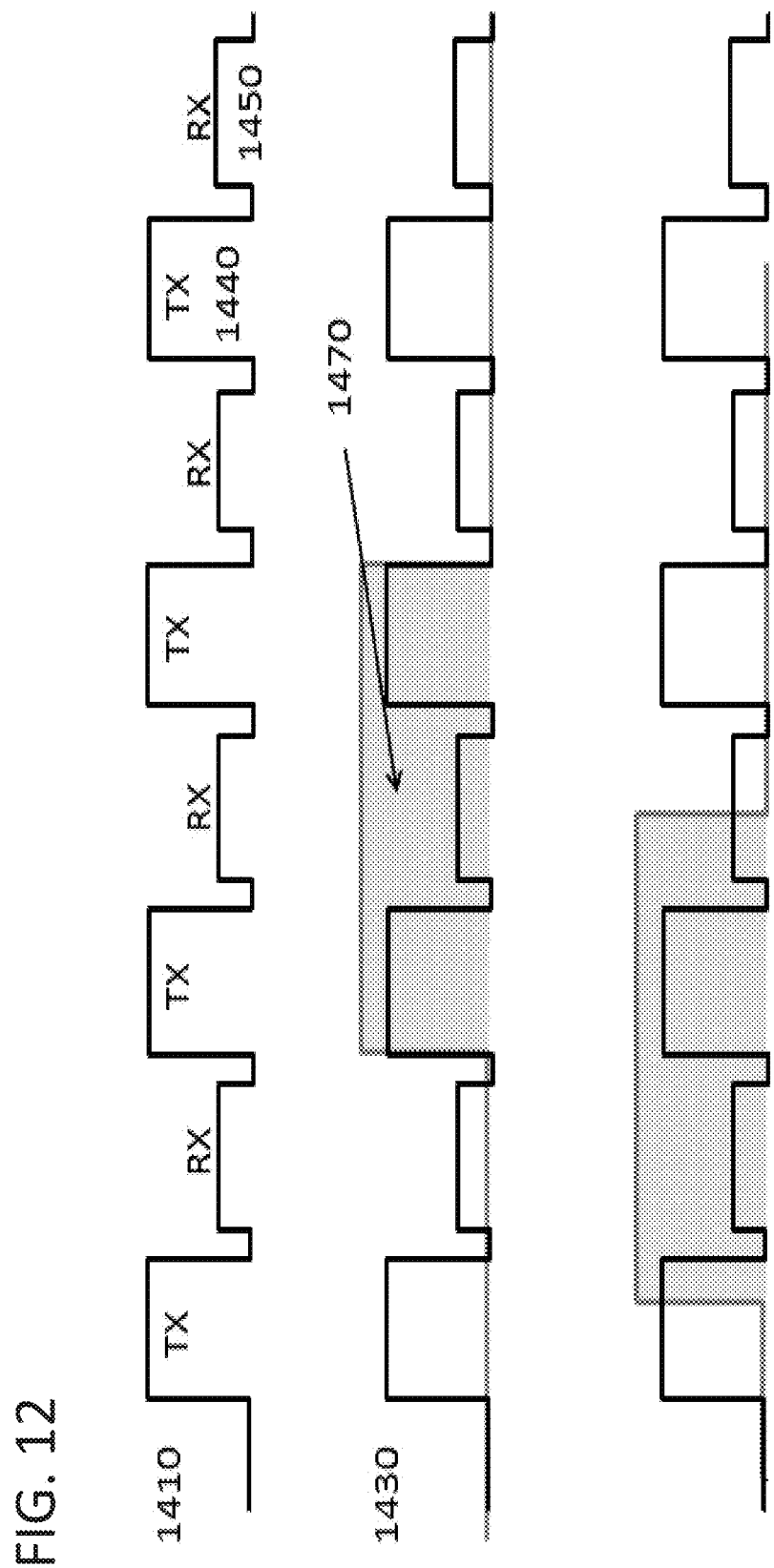

STATION ASSISTED INTERFERENCE MEASUREMENT

BACKGROUND

In recent years, the Federal Government has proposed to allow multiple tiers of users to share access to radio frequency spectrum in a controlled manner as opposed to unlicensed use, where all users are unprotected from interference from others, or licensed exclusive use, which only allows one licensed user access. A present proposal would authorize a set of channels within an available range of frequencies in a shared radio frequency spectrum model. In this shared radio frequency spectrum model, a set of channels may be at any frequency within the recently made available larger frequency band. In other words, for example, a license may be purchased for a 10 kHz channel in the frequency range of 20 MHz-22 MHz. Under a proposed licensing arrangement, any device would be allowed to operate within the 20-22 MHz range, but only on a temporarily assigned 10 kHz channel within the range. This new Government licensing proposal is like a general seating arrangement in a movie theater, where there are no assigned seats. Instead, the ticket holder is seated anywhere the usher directs as opposed to purchasing a designated specific seat ahead of time. A user in the proposed shared access radio frequency system would not have a statically assigned channel or set of channels at a specific frequency or a specific sub-block, but instead would have a potentially different channel assigned from time to time.

One proposal establishes a tiered priority access system for the Shared Access Systems (SAS). The first tier (Tier 1) is reserved for Government and military incumbent users who are the highest priority and the highest power-emitting users. The next tier (Tier 2) may be Priority Access/Commercial Wireless Network Providers (e.g. Verizon®, AT&T® and the like), who are proposed to have a mid-level priority and may have medium power emission levels, and the third tier (Tier 3) of users, known as General Authorized Access (GAA) users that have the lowest priority and lowest power emission levels.

The managing of the shared spectrum for the disparate devices is complicated because the different tiers of users may interfere with one another's use of a particular communication channel. Some proposals utilize a radio frequency (RF) propagation model to determine how to properly assign the channels, based upon parameters such as the channel frequency, the power levels and antenna gains, and the distances between the various users. By using propagation models to determine the possible interference, the manager can supposedly make a better assignment of the channels to avoid co-channel and adjacent channel interference because the users are too close or operating at too high a power level. The propagation modeling is based on the transmit and receive capabilities of the devices operating within the shared access system to make a determination of which particular communication channel should be assigned to respective devices in an area being serviced by an access point or base station device. However, accurate modeling of the RF propagation of the respective devices requires extensive, precise, and accurate information (such as, for example, three dimensional geometries of all landscape and structures surrounding the respective devices, dielectric constants for all bulk materials and conductivity figures for all surfaces, as well as other information). Also, fine grain motion of objects (e.g., time variation of the environment) due to moving people, moving vehicles, swaying of trees, etc., also all cause substantial time variation (e.g., signal fading). As a result, most practical RF propagation models are crude and approximate. Therefore, accurate prediction of path loss from a transmitting co-channel interferer to a candidate victim receiver at a known location is extremely difficult, and RF modeling techniques are only approximate and are often conservatively biased, meaning that in order to prevent interference, the prediction uses optimistic propagation distances (typically longer than actual) or path losses (typically more loss than actual) in order to avoid possible interference. Based on the conservative bias toward preventing interference, areas in which a candidate victim receiver may operate may be smaller than appropriate and have arbitrary exclusion boundaries that unnecessarily limit possible channel reuse. Often, the boundary contours are simple circles (having radii that represent a minimum 'keep-away' distance) that do not actually consider local conditions.

This conservatism leads to larger distance spacing between allowed co-channel users because, for example, due to the longer than actual propagation distances, thus resulting in longer distances for allowed frequency reuse, which actually results in less frequency reuse. Since frequency reuse is a metric for optimizing overall spectrum efficiency (e.g., how much total aggregate data can be handled by an air interface within a given amount of spectrum bandwidth), this conservatism leads to inefficient use of the shared radio frequency spectrum. In modern systems, this inefficiency is tolerated because the threat of interference is great, and interference can make the RF channels unusable if the victim receives too much interference. It is preferred to have a reliable RF channel for the transmission of voice and data signals, so excessive interference is preferably avoided. In order to minimize the amount of interference on the authorized channels, the modern systems typically err by being overly conservative regarding channel reuse distances.

These difficulties are further exacerbated in a multi-tiered shared radio frequency system because the various groups of users may deploy with differing air interfaces that use different transmitters and receivers, with differing power levels, bandwidths, waveforms, modulation methods, demodulation methods, and error protection schemes that allow operation at different resultant signal to noise ratios. These disparate system configurations further complicate use of a simple database or a simple propagation model in trying to assess the amount of interference a given device would receive from the surrounding disparately configured systems' interfering transmitters.

Other systems, such a conventional autonomous dynamic spectrum allocation (DSA), allow a local base transceiver system or access point itself to autonomously sample the radio frequency environment and determine which radio frequency channels to assign to itself. Autonomous DSA behavior does not provide information to a spectrum manager, so the autonomous local base transceiver systems or access points operate on a contention basis, and intelligent assignment (i.e., proactive management or coordination) of communication channels does not occur.

Hence a need exists for more accurate determinations of the interference between disparate systems in a shared access radio frequency spectrum so more accurate interference estimates may be made, and the intelligent assignment of communication channels may occur.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 6 is a frequency division duplex (FDD) example of an arrangement for measuring downlink interference to a number of candidate victim devices that have dissimilar air interfaces than a potentially interfering base station in an ASA system.

FIG. 7 is another FDD example of an arrangement for measuring downlink interference to a number of candidate victim devices that have dissimilar air interfaces than a potentially interfering device in an ASA system.

FIG. 8 is another FDD example of an arrangement for measuring uplink interference at a candidate victim device that has a dissimilar air interface than a potentially interfering device in an ASA system.

FIG. 9 is another FDD example of an arrangement for measuring uplink interference at a base station candidate victim that has a dissimilar air interface than a potentially interfering device in an ASA system.

FIGS. 10A and 10B illustrate a flowchart of an example implementation of an interference measurement process in an ASA system.

FIG. 12 shows a duration interval for an example of a specialized signal implemented in a TDD configuration for providing station assisted interference measurement of a shared radio frequency spectrum.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to interference measurements performed by stations to assist in the assignment of communication channels in a shared access system. Examples of a station may include a base station transceiver, an access point device, a mobile station, such as a smart phone or the like, an end user device or the like. As discussed herein, a communication channel implies a specific air interface and an assigned radio frequency channel with additional information, such as a TDD time synchronization, a particular signal coding, modulation settings, demodulation settings, and the like.

Figure 1:
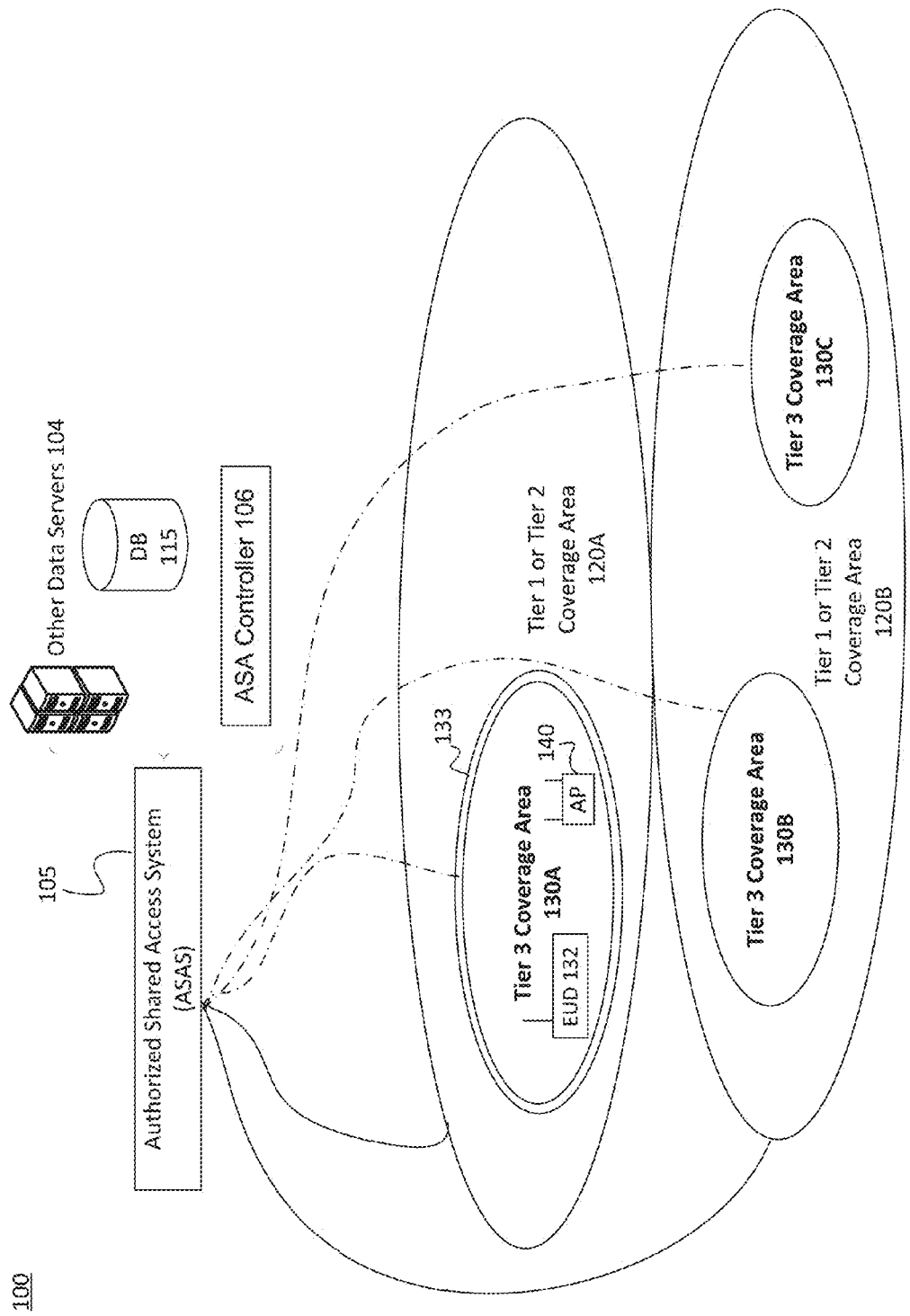
FIG. 1 is a conceptual diagram illustrating an example of coverage areas managed by an Authorized Shared Access (ASA) system.

With a large number of devices, the assignment of communication channels in a non-interfering manner can become problematic. An authorized shared access system is configured to mitigate the interference by efficiently managing the assignment of the communication channels. For example, FIG. 1 illustrates an example of an authorized shared access (ASA) system (ASAS) 105 that includes an ASA controller 106, ASA databases 115, other data servers and a plurality of coverage areas 120A, 120B, 130A-C. Through use of information retrieved from the ASA database 115, the ASA controller 106 controls and assigns ASAS communication channels for data communications to base transceiver devices, access points, mobile stations and end user devices. For the ASA controller 106 to properly assign the use of the ASAS communication channels, the ASA controller 106 balances the desire for more frequent communication channel reuse (since, in some examples, there are only fifteen 10 MHz communication channels in the ASAS shared radio frequency spectrum) and the desire to limit interference (if the co-channel cells are allowed to be too close together) between stations. The capacity and number of allowed simultaneous users increases if the communication channels are more frequently reused. For example, keeping the size of the coverage areas, or cells, small (e.g., use of small cells) helps here to promote more frequent reuse.

The use of the various field deployed base station transceivers, access points and end user devices themselves as interference monitoring receivers, therefore, may have great value in aiding the ASA controller 106 to more accurately determine the amount of interference that is actually received in specific adjacent and nearby small cells (i.e. coverage areas). For example, as the small cells get very small (for example, in indoor environments), it is desirable to better understand how much actual inter-cell shielding from interference the ambient environment (e.g., walls, buildings, trees, terrain) provides for that specific small cell. A generic equation for RF propagation modeling of the aggregate interference is not all that useful as the cells get very small, and the local environments begin to vary a great deal (e.g., cubicles versus an open stadium, and the like). As a result, it would be helpful to be able to obtain actual path loss measurements, instead of relying on one or more of the varied types of propagation models that rely on equations that may not correctly characterize losses within the shared access system. Similarly, more sophisticated approaches to RF propagation modeling require too much specific information, such as physical environmental data, that may not be easily obtained from users' GPS location information.

In the example of FIG. 1, the Tier 3 access point (AP) 140 and its served EUD (132) are examples of an implementation that provides shared radio frequency spectrum coverage for lower priority (i.e., Tier 3) users in the ASAS. Generally, the ASAS 105 has determined that the Tier 3 coverage areas, such as 130A, 130B and 130C, are available for non-interfering use of the shared radio frequency spectrum (i.e. AP 140 and EUD 132 will not interfere with a higher tier user elsewhere in coverage area 120A). The determination may be made by algorithms executing on the ASA controller 106 or other data servers 104 based on user device information stored in DB 115 or available from the other data servers 104. For example, some Tier 1 users (i.e., non-military/police users) may provide advanced notice of location of Tier 1 device use in a particular coverage area to the ASAS 105. This location information is stored in the DB 115. In addition, the locations of Tier 2 mobile network operators (MNO) base station transceivers (BTS) are typically fixed at a particular position known to the MNO. The locations of the BTSs may also be stored in the DB 115. Finally, all Tier 3 APs may include a GPS system, or similar location reporting system, that reports the respective locations of the devices to the ASAS 105.

The DB 115 may also store, or the other data servers 104 may have access to device operation information such as signal power levels, antenna gains, tuning range, channel bandwidths supported or the like. The DB 115 may also have the specific information regarding the shared radio frequency spectrum channel and/or sub-band assignment, the duration of the channel and/or sub-band assignment, the closest neighboring Tier 1/2/3 devices, and the like. Using the stored device location and device operation information, the ASA controller 106 may apply different propagation modeling techniques (discussed in more detail below) to determine an optimal channel and/or sub-band assignment for operation of each device in the ASAS. In addition, the ASA controller 106 may also inform the AP 140 to transmit at a specific transmit power level. The AP 140 is informed, by the ASA controller 106, of the availability of spectrum in the coverage area 130A including the channel and/or sub-band assigned to the AP 140, which begins operating in the assigned channel and/or sub-band to provide data service to the served EUDs.

Regardless of the propagation modeling techniques used to determine coverage areas, keep-out areas, and device power levels, as mentioned above, the ASAS 105 may also instruct the AP 140 to stop transmitting in the coverage area 130A because a higher priority user (e.g., a Tier 1 military user) needs the channel for high powered emissions, such as a pulsed radar, or will be emitting high powered radio frequency in a channel(s) adjacent to the channel that the AP 140 and its EUDs are currently using to communicate. The ASAS 105 may have advanced notice (e.g. months or several days' notice) that a Tier 1 user will be in the vicinity, such as coverage area 120A, of Tier 3 devices, and will need the entire coverage area 120A at a particular time and duration for the Tier 1 activities. Tier 1 activities may include the use of high powered signals within the frequency bands of the shared radio frequency spectrum that may potentially interfere with, or damage, the Tier 3 devices.

Alternatively, the ASAS 105 may have little, or substantially no, advanced warning of the Tier 1 user's high powered use of a channel assigned to the Tier 3 AP 140 and its EUDs. In the case of advanced notice, the ASAS 105 can provide a schedule of when the AP 140 and EUD 132 should shutdown, while in the case of abrupt notice, the AP 140 and EUD 132 may be informed to immediately cease use of the previously assigned channel and/or sub-bands. The propagation modeling techniques may also be used to determine keep-out areas 133, which are areas surrounding the periphery of the coverage areas. Keep-out areas 133 are areas in which any devices in those areas will likely experience or cause interference and/or experience reduced quality of service.

Based upon location, the ASAS 105 may use a propagation model to determine the next closest allowed co-channel use, and hence, the communication channel assignments and the respective coverage areas 130A-C for the respective devices. For example, the ASAS 105 may use one or more types of RF propagation modeling methods to determine the effects of certain communication channel assignments and transmit signal power levels in a particular coverage area, and to subsequently assign the communication channels.

A first type of propagation model (i.e. physics approach) uses ray tracing methods, electromagnetic simulations, penetration modeling, scattering/diffraction/polarization modeling, field of view, and the like. These methods are not only computationally intensive but also include a large number of location and material constants data, such as accurate terrain and topography data, building locations and dimensions, interior wall details, street locations, other objects (e.g., cars and trucks), vegetation (e.g., leaves attenuate RF signals), reflection, conduction and dielectric properties for materials (e.g., glass, brick, metals, wood) data), as well as the more conventional parameters of the transmitter and receiver (e.g., locations, TX power, RX sensitivity and noise figure, antenna gains, antenna patterns, antenna heights). These models are generally not employed because of these difficulties.

A second type of propagation model is an empirical model, which are generalized equations (e.g., curve fits) of a 'case' of measurements. Examples include Okumura, Hata, and COST-Hata models. Typically, a general case is defined (such as outdoor, rural, with few buildings and open spaces), a measurement campaign (e.g., drive testing (by actually driving a testing vehicle) is deployed in an area of interest) is conducted to collect (i.e., measure) a large data set over a small set of varying parameters. Generally, these parameters only include the path loss parameters (e.g., distance, frequency), and the antenna parameters (e.g., transmitter height and receiver height). Depending upon the methodology, a curve fit is used to derive an equation where these parameters can be varied to determine an average path loss for that set of parameters (e.g., frequency and distance) and conditions (e.g., general case, antenna heights). Thus these empirical models are not generally useful for predicting specific losses in a specific instance, but are useful as a conservative estimate for the aggregate or mean path loss value within a coverage area for that specific type of case.

A small cell is a coverage area ranging from tens of meters to a few kilometers in area depending on the environment. In other words, in an urban area, a small cell may have an urban range of 60 or 70 meters around a small cell AP mounted on, for example, a light post, while in a rural setting without buildings or without many trees, the rural range may be 1-2 kilometers.

Because these case based models only consider the average aggregate performance of the small cell, this fundamentally limits the accuracy of such empirical models for small cell RF communication channel assignment (i.e., frequency use planning). As a result, a large margin (i.e., variation) is left in order to account for cell-to-cell variation, which these empirical models are not constructed to estimate for any specific cell site or access point. Thus, the empirical models give a lower bound (e.g., an average small cell path loss) which corresponds to the minimal suitable 'average' keep-out range radius. To account for these unknown variations, an additional margin (8-15 dB) is added, for example, to account for a worst case scenario, such as when a small cell has an unobstructed path to an adjacent co-channel interfering cell. As a result, the reuse distance (i.e., keep-out range, such as indicated by keep-out zone 133 in FIG. 1) is larger, and the assignment of communication channels is more conservative. To be more accurate in the assignment of communication channels (e.g., less conservative, less margin applied atop the mean aggregate interference case), more specific information is needed. This is one reason why interference monitoring (e.g., spectrum sensing) is valuable.

A third option is a direct spectrum sensing or spectrum sensing database approach using a spectrum sensing method in which the devices are used as in situ receivers to determine signal levels from nearby radiators to assess the interference a victim radio would experience at a given location based upon actual traffic transmissions from existing and operating neighboring co-channel users. These received signal strength indication (RSSI) signal reports may be used directly (as in autonomous DSA), or this information may be stored as part of the ASAS database to be used at a later time when an assignment is determined. However, the described spectrum sensing use of actual data traffic signal transmissions has certain limitations. For example, the amount of time to perform such sensing receptions on one or more candidate channels may conflict with the victim radio performing its intended function of providing data communications to an end user device or mobile station. Also, the detection of multiple nearby operational co-channel transmitters by the in situ receivers does not indicate which of the neighboring co-channel users is actually interfering with the victim radio. The in situ receiver does not know which neighboring transmitter is on which channel or which neighboring transmitter is actually radiating at any given time interval. Also, the receiver does not know what power level or antenna gain the neighboring transmitter is employing or the distance to the transmitter, only the effect of the received signal (i.e., the measured RSSI level). Thus, when these RSSI reports are sent back to a centralized controller, the reports may not be very useful in determining the actual propagation conditions. These limitations do not allow for accurate interference determinations.

A fourth option is to use a hybrid combination of the spectrum sensing database model and the empirical RF propagation model. For example, when determining coverage area 130A of FIG. 1 for a Tier 3 device, the ASA controller 106 may initially start with the device's propagation result from using the empirical model, and the ASA controller 106 would use this propagation result for the device if no other data for the device were available. If the ASA controller 106 also had spectrum sensing data within its database, it would replace the calculated estimate with the measured estimate and then use this to determine the proper reuse distances and channel assignments to avoid interference with the Tier 3 device. Alternatively, and more conservatively, in order to avoid interference, the hybrid model may choose the longer propagation distance range based upon the two separate estimate methods for that particular device. Alternatively, for more liberal reuse, in order to maximize overall capacity, the hybrid model may choose the shorter propagation distance range based upon the two separate estimate methods for that particular device.

There are several primary problems with the above options that utilize opportunistic sensing for systems using shared spectrum among a number of disparate air interfaces. The first is that detecting some nearby transmitter systems is made difficult if those systems are dormant during the sensing interval. This may be because those co-channel systems are not currently active. Alternatively, the other co-channel systems may be active, but asynchronous to the candidate victim receiver (i.e., the sensing receiver), such that they are not actually transmitting during the sensing interval. Also, they may not be co-channel to the victim receiver during the sensing (sampling) interval, but may later be reassigned a different channel that does in fact make them co-channel at a later point in time. Another problem is that power control, if used on some air interfaces, may give a mistaken (e.g., lower) measured interference level that is not indicative of the nearby transmitter's possible interference at a higher allowed power level. Yet another problem is that during the opportunistic sensing interval, multiple transmitters may be transmitting simultaneously from several nearby locations, and the victim receiver may not be able to determine if there is more than one transmission within the composite reception. Also, in this case, the receiver will not be able to determine the effective power level from each separate transmitter, and hence cannot determine a path loss to any of these transmitters.

However, none of the above referenced four options provide the interference measurement accuracy of the examples disclosed herein. An actual cooperative sensing scheme implemented by a station assisted interference measurement system as discussed herein provides better results. For example, an ASA controller may instruct the potential interfering transmitters to transmit on known channels, at known power levels, and at known time intervals, then the victim receivers not only have a much higher probability of intercept, but also the ability to make much more accurate power measurements. Using, for example, this information as well as the individual power levels and distances to each separate radiating interfering transmitter, a path loss value can be calculated. The disclosed station assisted interference measurement examples provide benefits and advantages, such as: 1) determination of actual path loss rather than merely RSSI signal strength, 2) determination of path loss between two specific radio systems where not only the 'victim' receiver and its location are known, but also where the specific 'perpetrating' transmitter and its location are known, 3) determination of path loss between devices of different signaling protocols and/or air interfaces (e.g., long term evolution signals as compared to Wi-Fi signals) that are not provided by the other disclosed options, 4) the determination of path loss on channels other than currently operational channels, and 5) determination of path losses apriori before actual use (e.g., assignment) of the channel is desired (e.g., at a different time, where the results are, for example, stored in a database for use at a later time).

Path loss may be determined using various methods based on known transmitter and receiver parameters, such as, for example, transmitted signal strength, transmitter antenna gain, signal power loss attributable to transmitter component losses, receiver antenna gain and signal power loss attributable to receiver component losses. Of course, other parameters and combinations of parameters may be used to determine path loss. Path loss may be represent an end-to-end power loss between a transmitting device and a receiving device based on a determination using known calculation methods that use the known locations of the transmitting and receiving devices, transmitter and receiving device parameters, measurement data and other known information as inputs. In addition, path loss between different air interfaces may be determined. The calculation of the path loss is beneficial because a more effective assignment of channels may be performed that results in better network performance due to the mitigation of interference. Furthermore, SAIM methods may be implemented at any time, such as a previous night, to allow for immediate implementation of the interference mapping and path loss results to the channel assignment process.

For example, the signals transmitted in the communication channels of the shared radio frequency spectrum have signal parameters, such as signal strength, frequency, amplitude, duration and the like, that may be determined or measured for use in measuring interference and path loss between devices operating in the ASAS 105.

The ASAS 105, when determining communication channel assignments and the subsequent coverage areas, such as 130A-C, may use either a propagation modeling approach or a spectrum sensing database approach. In the propagation modeling approach, the ASAS 105 database may include Tier 1, Tier 2 and Tier 3 device locations, respective device parameters, such as signal power levels, assigned channels, and the like, and apply signal propagation models based on known or expected power output levels of the respective devices in a proposed coverage area to determine whether a requesting Tier 3 device can be granted access to available spectrum, and also the extent of the coverage area provided for the requesting Tier 3 device. Based on the results of the determination, the ASA controller 106 may grant or deny access to the communication channels by the Tier 3 device requesting use of the shared radio frequency spectrum in the proposed coverage area.

Alternatively, the ASA controller 106 may utilize the Tier 3 device as a sensing receiver. For example, by sampling unused communication channels (i.e., unused for that particular Tier 3 device receiver) or periods of device communication inactivity (i.e., again for that particular Tier 3 device receiver) within coverage areas to sample the shared radio frequency spectrum path loss, the ASA controller 106 may determine the interference experienced by the particular Tier 3 receiving device prior to any new request for service. The determined interference, path loss or other data (e.g., identity of interfering transmitters) can be stored and used later when determining whether to grant access to available spectrum (i.e., to assign a channel) by utilizing the spectrum sensing database approach. Using the sampled data, the ASA controller 106 may grant or deny access to a communication channel by the Tier 3 device requesting use of the shared radio frequency spectrum in the proposed coverage area.

Figure 2A:
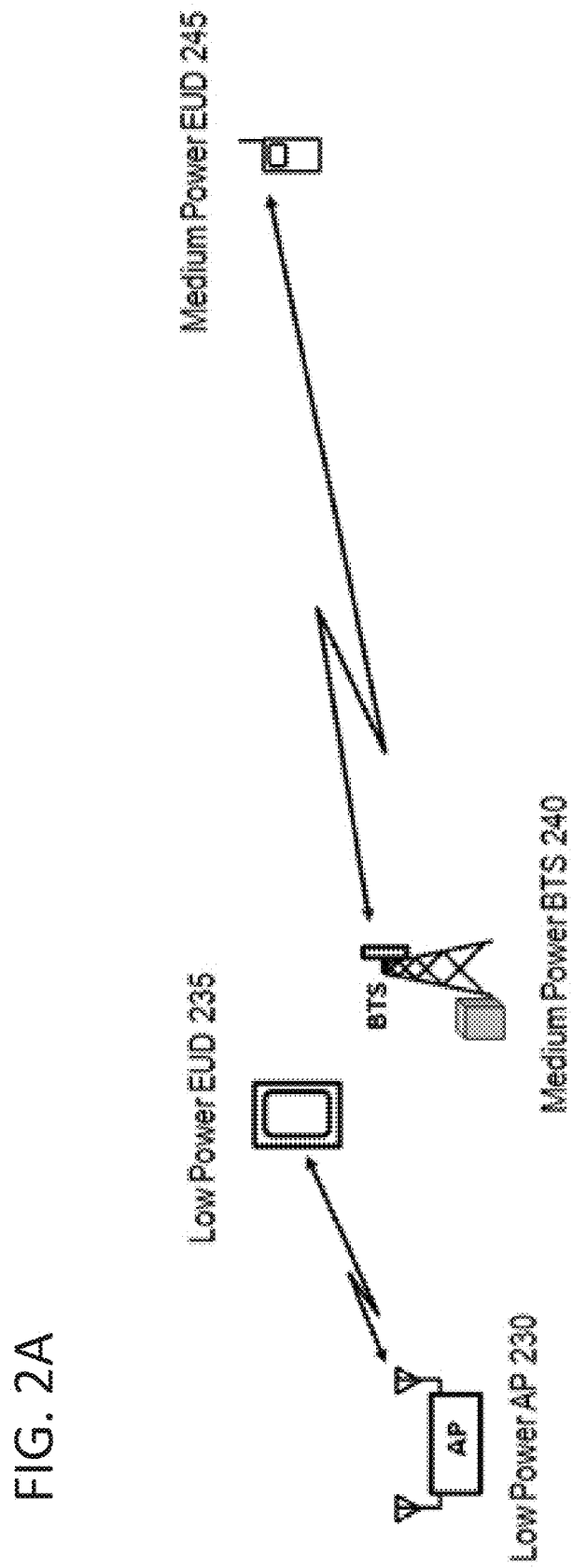
FIG. 2A illustrates an example of near-far and different power level interference that may occur between two different types of use cases in an ASA system.

The ASA controller 106 may use its capability of selecting the appropriate sub-bands to manage different use cases within the same or nearby geographic areas. For example, FIG. 2A illustrates an example of two different use cases that are nearby one another. The first use case example is that of a Tier 3 GAA AP 230 and its served EUD 235. In this example, the respective AP 230 and low power EUD 235 may be under a power restriction for Tier 3 GAA devices, such as having a transmit signal power of less than 30 dBm. As a result of the power restriction, the coverage area of the AP 230 only covers a small area (not shown). The second use case may be that of Tier 2 BTS 240 and its served EUDs, such as medium powered EUD 245. The Tier 2 BTS 240 may be a permitted to use medium power transmission (i.e., medium transmit signal power) that is above 30 dBm EIRP in order to cover a Tier 2 coverage area (not shown) that is larger than a Tier 3 coverage area (not shown).

This scenario illustrates a potential interference problem caused by two different use cases in which different allowable maximum transmitter power levels are used. In the illustrated scenario, it may be more likely that AP 230 and EUD 235 receive interference from BTS 240. The interference, in some cases, may even be adjacent or next adjacent channel interference (assuming the two different use cases are not co-channel) because of the higher power of the BTS 240 or the EUD 245. In an example, if the ASA controller 106 not only assigned different (non-co-channel) communication channels, but also assigned differing sub-bands, then the different use cases would be protected from one another by the additional rejection of the sub-band filters.

Other use cases may be presented with more or less protection from interference with respect to the nearest distance for co-channel channel assignment, or use of different sub-bands to avoid co-channel or non-co-channel interference. Besides very high power radar use cases, other higher powered use cases might include point-to-point communications with higher powered transmitters or very narrow antenna beam widths (e.g., high gain antennas), non-line-of-sight (NLOS) backhaul use cases with higher power, and sectorized macrocell use cases with both higher amplifier powers and sectorized antennas (with higher antenna gain than omnidirectional antennas). In addition, besides a transmitter power problem, there are also near-far problems (e.g., a high power far transmitter interferes with a lower powered system but with a nearer receiver) that contribute to large dynamic range differences between the desired signal and the interfering signal at the victim receiver.

Figure 2B:
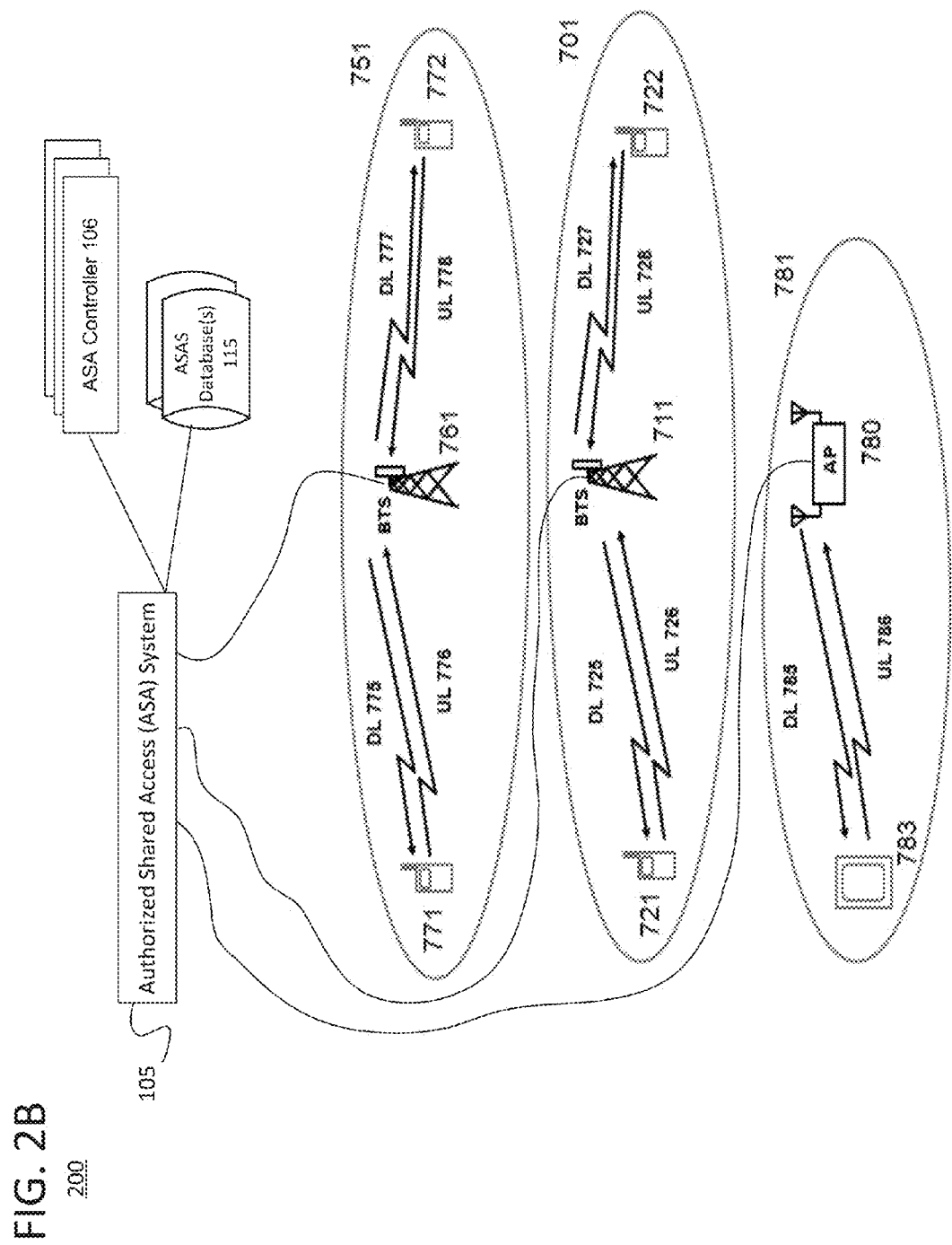
FIG. 2B provides an example of the uplink and downlink signaling of the different user devices in the respective coverage areas of an ASA system.

FIG. 2B provides an example of the uplink and downlink signaling of the different user devices in the respective coverage areas. Under control of the ASA system 105, which includes the ASA controller 106 and the ASAS database 115, the devices within the coverage areas 701, 751 and 781 are provided access to communication channels of the shared radio frequency spectrum for the exchange of data via uplink and downlink communication channels. For example, normal uplink (UL) channels in an ASA environment are shown as UL 776 and UL 778 in coverage area 751, UL 726 and UL 728 in coverage area 701, and UL 786 in coverage area 781, while normal downlink (DL) channels are shown as DL 775 and DL 777 in coverage area 751, DL 725 and UL 727 in coverage area 701, and DL 785 in coverage area 781.

Coverage area 751 illustrates a cell within a networked air interface having a base transceiver station (BTS) 761, and a number of served User Equipment (UE) handsets of Mobile Stations (MSs), MS 771 and MS 772. For bidirectional voice or data traffic, each MS is supported by an UL, from the MS to the BTS, and a downlink (DL) from the BTS to the respective MS. For example, as shown, MS 771 has DL 775 from BTS 761 and UL 776 to BTS 761. The air interfaces between the BTS and the respective MS may be Time Division Duplex (TDD) or may be Frequency Division Duplex (FDD). Also, some air interfaces or uses may have only a DL or only an UL.

FIG. 2B also shows a standalone air interface example in coverage area 781. This may be a Wi-Fi-like, or similar system, that uses an Access Point (AP), such as AP 780, to serve unidirectional or bidirectional voice or data traffic to and from one or more served End User Devices (EUDs), such as EUD 783 (or a BTS servicing one or more MSs). The EUDs, such as EUD 783, may be a computer, a tablet, a handset or other similar device. Coverage area 781 shows the AP 780 serving a single EUD 783 on an UL 786 and a DL 785.

The AP (or BTS) is referred to as "Wi-Fi-like" because the AP (or the BTS) may be otherwise compliant with and operate within the scope of the 802.11XX (Wi-Fi) standard except for the respective frequency ranges. For example, the IEEE 802.11Y-2008 standard, which is an amendment to IEEE 802.11-2007 standard, refers to licensed point-to-point service providers in 3550-3650 MHz band. In other words, the AP is compatible with signals that comply at least in part with the 802.11XX (Wi-Fi) standard except for the respective frequency ranges. Similarly, the AP (or a BTS) may also be referred to as "LTE-like" because the AP (or the BTS) may be otherwise compliant with and operate within the scope of an LTE standard except for the respective frequency ranges. In other words, the AP (or a BTS) is compatible with signals that comply at least in part with the LTE standard except for the respective frequency ranges. In the case of the described examples, the shared radio frequency spectrum may be within the range, for example, of 3550.0-3700.0 MHz or some other frequency range. Of course, the described devices may operate not only in the Wi-Fi and LTE domains, but other domains as well. For example, the domains may include code division multiple access (CDMA) domains, universal mobile telecommunications systems (UMTS) CDMA systems, time division (TD) CDMA systems as well as systems that implement a point-to-point signaling protocol.

Also shown in FIG. 2B is coverage area 701 that, for example, is served by a networked air interface with BTS 711. The coverage area 701 may be part of the same networked air interface as used in coverage area 751. For example, coverage areas 701 and 751 may be two different cells within the same network. Alternatively, coverage areas 701 and 751 may be in different networks, or may even utilize differing air interfaces. Likewise, there may be more coverage areas similar to 781, serving other AP covered areas, that may have the same air interface as or different air interface than that of coverage area 781.

Figure 3A:
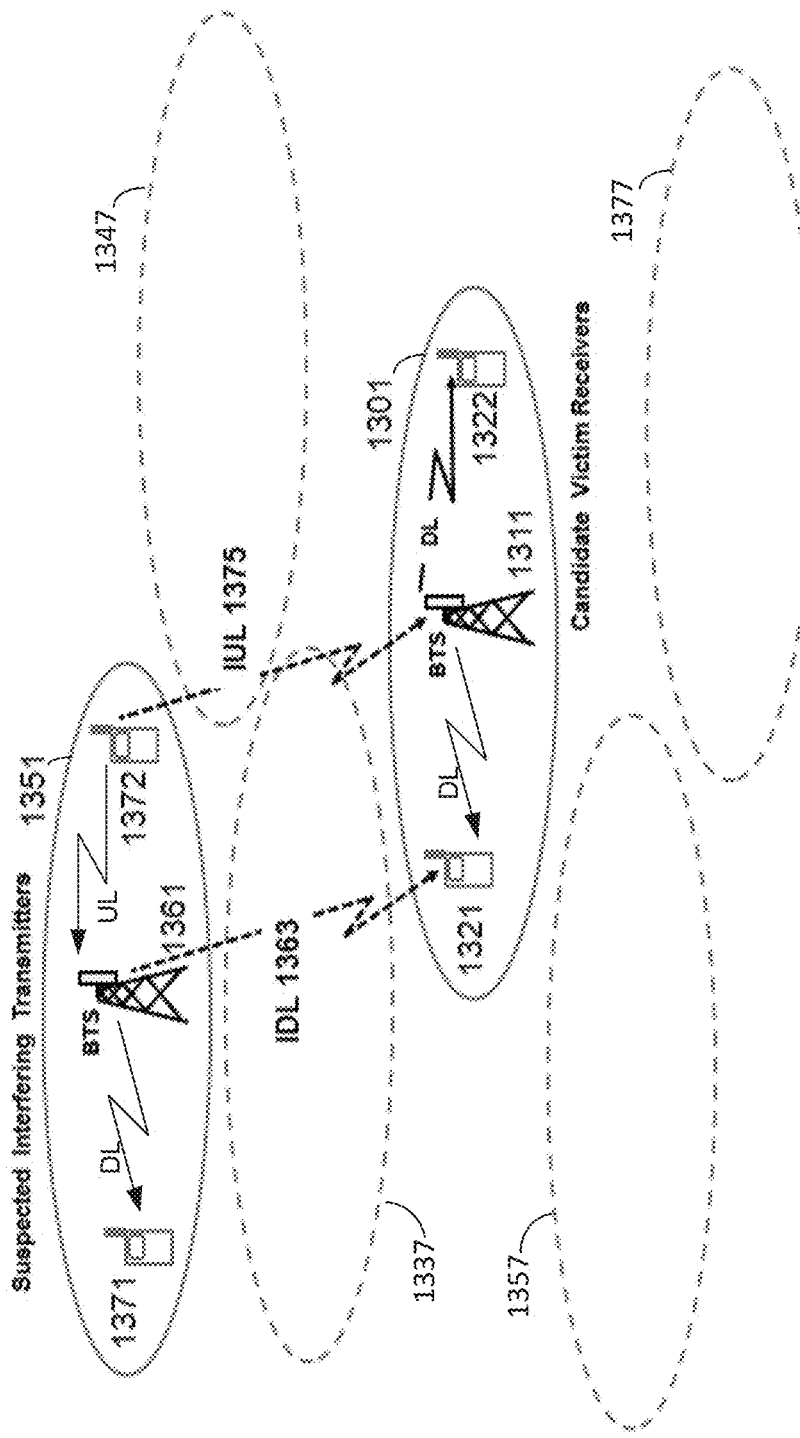
FIG. 3A provides an example of the sources of interference from suspected interfering transmitters in an ASA system.

FIG. 3A provides an example of sources of interference to a candidate receiving devices (i.e., candidate victim receivers) from suspected interfering transmitter devices in the authorized shared access system.

In the example illustrated in FIG. 3A, the coverage area 1301 may be a coverage area subject to interference from BTSs, APs, EUDs, and MSs in other nearby coverage areas. For example, consider coverage area 1301, here shown with a corresponding BTS 1311, which is serving MSs 1321 and 1322. In another example, BTS 1311 may also be an AP transceiver and the MS 1321 and 1322 may be EUDs, such as a laptop or tablet device. In coverage area 1301, MSs 1321 and 1322 may have active uplink and downlink links. In a time division duplex (TDD) system, these links are on the same communication channel (i.e., frequency) for both the uplink and downlink. In an example of a frequency division duplex (FDD) system implementation, the uplink and downlink may be paired (i.e., assigned to the same device), but on different communication channels (i.e., on different frequencies). Likewise, on other air interfaces where channels are TDD and shared among multiple users, MSs 1321 and 1322 may be served by two different channels, or may, for example, share time on one channel, as Wi-Fi systems often do.

In some implementations, a nearby co-channel coverage area, such as coverage area 1351 served by BTS 1361, may be too close to the coverage area 1301, and may interfere with the communication between the BTS 1311 with the MS 1321 and 1322. Since there are two communication directions (i.e., uplink and downlink), there are two different interference scenarios. For example, the coverage area 1351 is assumed to be assigned the same channel (or channel set) as coverage area 1301 (i.e., a co-channel assignment). However, if coverage area 1351 is too close to coverage area 1301, even when separated by other coverage areas, such as coverage areas 1337 and 1347, there is the potential for interference. Similarly, there may also be interference sources transmitting in coverage areas 1357 and 1377, but for ease of explanation only interference sources from coverage area 1351 are shown and described. For example, MS 1372 may be using the same uplink channel as MS 1322 (uplink path for 1322 not shown). The uplink (UL) signal that MS 1372 is transmitting to BTS 1361 also radiates towards BTS 1311, as shown by the interfering uplink (IUL) radiation IUL 1375. Depending upon distances and power levels, and other factors, the radiated signals from IUL 1375 may interfere with the BTS 1311's proper reception of an uplink signal (not shown) from MS 1322.

Similarly, on the downlink (DL) signal transmission, BTS 1361 may be transmitting a DL signal to Mobile Station 1371. However, a transmitted interfering downlink (IDL) signal, IDL 1363, from that nearby BTS 1361's transmitting transceiver may radiate towards mobile station 1321 within coverage area 1301, where it may interfere with proper reception of the traffic DL signal from BTS 1311 transmitter to MS 1321 receiver.

In summary, potential sources of interference may include both UL transmissions from MSs or EUDs within a coverage area and DL transmissions from BTSs or APs in a "suspected interfering" coverage area, when the transmissions are co-channel with the transmissions in the "victim" coverage area.

When in operation, the ASA controller 106 knows the previously assigned channels (or channel sets) that were authorized for coverage areas 1301 and 1351. Thus, the ASA controller 106 is able to direct the devices, such as mobile stations 1321, 1322 and BTS 1311 in coverage area 1301 to perform sampling receiver measurements to measure potentially interfering signals on the same communication channels that are already in use in nearby coverage areas, such as coverage area 1351. The ASA controller 106, by controlling returning of these sampling receivers in coverage area 1301, may also use the sampling receivers in coverage area 1301 to measure interfering signals on other communication channels.

For example, the BTS 1361 in coverage area 1351 may have requested a communication channel assignment for future service while coverage area 1301 is already serving devices for communication traffic. In response to the request from the BTS 1361, the ASA controller 106 may perform a trial use of a communication channel. Based on data stored in the ASAS database(s) 115, the ASA controller 106 may determine that the distance between coverage area 1351 and coverage area 1301 is too close for co-channel communications. Alternatively, the ASA controller 106 may perform the trial on the suspected transmitting interferer (i.e. BTS 1361) in order to update a propagation model result maintained, for example, in ASA database 115 or other data storage accessible by the ASA controller 106. Before the ASA controller 106 assigns a communication channel for data communication traffic to BTS 1361, the ASA controller 106 may request BTS 1361 to transmit a 'specialized' downlink signal on a designated communication channel to determine the signal path loss between the BTS 1361 and any candidate victim receivers, such as TDD BTS 1311. Note that MS 1321 and MS 1322 may also be considered victim receivers, but the exact location of either device is unknown since both are mobile devices and not stationary. As a result, a determination of path loss between either of MS 1321 or MS 1322 and BTS 1363 would not be as useful as a path loss determination between the BTS 1363 and BTS 1311, whose precise locations are known.

At this time, a discussion of the specialized signal used in the interference determination may be appropriate. Unlike conventional 'opportunistic' spectrum sensing (also referred to as 'sniffing' or 'looking'), the disclosed station assisted interference measurement (SAIM) provides for the suspected potential interfering transmitting devices to radiate a spatially tailored 'specialized' signal on the UL and/or DL timeslots (in a TDD implementation) for measurement by one or more candidate victim receiving devices. The 'specialized' signal is a designed signal that does not represent real, or actual, data communication traffic on an assigned channel, and this specialized signal is not carrying any real data communication traffic to any user. Real data communication traffic may be content, such as documents, video, audio or the like, or may be sensor data (e.g., an alarm setting code or the like) that is used for a purpose other than managing the ASA system. In contrast, the specialized, or flash, signal is meant to simulate potential interference from nearby coverage areas so that the candidate victim receivers, such as BTS 1311 and to a lesser extent, MS 1321 and MS 1322, and in coverage area 1301 may look for a signal (i.e., the specialized signal) having known parameters.

For example, the specialized, or flash, signal may be known by the different devices in multiple dimensions. The specialized signal, for example, may have different timing duration and synchronization to better guarantee that the victim sampling receivers can better receive and identify the specialized signal. The multiple dimensions of the specialized signal may include one or more of a communication channel (i.e., frequency and encoding), a signal format (e.g., header information, transmission device identifier and the like), a signal duration, a transmission signal strength (i.e., signal strength from point of transmission), a modulation method, a number of subcarriers used, and the like. Of course, the communication channel (frequency) is known, because it is assigned by the ASAS 105, so, for example, the potential candidate victim receivers know the communication channel to tune to receive the specialized signal.

The ASA controller 106 by selecting an unused communication channel (not assigned for traffic) and using the selected communication channel for transmission of the specialized signal allows the use of other communication channels that are not actually carrying UL or DL communication traffic in coverage area 1301, so the real data communication traffic carrying channels do not intentionally experience interference from the specialized signal transmissions. Also, the use of specialized flash signals for trialing an unassigned channels(s) allows the trialing of other channels, not merely the 'opportunistic' sampling of already assigned channels that are transmitting data communication signals. In the following discussion, the flashed channels or 'candidate' channels (i.e., communication channels used for transmission of the specialized or flash signals) are the communication channels being trialed, sampled or tested before being assigned for carrying real data communication traffic.

Figure 3B:
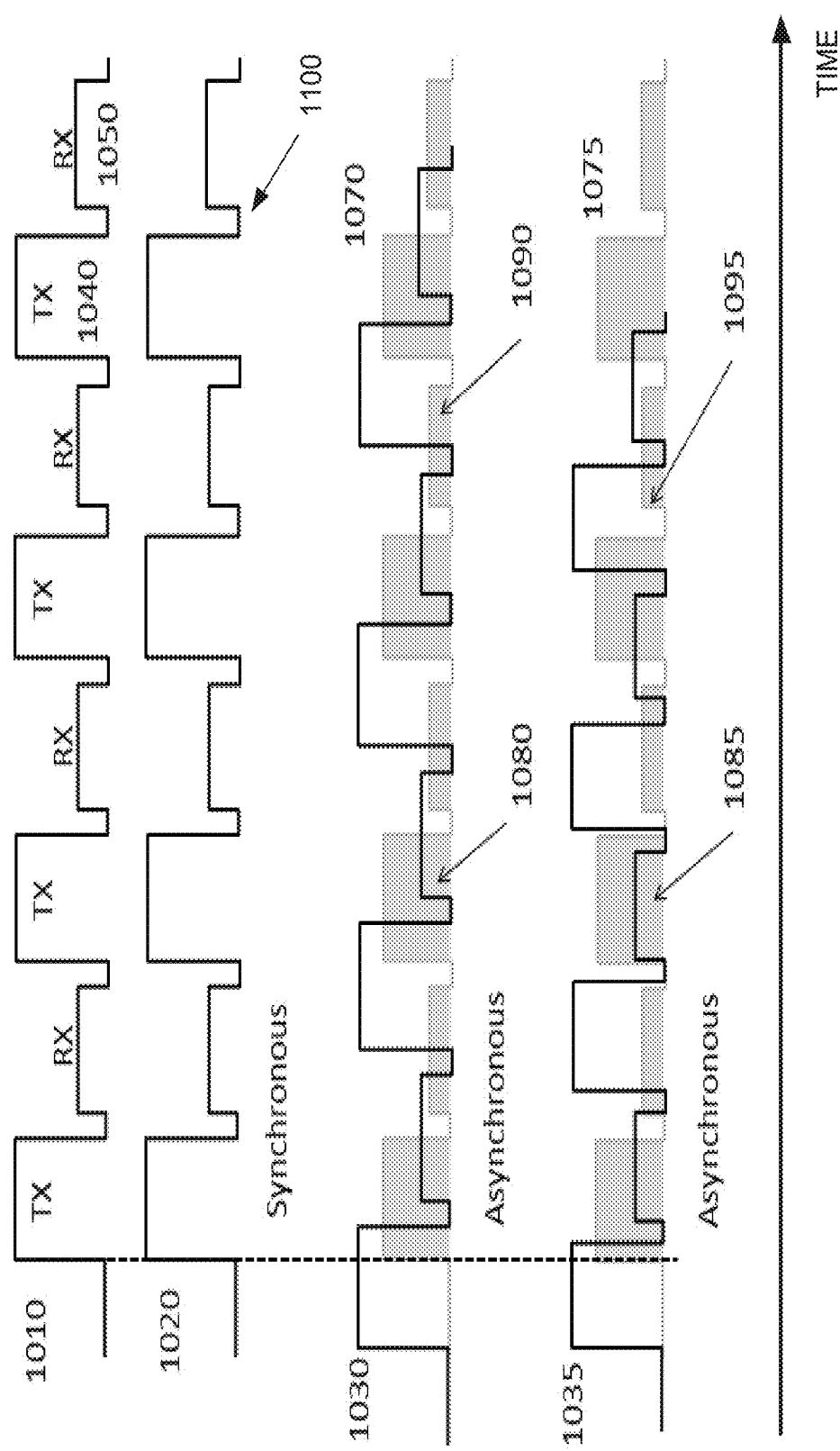
FIG. 3B illustrates the potential interference caused on uplink and downlink channels between dissimilar or unsynchronized time division duplex (TDD) sources in the example of FIG. 3A.

FIG. 3B illustrates an example of potential interference that may result from synchronous and asynchronous TDD signal transmission. In particular, FIG. 3B illustrates the example of potential interference caused on uplink and downlink channels between dissimilar or unsynchronized TDD sources of interference in the example of FIG. 3A. The top portion (above the "Synchronous" label) shows an example of a TDD waveform 1010 with alternating transmit (TX) and Receive (RX) time intervals with examples of guard times 1100 also shown. A single TX interval 1040 and a single RX interval 1050 are shown adjacent to one another in time. (TIME). As shown, the TX time intervals (e.g., 1040) and RX time intervals (e.g., 1050) are the same duration, but TDD waveforms may be unbalanced in that the TX interval duration may be shorter or longer than the RX interval. If the uplink and downlink traffic rates are balanced and coding methods are the same, then the intervals may also be balanced.

A second similar waveform 1020 is also shown. This waveform 1020 is synchronized with waveform 1010 in both phase (i.e., both waveforms start times are aligned) and in periodicity (the respective intervals are the same durations as 1010).

A third waveform 1030 is asynchronous with waveform 1010. The waveform 1070 (shown in grey) is a reduced amplitude version of waveform 1010. The grey waveform 1070 is shown with diminished amplitude or height to indicate that the TX signals experience path loss because the radiating transmitter, in this example, is farther away than the transmitting radio that corresponds to waveform 1030. Here, the start times are not aligned, so the waveforms are not in phase. Area 1080 indicates where the receiving radio that corresponds to waveform 1030 will experience reception interference from the transmitted signal from waveform 1070. Similarly, area 1090 indicates interference into the reception radio of waveform 1070 from transmissions from waveform 1030.

A fourth waveform is shown, 1035, that is also asynchronous with 1010, here shown as the grey waveform 1075. The grey waveform 1075 is shown with diminished height to indicate that the TX signals experience path loss because the radiating transmitter is farther away than the transmitting radio that corresponds to waveform 1035. Here, the start times are not aligned and the duration intervals are not the same, so the waveforms are asynchronous. Area 1085 indicates interference where the receiving radio that corresponds to waveform 1035 will experience reception interference from the transmitted signal from waveform 1075. Similarly, area 1095 indicates interference into the reception radio of waveform 1075 from transmissions from waveform 1035.

Thus asynchronous TDD transmissions, which may arise from use of both Wi-Fi and LTE together, causes additional sources of potential interference on both UL reception paths and DL reception paths. These interference sources may be from both UL transmitters and DL transmitters.

Figure 4:
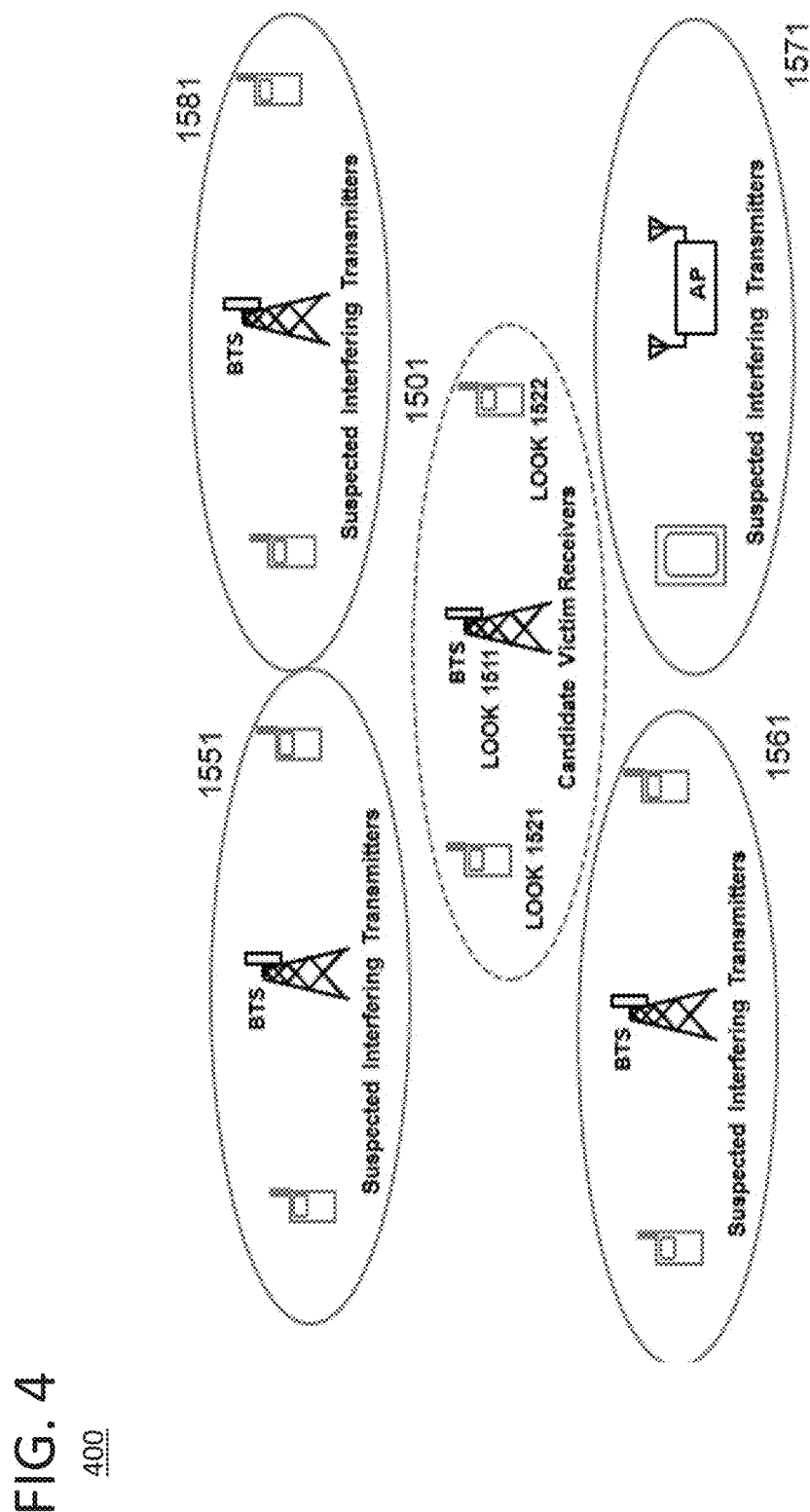
FIG. 4 is an example of an arrangement for measuring interference to a candidate victim device in an ASA system.

FIG. 4 is an example of an arrangement for determining sources of interference with to a candidate system in the authorized shared access system. FIG. 4 illustrates how one 'look' receiver or one set of look receivers in the candidate victim receiver coverage area 1501 can be used, in turn, to look for a number of specialized signals from surrounding nearby suspected interfering transmitters. The measurements can be performed on the same communication channel or different communication channels. By timing the specialized signals, or by inserting transmitting device identifiers into the specialized signal waveforms, the candidate victim receivers can determine which suspected interfering transmitting device is in fact creating unreasonable interference, for example, by measuring a received signal strength of the specialized signal.

With reference to FIG. 4, for example, the ASA controller 106 may instruct the downlink receivers in MS 1521 and 1522 to tune to a designated channel at a designated time to 'look' for the specialized, or 'flash,' signal. The specialized signal may be radiated at the intended power level to accurately match the original assignment request from, say, BTS in area 1561, or the ASA controller 106 may send instructions to transmit a higher power specialized signal to provide for a secure interference margin, or it may transmit a higher power specialized signal to provide for a more accurate assessment in a low signal-to-noise ratio (SNR) environment. Alternatively, the signal power transmission level of the specialized signal may be varied based on the path loss environment of the respective coverage areas. For example, if the SNR is very high in coverage area 1501 and the coverage areas 1551-1581 are quite close, the ASA controller 106 may choose to instruct suspected interfering transmitting devices to generate a specialized signal at a lower signal power level to create less interference to other co-channel users in surrounding areas.

In another example, the ASA controller 106 may tailor the format of the specialized signal as to not correspond to the requesting coverage areas 1561 BTS intended downlink receivers of the MS in coverage area 1561, but rather format the specialized signal to better match the reception characteristics of downlink receivers in mobile stations 1521 or 1522, especially if the two coverage areas are served by differing air interfaces. For example, if the specialized signal were from the suspected interfering AP (e.g. W-Fi-like) transmitters of coverage area 1571, the ASA controller 106 may format the specialized signal to better match the reception characteristics of downlink LTE receivers in mobile stations 1521 or 1522. Reception characteristics may include, for example, signal modulation, signal amplitude, signal header format, receiver antenna gain, receiver component losses, and the like. At the same time, synchronously (during the same timeslot), the ASA controller 106 may direct the candidate victim receiver, or a set of candidate victim receivers, to tune to the appropriate channel and perform received signal strength indicator (RSSI) measurements in order to measure the path loss between, for example, the coverage area 1551 BTS and the BTS 1511 of coverage area 1501.

Figure 5A:
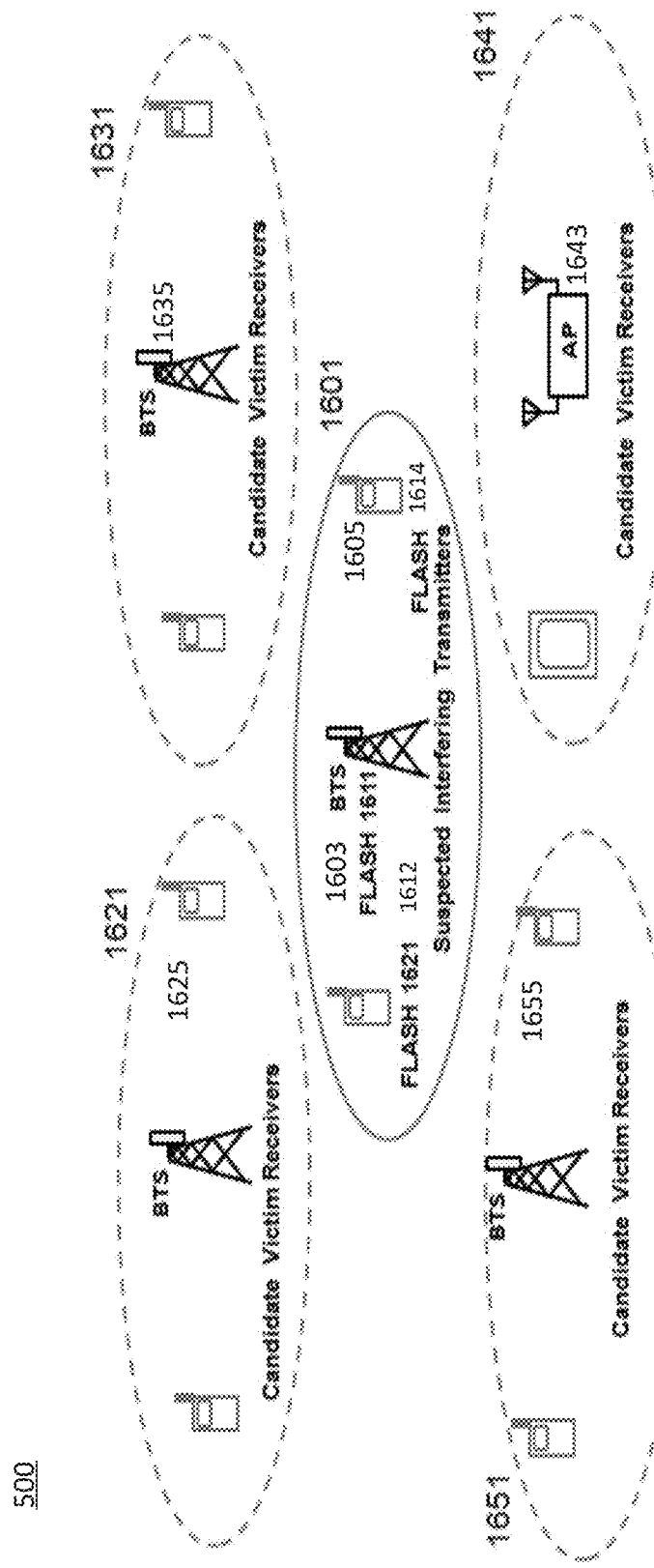
FIG. 5A is another example of an arrangement for measuring interference to a number of candidate victim devices in an ASA system.

FIG. 5A is another example of an arrangement for determining sources of interference with to a candidate system in the authorized shared access system. For example, FIG. 5A illustrates an implementation 500 in which the ASA controller 106 (not shown) uses one specialized signal waveform or one set of specialized signal waveforms from one set of suspected interfering transmitters in one coverage area 1601 to check interference levels to a number of candidate victim receivers simultaneously, especially if the candidate victim receivers are all of the same type, such as Wi-Fi, LTE or the like. For example, on the downlink, specialized signal (i.e. flash signal) 1611 from the suspected interfering device BTS transmitter 1613 in cell 1601 can simultaneously be measured by multiple MS stations (i.e. candidate victim devices) in nearby, candidate co-channel coverage areas 1621, 1631 and 1651. The candidate victim devices' receivers may all know, from the ASA controller 106, the appropriate communication channel (or RF frequency) to tune to, the timing, and other characteristics of the specialized signal. In fact, the ASA controller 106 may tailor the specialized signal waveform according to the communication channel, type of candidate victim device receiver (e.g., LTE or Wi-Fi), and the like. A separate specialized waveform may be transmitted for the dissimilar candidate victim receiver 1643 of coverage area 1641, since this may be, for example, a Wi-Fi-like device rather than LTE compatible device since all of the surrounding cells include an LTE BTS.

Alternatively, in response to a control signal from ASA controller 106, the potentially suspected interfering devices' transmitters (e.g., MSs 1603, 1605 and BTS 1615) may access a memory (e.g., internal or external, such as a server 103 or database 115) to retrieve the specialized signal waveform (e.g., waveform 1470 of FIG. 12). The retrieved specialized waveform may be, for example, from a list of specialized signal waveforms (e.g., each listed specialized signal waveform corresponding to each of the other types of air interfaces (e.g., Wi-Fi) that correspond to potential candidate victim devices). The use of the appropriate specialized signal waveform may, for example, allow for improved reception by the candidate victim receiver (or receivers) because it may better match the receiver characteristics in terms of bandwidth, modulation, or subcarrier occupancy (e.g., OFDM signals that are described more in the following paragraph). In some examples, these prerecorded specialized signal waveforms may include identifier information related to the transmitter in a data payload that uniquely identifies the potentially interfering transmitter.

If the transmitter type and the receiver type are of the same air interface (e.g., LTE) type, when, this particular specialized signal is received, the receiver can decode the signal, retrieve the unique identifier, and the specific interfering transmitter may be positively identified. However, if the receiver has a dissimilar air interface (i.e., the type of air interface between the transmitter and receiver are different) from a transmitting device, the receiver cannot demodulate or decode the received particular specialized signal. In this case, the receiver may associate a time stamp with the received specialized signal. The time stamp and measured parameters of the received specialized signal may be provided to the ASA controller 106 for processing to determine the identity of the suspected interfering device transmitter that transmitted the particular specialized signal. The ASA controller 106 may perform this processing because the ASA controller 106 included in a control signal the time that the transmitters in the interference monitoring trial were supposed to transmit their respective specialized signals. As a result, the ASA controller 106 may compare the received specialized signal time stamp provided by the victim receiver to a list of specialized signal transmission times (that were included as timeslot information in the control signals) and the respective suspected interfering device transmitter that was supposed to transmit a specialized signal at the listed time. Upon determining a substantially matching time in the list, the ASA controller 106 may identify the suspected interfering device that sent the received specialized signal.

Similarly, on the uplinks, specialized signals 1612 and 1614 from the MS transmitters 1603 and 1605, respectively in coverage area (i.e. cell) 1601 can simultaneously be measured by multiple BTS candidate victim device receivers (e.g., 1625, 1635 and 1655) in nearby, co-channel coverage areas 1621, 1631 and 1651. As mentioned above, the candidate victim receivers are provided with a control signal prior to the transmission of the specialized flash signal by the ASA controller 106. The provided control signal includes, for example, the appropriate channel (RF frequency) to tune to, the synchronization timing, signal format, and other characteristics of the respective specialized signal that is to be transmitted by the respective suspected interfering devices.

At this point, it may be appropriate to discuss the differences between TDD and FDD and their relationship to station assisted interference measurement. In general, the concept for station assisted interference measurements (SAIM) can be applied to either TDD or FDD air interfaces. For TDD, the implementation and controlling methodology is made simpler by the fact that all TDD-enabled transceivers operate for both transmit and receive functions on the same channel set. Therefore, every TDD-enabled station or device, regardless of whether it is a base station or a handset (e.g., for a cellular LTE air interface) or whether it is an access point or a served device (e.g., for a Wi-Fi type interface), is capable of both transmitting and receiving on any of the available channels. This is because each channel supports both downlink traffic (e.g., from base station to handset or from access point to served device) as well as uplink traffic (e.g., from handset to base station or from served device to access point). The method of segregating traffic is time domain multiple access (TDMA) and time slotting. For implementing SAIM, this has many advantages. For example, use of the SAIM methods by the system controller can concentrate on the base stations and access points as both transmitters (e.g., potential interferers as trial radiating devices) and also as receivers (e.g., potential victim receivers as sampling measurement devices) because the base stations and access points are at known fixed locations. Another advantage is that the ASA controller has a direct IP link via 'wired' connectivity and need not rely on a secondary wireless link to send messages to or receive messages from the base stations or access points. Similarly, the ASA controller need not communicate with the handsets nor served devices because the TDD base stations and TDD access points can serve as both suspected interfering device (i.e., trial) transmitters and as candidate victim device (i.e. trial) receivers.

In example implementations to measure possible interference between two dissimilar TDD air interfaces (such as, for example, an LTE system sharing a band with a WiMAX system), two measurement types may be made: 1) received signal strength of LTE base station (System 'A') trial transmissions (of specialized signals) into nearby (e.g., neighboring) coverage areas served by Wi-Fi access points, and hence measured by candidate Wi-Fi access point victim receivers (System 'B'), and 2) received signal strength of Wi-Fi access point (System 'B') trial transmissions (using specialized) into neighboring coverage areas served by LTE base stations, and hence measured by candidate base station victim receivers. (System 'A.')

Figure 5B:
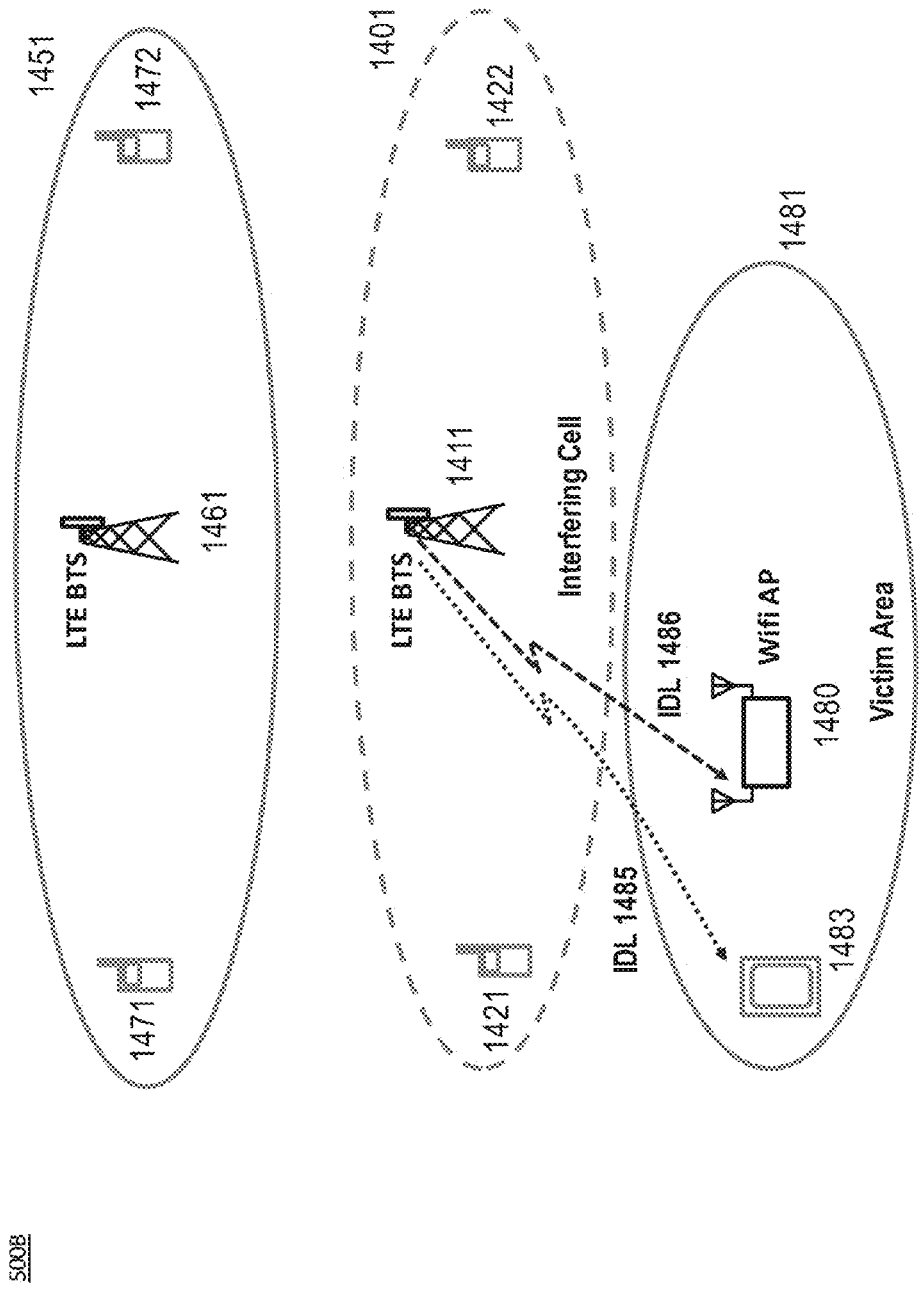
FIG. 5B is an example of a TDD arrangement for measuring downlink interference between a suspected interfering device within an interfering coverage area and a candidate victim device in another coverage area in an ASA system.
Figure 5C:
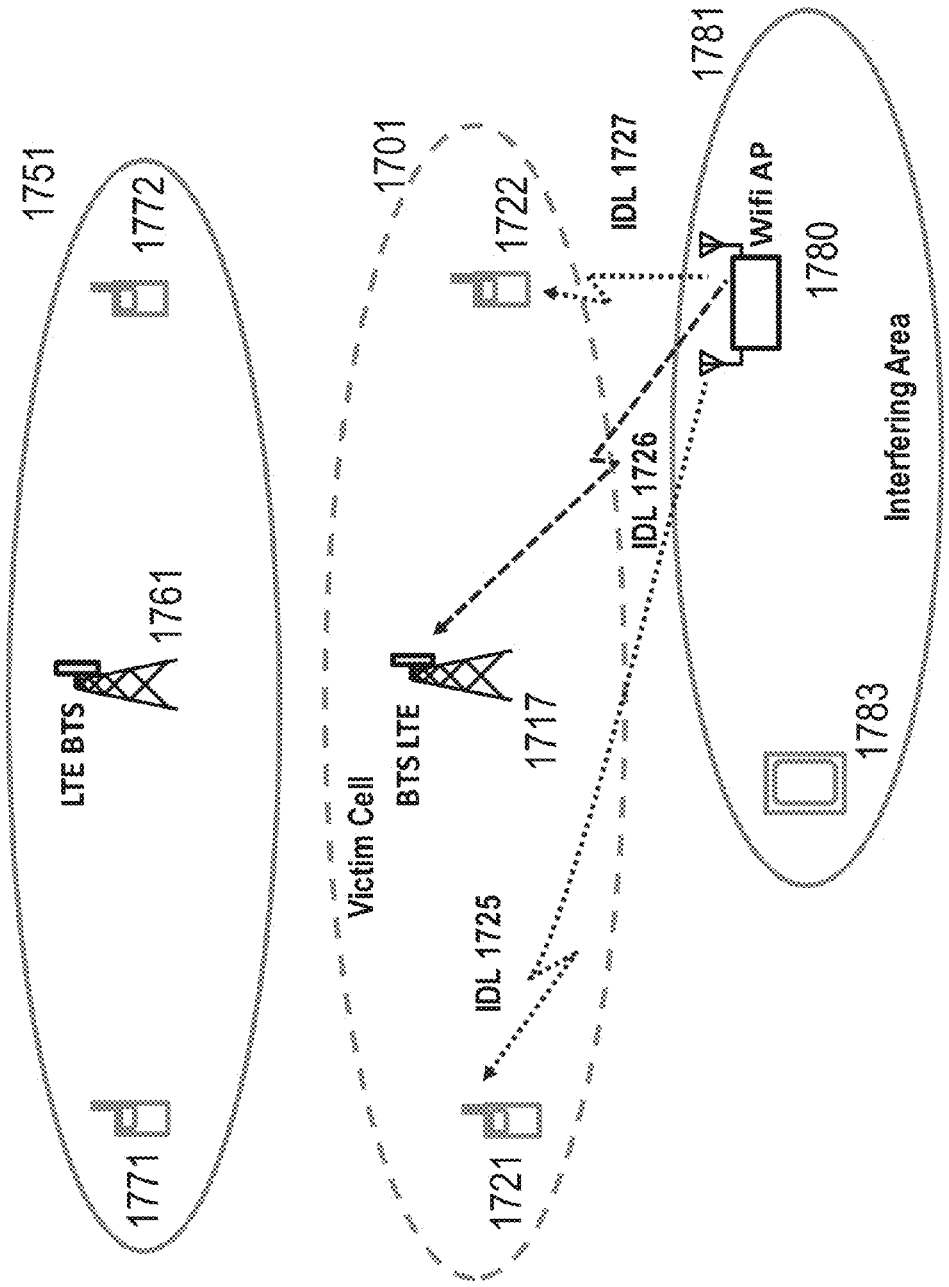
FIG. 5C is example of a TDD arrangement for measuring downlink interference between a suspected interfering device and a number of candidate victim devices in another coverage area of an ASA system.

FIG. 5B and FIG. 5C illustrate different measurement examples for TDD systems in which suspected interfering devices in nearby coverage areas and that have dissimilar air interfaces than candidate victim devices in a victim coverage area. With reference to both FIGS. 5B and 5C, the first system, System 'A,' is represented by an LTE system base station BTS 1411 and its served handsets, 1421 and 1422 while the second system, System 'B,' is represented by a Wi-Fi AP 1480 and its served end user devices (EUDs) 1483.

FIG. 5B illustrates the interference from the LTE interfering (coverage area) cell 1401, and its LTE base station downlink transmitter, BTS 1411, into the victim coverage area 1481 served by the Wi-Fi AP 1480. Under conventional TDD operation, conventional TDD downlink signals (not shown) may be transmitted to the LTE served handsets 1421 and 1422 from BTS 1411. These same conventional downlink signals may also appear as an Interfering DownLink (IDL 1485) signal to the Wi-Fi EUD device 1483 served by Wi-Fi AP 1480 in coverage area 1481. For conventional signal reception during the TDD downlink interval, EUD 1483 also receives such TDD downlink interference (IDL 1485).

However, during a TDD trialing transmission as described in the provided examples, EUD 1483 may not be used as a candidate victim receiver (measurement receiver) because the exact location of EUD 1483 is unknown and there is no direct internet protocol connection between the EUD 1483 and the ASA controller (not shown). As a result, EUD 1483 cannot simply receive the control signal directly from the ASA controller. In addition, although not shown, there is, possibly, more than one EUD served by the AP 1480 in coverage area 1481. In this case (TDD CASE 1), the Wi-Fi AP 1480 is used as the trial measurement (i.e. candidate victim device) receiver because the AP 1480 may represent the whole served coverage area 1481, and is at a known and reported location. Unlike FDD systems, in TDD systems, the Wi-Fi access point is capable of measuring downlink signals if the measurement timeslot is designated properly. In the example of FIG. 5B, the IDL 1486 may measurable by the AP 1480 during the trialing (i.e., specialized signal) transmission. During the trialing measurement timeslot, no data traffic is scheduled for receipt by the AP 1480 from any of the EUDs, such as 1483, served by the AP 1480. In certain examples, the Wi-Fi AP 1480 receiver may be used as a signal receiver during its own conventional downlink interval. That is, under conventional data traffic conditions, the Wi-Fi access point 1480 may radiate conventional data traffic during a respective timeslot. But, instead, the respective suspected interfering device and the candidate victim device participating in the trialing measurement campaign (that extends over a number of timeslots) as instructed by the ASA controller are not transmitting or receiving conventional data traffic. In the example of FIG. 5B, the Wi-Fi AP 1480 is the candidate victim device receiver during the suspected interfering device's (i.e., LTE BTS) 1411 TDD downlink transmission timeslot. During the TDD downlink transmission timeslot, the BTS 1411 transmits the specialized signal indicated in a suspected interfering device control signal. In this manner, both the trialing transmission (of the specialized signal from suspected interfering device 1411) and the trialing candidate victim reception (of the transmitted special by candidate victim device AP 1480) are performed from centralized (not distributed), known locations, and both the BTS 1411 and access point 1480 have connectivity (outside of the communication channel transmitting the control signal) to the ASA controller 106. Thus, the AP 1480 is not being used as a conventional data traffic TDD uplink receiver or conventional data traffic TDD downlink receiver during the trialing measurement timeslot of the IDL 1486 specialized signal.

Alternatively, the SAIM system via the ASA controller can instead instruct the trialing transmitter (i.e., the suspected interfering device), LTE BTS 1411 to radiate a downlink specialized signal during its conventional TDD uplink timeslot, and the candidate victim receiver 1480 would remain in its conventional TDD uplink interval to perform the trial measurement reception. The exact timing depends upon the synchronization between the two disparate systems. In some TDD examples, the LTE BTS 1411 does not transmit at a time interval different from its normal downlink TDD timeslot intervals to mitigate the potential interference to adjacent other cell TDD LTE base stations, such as 1461 serving area 1451.

FIG. 5C illustrates the interference from the Wi-Fi coverage area 1781, and its Wi-Fi AP downlink transmitter, AP 1780, into the victim coverage area (i.e., cell) 1701 served by the LTE BTS 1717. In this example, the Wi-Fi AP 1780 is the suspected interfering device and the LTE BTS 1717 is the candidate victim device. Under conventional TDD operation, conventional TDD downlink signals (not shown) would be transmitted to the Wi-Fi served EUD 1783 (and possibly other served EUDs (not shown)) from Wi-Fi AP 1780. These same conventional Wi-Fi downlink signals may appear as an interfering downlink signals (IDL 1725 and IDL 1727) into the adjacent cell's served LTE handsets 1721 and 1722 respectively. For conventional signal reception during the TDD downlink interval, handset 1721 may receive such TDD downlink interference (IDL 1725) and handset 1722 may by interfered with by IDL 1727.

However, during a TDD trialing transmission, it is not necessary to use either or both handsets 1721 and 1722 as candidate victim receivers (i.e., measurement receivers) because the exact location of the two handsets may be unknown. Also, neither has direct internet protocol connection to the ASA controller so are unable to receive control signals. In this case (TDD CASE 2), the LTE BTS 1717 may be used as the candidate victim device receiver since it is at a known and reported location. The measurements made by the LTE BTS 1717 receiver may be used to generate an interference metric(s) that represent interference to all devices in the whole served coverage area 1701. Unlike in FDD systems, in TDD systems, the LTE BTS 1717 receiver is capable of measuring downlink signals if the measurement timeslot is designated properly. During the interference trialing when measurement of the signal strength of the IDL 1726 takes place, the LTE BTS 1717 receiver may be used as a signal receiver during its own conventional downlink interval. That is, under conventional data traffic conditions, the LTE BTS 1717 may have been radiating conventional data traffic signals during this downlink interval. However, during the trialing interference measurement campaign (i.e. when specialized signals are transmitted and received) no conventional data traffic is carried during indicated timeslots by the trialing systems in the interference measurement campaign, the LTE BTS 1717 is used as a receiver during the suspected interferer Wi-Fi 1780 TDD downlink transmission interval during which 1780 transmits the specialized signal 1726. This downlink transmission interval corresponds to the timeslot information included in the control signal provided by the ASA controller. In this manner, both the trialing transmission (by suspected interferer 1780) and the trialing candidate victim reception (by BTS 1717) are performed at centralized (not distributed), known locations, and both the Wi-Fi AP (transmitter) 1780 and LTE BTS 1717 (receiver) have connectivity (over a different communication path from the trialing communication path) to the controller. Thus the LTE BTS 1717 is not being used as a conventional data traffic TDD uplink receiver or conventional data traffic TDD downlink receiver during the trialing measurement interval. Note that conventional data traffic may include voice data. Instead, the SAIM system can instruct the trialing transmitter, Wi-Fi AP 1780 to radiate a downlink specialized signal during what would be its conventional data traffic TDD uplink timeslot, and the candidate victim receiver 1717 would remain in its conventional data traffic TDD uplink timeslot to perform the trial measurement reception. The exact timing indicated by the timeslot provided in the respective control signals depends upon the synchronization between the two disparate systems. However, in some examples, the Wi-Fi access point 1780 may transmit at a time interval that is the same as its normal downlink TDD timeslot intervals, which mitigates interference to adjacent other cell Wi-Fi TDD access points and LTE base stations, such as 1761.

It is noted that by using unconventional reception timing for TDD access point reception and base station reception, TDD candidate victim receptions can be made during suspected interferer's downlink trialing transmission intervals (timeslots), when the specialized signal is radiated. In some examples, the suspected interfering device may radiate the specialized (trialing flash) signal during the conventional TDD downlink interval (timeslot) to avoid causing unnecessary interference with other nearby systems. In other examples, the candidate victim receiver timing may be switched from their conventional TDD timeslotted behavior during the reception timeslot, with minimal impact to other nearby systems. Thus it is not necessary, in TDD systems, to rely on the mobile devices (such as the EUDs and handsets) for either the downlink trialing receptions or any trialing uplink transmissions. Note that because the same frequency channel is used for TDD uplink and downlink, there are half as many measurements to make (compared to FDD implementations described in more detail below), as the uplink and downlink path losses are the same since the same frequency channel is used. In another example, the distributed handsets of EUD devices may be used as either distributed victim receivers or as distributed suspected interfering devices is to explore performance at the edges of large cells or coverage areas, since the measurements obtained at the centralized (i.e., central with respect to the respective coverage area) BTS or APs might not convey difficulties and near-far effects at the edges of cells or coverage areas. If desired, all four types of measurements can be made, as described for the FDD systems, where uplink and downlink must be treated separately, as described below.

Examples of SAIM methods can also be applied to FDD signals (described in more detail with reference to FIGS. 6-9), but in these cases the ASA controller makes separate measurement campaigns for downlink and uplink operations. This is because in FDD systems, each transceiver has a separate uplink and downlink band. For example, for LTE, a base station transceiver may transmit on the downlink communication channels (i.e., frequencies) to a handset. The handset responds by transmitting response signals on the uplink communication channels (which, in FDD, are different from the down link communication channels) to the base station receiver. Thus, the LTE base station transceiver design has a downlink transmitter and an uplink receiver. Conversely, the LTE handset transceiver has a downlink receiver and an uplink transmitter. Therefore, the base station cannot receive (i.e., listen for) signals in the downlink band, nor can the base station transmit signals in the uplink band. Conversely, the LTE handset cannot receive (i.e., listen for) signals in the uplink band, nor can the handset transmit signals in the downlink band. Thus for the purposes of transmitting and receiving specialized FDD signals in both downlink and uplink bands, the SAIM system uses both handset and base station transceivers in FDD implementations.

Thus, for two dissimilar FDD air interface systems (for example an LTE system sharing a band with a 802.16 WiMAX FDD system), four separate measurements may be made: 1) received signal strength of LTE base station downlink trial transmissions (using specialized signals) into neighboring coverage areas served by WiMAX access points, and hence measured by candidate WiMAX served devices victim receivers (shown in FIG. 6), and 2) received signal strength of WiMAX downlink access point trial transmissions (using specialized signals) into neighboring coverage areas served by LTE base stations, and hence measured by candidate LTE handset victim receivers (shown in FIG. 7), 3) received signal strength of LTE handset uplink trial transmissions (using specialized signals) into neighboring coverage areas served by WiMAX access points, and hence measured by candidate WiMAX access point victim receivers, (shown in FIG. 8) and 4) received signal strength of WiMAX uplink served devices trial transmissions (using specialized signals) into neighboring coverage areas served by LTE base stations, and hence measured by candidate base station victim receivers (shown in FIG. 9).

In the FDD implementation, use of these four different measurements makes the process for the ASA controller a bit more complex, as the ASA controller uses or makes separate measurements for uplink and downlink, and uses both fixed devices (i.e., base stations or access points at known locations with direct IP connectivity) and mobile devices (i.e., handset devices or served devices, at known or unknown locations, and without direct IP connectivity) to send or receive specialized signals. In some air interfaces (such as CDMA IS-95 or LTE) the handset (e.g., EUD) itself may have geo-location capabilities, so, in such an example, the handset location is known. However, this data may be stale (i.e., old and inaccurate) due to timing or imprecise (e.g., some self-locating methods are not that accurate). In other air interfaces, such as WiMAX or Wi-Fi, the EUDs (i.e., served devices) have no self-location capabilities. Also, the handsets and served devices take advantage of the wireless connectivity, and as such are untethered, and therefore they have no wired IP connectivity directly to the controlling ASA controller, and instead, the handsets or served devices is controlled via the air interface channel itself. The handsets of served devices may be controlled via messages from the serving base station (for LTE handsets, for example) or the serving access point (for WiMAX served devices, for example), and thus the controlling messages (e.g., controls signals that contain specialized signal information and other information for an interference measurement campaign) from the ASA controller are passed through the respective base stations (or APs) to the respective handsets (or served devices).

For example, in an FDD implementation, the ASA controller selects potential interfering devices (i.e., trial transmitters) and candidate victim devices (i.e. trialing receivers). Interference measurement campaigns may be conducted in two phases, for example: examination of cross system downlink interference and examination of cross system uplink interference. The order of the two phases may be arbitrarily selected or chosen based on some criteria.

The following example (described with reference to FIG. 6) uses two systems as illustrative examples for FDD systems, but other FDD systems (e.g., FDD to FDD interference or even TDD to FDD interference scenarios, or FDD to TDD interference scenarios) are envisioned. Thus, for two dissimilar FDD air interface systems (in this example, an FDD LTE system sharing a band with a 802.16 WiMAX FDD system is used for illustrative purposes), the four separate measurement sequences may be as follows:

In a first of the four separate measurement sequences, a LTE base station downlink trial (i.e., specialized signals) transmissions are transmitted into neighboring coverage areas served by WiMAX access points, and, in response to receiving the specialized signals, the received signal strength is measured by a selected candidate WiMAX victim devices. For example, the ASA controller may first identify a candidate WiMAX victim device defined by the WiMAX served area. For the downlink, the identified area may support more than one served device. For example, in a household setting, there might be one or more fixed, WiMAX served devices (such as video players, music players, automated household appliances, stationary computers, and the like). Thus, the measurement campaign may use specialized signal transmissions from another nearby system having a different air interface, such as a nearby LTE base station. The ASA controller, for example, may send channel information, timing information, and a waveform type indication to the suspected potentially interfering LTE base station transmitter. Via the serving WiMAX AP, the ASA controller may also send (i.e., inform) the multiple served WiMAX devices of the intended channel and intended time, as well as the optimum, or at least closest-to-optimum, receiver settings (based on characterization information of the receiver as determined by testing of the receiver), in order to detect the specialized signal. The multiple candidate victim receivers would measure the received specialized signal power levels, and then, via the WiMAX AP, report back their measurements. The measurement reports could be individualized for each candidate victim device receiver, or could be batched or grouped to represent an average, composite, or worst case assessment for the particular WiMAX AP considering all of its own served devices. In some examples, the average or worst case assessment is chosen to represent the whole area for the one serving WiMAX AP, as the ASA controller overall does not care about the interference to or from individual served devices. Because the local WiMAX serving AP autonomously serves its own served devices, the ASA controller does not differentiate among the served devices in this case, and may establish one or more interference metrics for the entire served area by that one specific WiMAX AP. The one or more interference metric (e.g., average or worst case value) may be later reported back to the ASA controller to represent the interference from the trialed (i.e. candidate victim receiver) base station to the area served by the candidate victim WiMAX AP device.

FIG. 6 (FDD Case 1: System A downlink interference into nearby System B) illustrates the above FDD downlink example. In the system 600, the coverage areas 1851, 1801 (System A) and 1881 (System B) are shown. In the illustrated example, the LTE BTS 1811 is the potential interfering device and will be transmitting the specialized flash signals. During normal operation, the LTE BTS 1811 serves its served handsets (1821 and 1822) on the downlinks shown (DL 1826 and DL 1828). These same signals also create interference to other nearby systems, here shown as interfering down link (IDL 1885) to the WiMAX served device's 1883 downlink receiver in the victim coverage area 1881. During a trialing (i.e. interference monitoring) measurement, the specialized signal may be radiated by base station 1811. In this example, the candidate victim downlink sampling receiver is WiMAX device 1883. The measurement report may be conveyed back to the ASA controller (not shown) via the WiMAX serving AP 1880.

Note that if the two systems were not dissimilar, and the ASA controller had determined that the WiMAX system might receive interference from another nearby same type WiMAX system, then the control signal to the suspected potentially interfering transmitter (in this case another WiMAX AP rather than an LTE base station) may include an embedded unique identifier such that each of the candidate victim WiMAX served devices (e.g., EUDs, handsets or the like) can not only measure the received signal strength (on the known frequency and at the known time) of a transmitted WiMAX specialized signal, but also receive, demodulate, and decode the WiMAX specialized signal trial payload, and hence report back to their serving WiMAX AP the potentially interfering transmitter identifier value. The identifier value, when relayed to the ASA controller, can be used by the ASA controller to unambiguously determine which candidate potentially interfering device was in fact the transmitting source, removing any possible ambiguity. The unique identifier is usually obtained when the transmitted specialized signal is demodulated and decoded properly. Note that when the air interfaces are different, the raw power measurement and the identity of the interferer may be deduced by knowing (based on information accessible to the ASA controller) the exact communication channel and time information, and with knowing that no other systems were radiating at that time.

Similarly, in FIG. 6, downlink interference from LTE cell 1851 into the WiMAX served area 1881 could also be trialed (i.e. monitored for interference), in this case using specialized downlink signals transmitted from the suspected interferer base station 1861. Again, reception of the specialized signal at the WiMAX served device 1883 would be conveyed back to the ASA controller via the WiMAX AP 1880.

If WiMAX AP 1880 served other devices, not shown, the other devices may also provide specialized signal reception reports. Because the ASA controller may not wish to differentiate among the multiple WiMAX served devices, in this case, and would rather establish a single interference metric for the entire served coverage area (i.e., 1881) for that one WiMAX AP 1880, the individual measurements may be combined to form a single metric representing the entire victim coverage area 1881. The single interference metric (e.g., average path loss of multiple served devices or the worst case path loss value) may be later reported back to the ASA controller to represent the interference of the trialed LTE base station 1811 on the coverage area 1881 served by the selected candidate victim WiMAX AP 1980 and the multiple served devices.

FIG. 7 (FDD Case 2: System B downlink interference into nearby System A) illustrates another downlink example. In the illustrated example, a WiMAX AP 1980 is the potential interfering device into the LTE system. In the system 799, the coverage areas 1951, 1901 (System A) and 1981 (System B) are shown. In the illustrated example, during normal operation (i.e. when not performing interference monitoring), the AP 1980 serves EUD device 1983 via the downlink signal DL 1989. The downlink signal DL 1989 also potentially creates interference to other nearby systems via interfering downlinks (IDL) 1985 and 1987 to the BTS served handsets' 1921 and 1922 downlink receivers in the victim coverage area 1901. During an interference measurement trial, the specialized downlink signal is transmitted by AP 1980. The handsets 1921 and 1922 acting as candidate victim downlink sampling receivers, and, depending upon range, they may or may not receive the specialized signals transmitted by AP 1980, but may report a RSSI for downlink signals received at the intended time and communication channel of the transmitted specialized signals.

In the downlink example of FIG. 7 the downlink access point 1980 in coverage area 1981 (System B) may transmit specialized signal transmissions into neighboring coverage areas served by LTE base stations (e.g., 1951), and hence measured by candidate handset victim receivers. The ASA controller, for example, may first identify a candidate victim area defined by the LTE base station cell area. For a large (coverage area) cell, the coverage area may support a large number of handset devices, in which several handset devices are near to the base station, and several others are further away at cell edge. Thus the measurement campaign for assessing downlink interference into the coverage area may consider the worst case interference or some average of several interference measurements. The worst case interference may be defined by an LTE handset that was furthest from the base station (for example, handset 1921 at the edge of coverage area 1901 (System A)) and nearest (e.g., handset 1922) to a nearby WiMAX access point 1980 radiating downlink signals. Thus the trial interference measurement campaign would use one trial (i.e., specialized signal) transmission from a nearby, other system, having a different air interface, such as the nearby WiMAX access point 1980 as the potential suspected interfering device and the handsets 1921 and 1922 may be used as candidate victim devices. For example, the ASA controller may send communication channel information, timing information, and waveform type indication to the trialing WiMAX access point interfering transmitter. In the case of the candidate victims, the ASA controller may also send to (or, otherwise inform) the multiple served LTE handsets (1921 and 1922) the intended channel and intended time, as well as the optimum (i.e. characterized) receiver settings (e.g., sub-block filter settings, intermediate frequency (IF) bandwidth, demodulation type, timing information and the like), in order to optimize the respective handset receivers for detecting the specialized signal. At the indicated time and on the indicated communication channel, the multiple candidate victim handset receivers (e.g. 1921 and 1922) may measure the received power levels of the specialized signals received at the indicated time and communication channel. The respective handsets 1921 and 1922 may report back, via the base station 1911, their measurements to the ASA controller.

The measurement reports transmitted to the ASA controller may be individualized for each victim receiver, or could be batched or ganged to represent an average, composite, or worst case assessment for that base station served coverage area 1901 (System A) based on the reported measurement values from all of handsets served by the base station 1911. In an example, the average or worst case assessment may be chosen to represent the whole area for the one base station 1911 (i.e., serving the victim LTE handset devices 1921 and 1922) because in the overall interference monitoring program determining the downlink interference experienced by the served handsets 1921 and 1922 may be more important than determining the uplink interference experienced by the individual base station 1911 itself. Because the local base station autonomously serves its own served handsets, the ASA controller does not differentiate among the served handsets in this example, and may establish a single interference metric for the entire coverage area 1901 served by the respective base station 1911. The single interference metric (e.g., average value or worst case value) may later be reported back to the ASA controller to represent the interference from the trialed WiMAX AP 1980 to the victim LTE handset receivers 1921 and 1922 in the served coverage area 1901.

In the example, an LTE handset, such as 1921 and 1922, receives the downlink specialized signal from neighboring coverage area 1981 served by WiMAX access point 1980. The ASA controller (not shown) may first identify a candidate victim coverage area defined by the coverage area 1901 served by the base station 1911. Other adjacent WiMAX coverage areas (not shown) may also be interferers, but they would be represented by their own individual WiMAX APs. The victim of the interference from an adjacent WiMAX AP area, such as base station coverage areas 1901 and 1951, may come from multiple interfering WiMAX APs, such as 1983 and others (not shown). On the downlink, the victim receivers are LTE handsets, such as LTE handsets 1921 and 1922 that represent victim area 1901, and LTE handsets 1971 and 1972 that represent victim area 1951. For handsets 1921 and 1922, their downlink reception measurements may be reported back to the ASA controller via base station 1911, and metrics determined from the reported downlink measurements may represent downlink interference for cell 1901. For handsets 1971 and 1972, their downlink reception measurements may be reported back to the ASA controller via base station 1961, and metrics determined from the reported downlink measurements may represent downlink interference for cell 1951.

Thus the downlink interference measurement campaign for assessing downlink interference into the nearby LTE base station served coverage areas 1901 and 1951 may also need to consider specialized signal downlink transmissions from a number of WiMAX APs (not shown), as well as into a number of handsets, such as, for example, the multiple handsets 1921 and 1922 to assess interference to cell area 1901, as well as handsets 1971 and 1972 to assess interference to cell area 1951. The worst case scenario, in this example, may be defined by an LTE handset that was furthest from its own serving base station (at cell edge), such as handset 1922, and thus receiving its weakest downlink signal (DL 1928) from its far away base station 1911, while at the same time being close to interfering WiMAX access point 1980 (i.e., proximity favors reception of the interference). Thus the trial interference measurement campaign may use multiple victim receiver receptions from nearby handsets, such as 1922 or 1921 in the one LTE cell of interest (i.e., potentially interfered with cell/coverage area), such as 1901, as well as a multiple trial transmissions from other WiMAX access points (not shown) in other WiMAX coverage areas (not shown). In this example, that ASA controller (not shown), via the various serving LTE base stations' downlinks (e.g., DL 1926 or DL 1928), may send channel information, timing information, and waveform type indications to the candidate victim downlink receivers (i.e., the multiple LTE handsets (e.g., 1921, 1922, 1971 or 1972)) for receiving the specialized signals. Continuing with the example of FIG. 7, the ASA controller also sends the intended channel and intended time, as well as the optimum transmitter settings for the specialized 'flash' signal, in order to more likely detect the specialized signal at the candidate victim receivers. The receivers of the candidate victim handsets, in this example, LTE handsets 1921, 1922, 1971 and 1972 measure the specialized signal power levels and reports back the measurements to the ASA controller via their respective base stations 1911 and 1961.

The measurement reports may take a number of different forms. For example, the measurement report may be individualized for each trialed (i.e. specialized signal) AP transmission, or may be batched or ganged to represent an average, composite, or worst case assessment for the particular candidate victim base station 1911 and its served coverage area 1901 with respect to all the different potential (or actual, based on the RSSI measurements) sources of interference (i.e., the respective WiMAX Access Points (e.g., 1980 and others, not shown) emitting the specialized downlink signals). Most likely an average or worst case assessment is chosen to represent the whole LTE base station coverage area 1901 for the one serving base station 1911, as the ASA controller overall does not care about the individual LTE handsets 1921 and 1922, and it may not know their exact locations. Thus the ASA controller may have to average several measurements from several handsets to come up with a composite average for the area 1901.

FIG. 8 (FDD Case 3: System A uplink interference into nearby System B) illustrates an example of an FDD uplink interference assessment. Here we assess uplink interference from the LTE system (such as BTS 2011 and handsets 2021 and 2022) into the coverage area 2081 (System B).

LTE handset 2022 or 2021 or both may be a potential interferer, and the trialing radiators (i.e. transmitter of a specialized signal) in an interference measurement campaign, in an uplink communication in coverage area 2001. Alternatively, handsets 2071 and 2072 in LTE cell 2051 can also be considered separately. During normal data and/or voice communications, the handset 2022 communicates with the serving LTE base station 2011 on the uplink UL 2026. This same signal also creates interference to other nearby systems, here shown as interfering up link (IUL 2085) to the WiMAX access point's 2080 uplink receivers in the victim coverage area 2081. For example, during a trialing (e.g. transmission and detection of specialized signals) measurement campaign, the handset 2022 (or one or more of handsets 2021, 2071, or 2072) may transmit a specialized signal unique to handset 2022. If other handsets are participating in the campaign, the other handsets may transmit a specialized signal unique to the respective other handset at their unique times. The candidate victim uplink sampling receiver may be, for example, WiMAX AP 2080 in coverage area 2081. Because this is an FDD uplink example, there is only one physical and logical uplink victim receiver location for the coverage area 2081, which is WiMAX AP 2080. The FDD WiMAX served device 2083 does not have an uplink receiver, and only transmits an uplink communication UL 2085.

For measuring interference from LTE coverage area 2001 (System A), multiple uplink trialing transmitters may be used. These would be represented by all the served handsets of base station 2011. The ASA controller would first identify coverage area 2001 as a potential interference source, and then send, via base station 2011, controlling signals to the uplink transmitters in the handsets, such as handsets 2021 and 2022. In the illustrated example of FIG. 8, two handsets 2021 and 2022 are shown, but there may be more or less. Each handset in turn would radiate its own uplink specialized flash signal waveform. Under instruction from the ASA controller, WiMAX access point victim receiver 2080 would also be instructed to listen on the appropriate channel(s) at the appropriate time(s) that the uplink specialized flash signal waveform is transmitted, and send its measurement report or reports back to the ASA controller. To represent all the interference from cell 2001, an average, composite or worst case reception report may be used to represent all the interference received from handsets 2021 and 2022 and other handsets (not shown). A similar measurement campaign could be repeated to assess uplink interference from cell 2051 by employing specialized signals radiated from uplink transmitters in handsets 2071 and 2072 and other handsets in cell 2051. In this example, uplink interference is measured at a single candidate victim receiver 2080 that represents the entire WiMAX coverage area 2081. A final interference metric with respect to coverage area 2081 may be the worst case received from the handsets in coverage area 2051, or an averaged value.

In the illustrated example of FIG. 8, the LTE handsets 2021 and 2022 may receive control signals from the ASA controller via base station 2011 and its downlinks (not shown) to the handsets. The handsets 2021 and 2022 may transmit specialized signals that may be received in neighboring coverage area 2081 served by WiMAX access point. If the respective LTE base stations 2011 and 2061 are participating in the interference measurement campaign, each LTE base station 2011 and 2061 may have transmitted a control signal from the ASA controller. In this example, the respective LTE base stations 2011 and 2061 forward the control signals to the respective suspected interfering device handsets 2071, 2072, 2021 and 2022. The control signals may include information identifying a communication channel and an indicated time at which the specialized signals unique to the interfering LTE handset 2021 or 2022 will be transmitted. As a result, the candidate WiMAX AP candidate victim m receiver 2080 is able to receive and measure the transmitted unique specialized signals. In an example implementation, the ASA controller may first identify a candidate victim receiver in an area defined by the coverage area 2081 such as the WiMAX AP 2080. The ASA controller may then identify more than one potential interferer, such as cell 2001 and also cell 2051. These two cells are controlled by their respective base stations 2011 and 2061, which must relay downlink control signals to the uplink trialing radiators (their multiple respective handsets) of interest. Because the LTE base station cell may support more than one served handset (e.g., 2022 or 2021), the uplink transmissions are distributed within cell 2001. In this example, other adjacent LTE cells (e.g., within coverage area 2051) may also contain suspected interfering devices, but are represented by their own individual base station, such as LTE BTS 2061, and their own respective handset uplink radiators, 2071 and 2072.

FIG. 9 (FDD Case 4: System B downlink interference into nearby System A) illustrates another example of FDD uplink interference. In this example, an EUD 2183 of a WiMAX served coverage area 2181 (System B) may cause interference into a nearby coverage area, such as LTE coverage area 2101 served by an LTE BTS. In the illustrated example, the WiMAX served EUD 2183 is a potential interferer during uplink communications. During normal data and/or voice communications, the served EUD 2183 communicates with the serving WiMAX AP 2180 on the uplink UL 2189. This same data and voice communication signals may also create interference to other nearby systems. For example, the signal is shown as interfering up link IUL 2185 to the LTE base station's 2111 uplink receivers in the victim coverage area 2101 (System A). The interfering uplink IUL 2185 may also cause uplink interference to the next LTE cell area 2151 and its serving base station 2161.

During an interference measurement campaign, a specialized uplink signal may be radiated, for example, by WiMAX served device and suspected interfering device 2183. The candidate victim uplink sampling receiver may be the base station receiver 2111. In this example, the ASA controller, via the serving WiMAX AP 2180 downlink signals, may send control signals containing channel information, timing information, and waveform type indication to the multiple potentially interfering WiMAX served devices, one of which is shown as WiMAX served device 2183. The WiMAX served device 2183, as a suspected interfering device may transmit unique specialized signals via the respective devices' uplink interfering transmitters. There may be multiple WiMAX served devices (not shown) within the one considered interfering coverage area (such as coverage area 2181). Also, there may be multiple other WiMAX access points in their own nearby coverage areas (not shown) that may also be suspected interferers.

The specialized signals may be unique to the respective suspected potentially interfering WiMAX served devices' uplink transmitters. The ASA controller also sends the single candidate victim LTE base station 2111 the intended communication channel on which and intended time at which the specialized signals are to be received from each of the respective suspected potentially interfering devices, as well as the optimum, or nearest-to-optimum, receiver settings, in order to better detect the respective unique specialized signal. Also, concurrently, using the same radiated uplink specialized flash signals at the same times, other potential uplink victim receivers, such as base station 2161 uplink receiver in area 2151, can also make simultaneous uplink reception signal strength measurements of specialized signals transmitted by suspected interfering (and WiMAX served) device 2183. The candidate victim receiver for the coverage area of interest (e.g., 2101 or 2151) may measure power levels of any received specialized signals and report the measurements to the ASA controller.

In some examples, control signals provided by the ASA controller to the respective candidate victim devices expecting to receive the respective specialized signals may also include specific cross air interface receiver settings to be applied to a receiver in order to better receive the signal. Also, control signals provided by the ASA controller to the respective candidate victim devices expecting to receive the respective specialized signals may also include specific cross air interface receiver calibration coefficients which are applied to the receiver's measurements in order to compensate for errors due to transmitter-to-receiver mismatches. On uplink, a single centralized base station uplink receiver may make specialized signal measurements that may be used to represent the entire victim coverage area of interest. For the interferer, such as served device 2183 in coverage area 2181, multiple served devices (not shown) may be used as trialing transmitters, each transmitting specialized signals at a unique respective time, and including a unique identifier of the respective served device. Multiple trialing transmitters may be used to represent the WiMAX served area (i.e., coverage area 2181) to assess the average or worst case interference from all of the served EUD devices.

At this time, a brief summary of FDD systems may be appropriate. In FDD systems, the transmitters and receivers may be either distributed (such as handsets or served devices) or centralized (such as base stations or access points). In FDD systems, the uplink reception and the downlink transmission are centralized at the base station or access point, whereas the uplink transmission and downlink reception are distributed at all the served devices (handsets or EUDs). Therefore downlink trials (potential interferer) can be accomplished from one centralized transmitter, where there may be multiple candidate victims in other cells, and uplink trials (candidate victim) can be accomplished with one centralized receiver, where there may be multiple potential interferers from other cells. On the other hand, FDD uplink trials (potential interferer) must be performed from distributed handset or EUD transmitters from the interfering cell, where there may be multiple candidate victims at centralized locations in the victim cell. FDD downlink trials (candidate victims) must also be performed at multiple distributed receivers in the victim cell or cells, where there may be centralized potential downlink interferers from one or multiple interfering cells.

In a brief summary of TDD systems, the transmitters and receivers may be centralized (in base stations or APs) as these base station and AP devices may make both uplink and downlink signal transmissions and uplink and downlink signal receptions. Therefore downlink trials by potential suspected interfering devices can be accomplished from one centralized transmitter for the interfering cell, where there may be multiple centralized candidate victim receivers in other cells. Uplink trials by candidate victim devices can be accomplished with one centralized receiver(s) in the victim cell(s), where there may be multiple potential interferers from centralized transmitters in other cells. For TDD systems, decentralized, distributed EUDs or handsets for transmission of trialing signals nor the reception of the specialized signals may not be used.

Figure 10B:
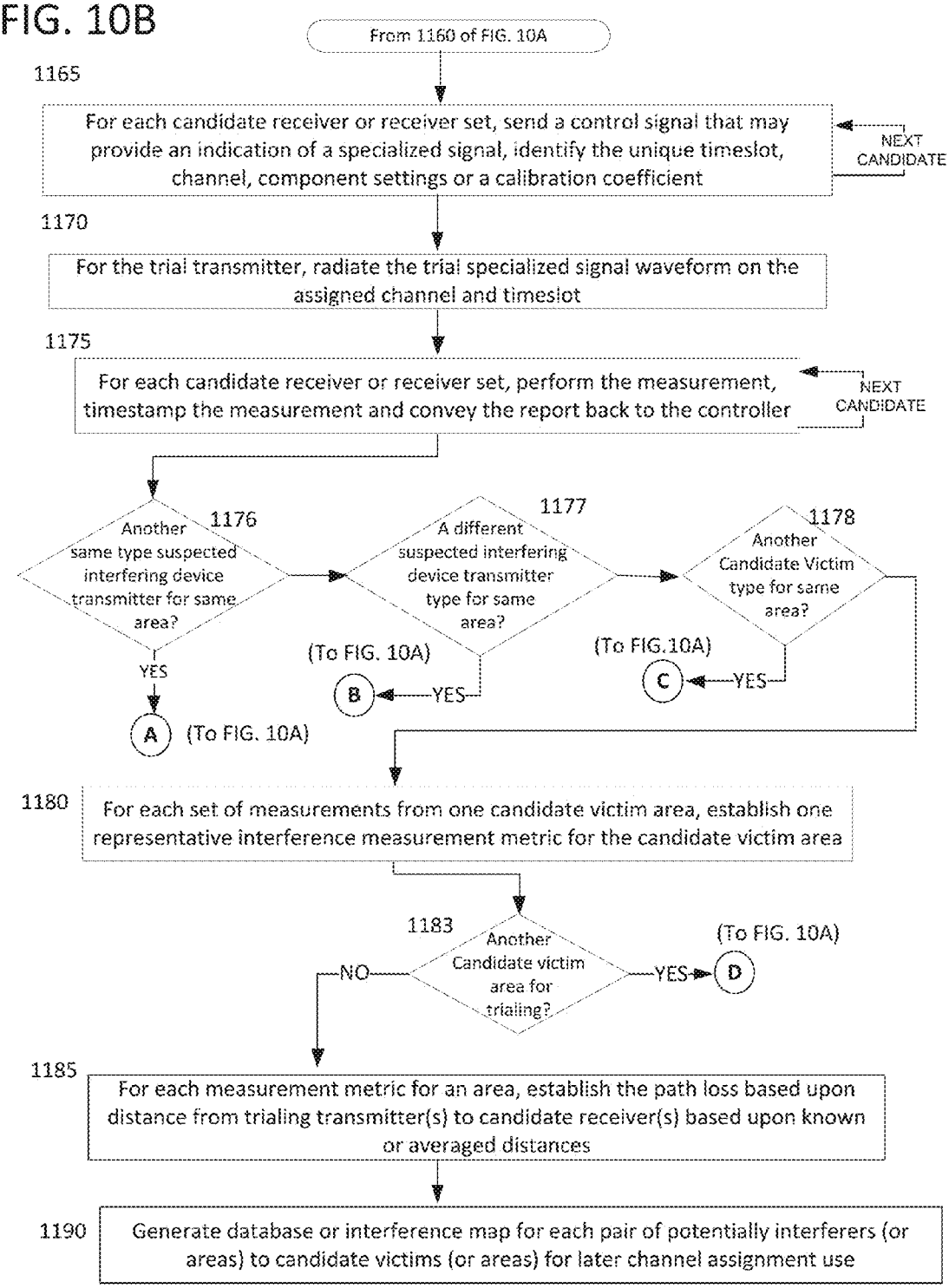

A more detailed discussion of an implementation of the disclosed example may be provided with reference to FIGS. 10A and 10B. FIGS. 10A and 10B illustrate a flowchart of an example of a process implemented by the system. For example, one or more ASA controllers 106 may select a candidate victim coverage area for examination (1110). If there are multiple different systems, different air interfaces and hence different device types within the selected candidate victim coverage area, the ASA controller selects a candidate victim device type for examination (1120) (e.g., an AP). For example, there may be a number of separate devices within the identified victim coverage area of interest. The candidate victim device(s) may be selected based on the signal types, such as a TDD link, an FDD uplink or an FDD downlink, being assessed for interference at the candidate victim receiver.

In an example, the candidate victim device(s) may be equipped to process an LTE-like signal or a Wi-Fi-like signal. For example, the ASA controller 106 may be scheduled as requested by a higher level controller or by a ASA system device (e.g. a BTS or AP), or for some other reason, to perform SAIM in a certain type of communication medium or format, such as Wi-Fi-like or LTE-like signal type. In certain implementations, the BTS, AP, MS (i.e., handset) or EUD devices may have multiple receivers, transceivers, or combinations thereof that are capable of receiving signals in different communication formats (i.e. signal types, such as Wi-Fi-like or LTE-like compatible signals). Upon selecting the candidate victim device receiver type at 1120, the ASA controller 106 may access a database, such as ASA database 115, that includes information related to other devices in the ASA system, such as, for example, location information of other devices and an identifier of the other devices, signal power level, type of device (e.g., BTS or AP), and the like, in order to select a specific candidate victim receiver or a set of candidate victim receivers.

After the candidate victim device receiver type is selected, the ASA controller may select a specific candidate victim device (receiver) or set of candidate victim devices for the measurements (1130). Alternatively, the ASA controller may select multiple same device type receivers (e.g., LTE BTSs 1761 and 1717 of FIG. 5C) in the areas of interest, because multiple simultaneous receptions can be made from one single transmission of a specialized signal.

Once the specific candidate victim device (or set of similar devices) in the area of interest is identified, the ASA controller identifies which other devices in the area or in the surrounding areas may be potential suspected interfering devices (1140), such as, for example, Wi-Fi AP 1780 of FIG. 5C.

For example, using location information such as GPS coordinates, triangulation location results, or other location identifying information (e.g., street address, landmark name or the like), the ASA controller 106 may identify a subset of transmitting devices that, depending on the case (e.g., rural or urban), are nearby, or, in other words, within a range (e.g., 10 meters to 10 kilometers), such that the subset of transmitting devices may potentially interfere with the selected candidate victim receiver(s). From this subset of transmitting devices, a list of potentially interfering devices may be chosen for further interference investigation and trial.

Based on an analysis of the database, the ASA controller 106, may, for example, determine suspected interfering (i.e., transmitting) devices from among the subset of devices in the plurality of devices in the shared access system that are nearest neighbors to the selected candidate device victim receiver. A determined suspected interfering device may be a transmitting device that is suspected of interfering (or potentially interfering) with the candidate victim receiving device. For example, the suspicion that a transmitting device is interfering with another device may arise from past interference or error rate information obtained from another victim device that is nearby the selected candidate victim receiver. Alternatively, the determination of the suspected interfering device may be based on a lack of information regarding the potential interference of the suspected interfering device. For example, the suspected interfering device may be new to the network or an interference trial was not recently (or ever) conducted for the selected candidate victim receiver. In the described examples, one or more candidate devices' receivers may be selected for trial by the ASA controller 106 or ASAS 105.

There may be more than one suspected interferer device type, and for any interferer device type (e.g., LTE, WiMAX, Wi-Fi and the like), there may be one or more interfering devices of that type present in the interfering areas. For each pair of device types (e.g., suspecting interfering device type (e.g., Wi-Fi AP 1780) and candidate victim device type (e.g., LTE BTS 1717), a specific specialized waveform (at the transmitter) and receiver settings (at the receiver) are chosen to optimize cross-air-interface reception for this pair of device types (Wi-Fi AP 1780, LTE BTS 1717) (1150). In other examples, a specific calibration coefficient may also be identified for application to the received signal measurement value, and this calibration coefficient is also specific for the pair of device types.

For this pair of device types, the ASA controller may send control signals to each separate selected suspected interfering device that is to be trialed, informing it via the appropriate communication links, of the communication channel to use, the timeslot to use, and the specialized signal waveform to use for its specific trialing transmission (1160).

For each identified pair of transmitter device type-receive device type, the candidate victim device or set of devices may also be informed of the measurement channel and measurement timeslot for when the candidate victim receiver measurement is to be made (1165). These control signals may be sent to every candidate victim receiver identified for that particular trial. For example, a control signal may be sent, via the ASA controller 106, to the selected candidate victim receiver devices and the identified suspected interfering transmitter devices. The control signals sent to the candidate victim receiver devices and each of the suspected interfering transmitting devices may include an identifier of the suspected interfering devices transmitting the specialized signal, an indication of a specialized signal (an indicator to allow the transmitter to select the proper specialized signal (or flash) waveform for transmission from a number of locally or externally stored waveforms), a communication channel (i.e., the trialing channel to tune to), component (i.e. transmitter and receiver) settings, and a time when the specialized signal is to be transmitted by each of the respective of the suspected interfering devices. The indication of a specialized signal may be an identifier of a signal in a library of signal waveforms stored on the respective devices, or can be used to derive the signal waveform, or is the entire specialized signal. In some examples, the time is a time slot in a signaling protocol such as a TDD implementation. As mentioned above, the specialized signal is different, for example, in waveform and bit arrangement, from normal communication channel traffic signals of the transmitter's air interface of the shared radio frequency access system.

In an example, the candidate victim device control signal may include, for each suspected interfering device participating in the interference monitoring trial, an indication of the specialized signal, the communication channel on which, and time at which the indicated specialized signal will be transmitted. Using this information, the candidate victim device may perform any receiver setting adjustments (e.g., tuning, modulation, and the like) or other device settings for optimum reception of the specialized signal at the indicated time.

Also, the time when the specialized signal is to be transmitted by each of the respective of the suspected interfering devices, allows the receiver, if operating in a data communication mode with an EUD, to schedule a time to interrupt the data communications and tune to the indicated communication channel (i.e., trialing communication channel) for receiving the specialized signal. After receiving the specialized signal, or after a time (e.g., 10-50 milliseconds) passes and the specialized signal is not received, the selected candidate victim receiver may transition back to the data communication mode, or some other operational mode (e.g., sleep mode, or trialing a different potentially interfering device.

In addition, the ASA controller 106 may instruct the victim receivers (via the control signal) exactly when (i.e., timing) and where (e.g., the communication channel) to monitor for the specialized signal. Further, the ASA controller 106 may aid the candidate victim receiver by providing receiver and/or processor settings for measuring candidate victim receiver characteristics (e.g., if settable) to the most appropriate bandwidth, demodulation, and the like for receiving and measuring the specialized signal(s) that will be transmitted by the suspected potentially interfering devices.

In another example, in which subsequent trials are performed, the same candidate victim device may be selected if the same candidate device is configured to receive signals of a different signal (i.e. air interface) type, such as an LTE-like signal as compared to a Wi-Fi-like signal, vice versa or the like. For example, this may be the case for any multiband or multi-standard transceiver, in a BTS, AP, MS or EUD, where multiple air interfaces are deployed. For example, most EUD handsets support Wi-Fi as well as LTE or other cellular standards. This may also be true within the shared spectrum band. The trial measurement may be repeated with a different type of specialized signal waveform in order to better determine interference into the candidate victim's other receiver (i.e. other receiver type, such as Wi-Fi versus LTE). Alternatively, different specialized waveforms may be selected for the various suspected interfering transmitters to simulate the effects of different air interface transmissions into the single air interface of the candidate victim device. In other words, a specialized signal substantially conforming to the Wi-Fi standard may be transmitted and the RSSI of the specialized signal may be measured by a nearby, LTE conforming candidate victim receiver.

The suspected interfering device trialing transmitter radiates the specialized signal (1170). For example, in response to the control signal, each of the suspected interfering devices produces and transmits a specialized signal according to information (e.g., time and waveform indication) included in the control signal. The specialized signal is unique to both the respective, suspected interfering device, and the air interface (e.g., LTE, Wi-Fi or the like) of the intended candidate victim device receiver, and is transmitted at the time indicated in the control signal specific to the respective suspected interfering device. In an example, the suspected interfering device has a unique suspected interfering device identifier that may be encoded into the specialized signal. When the transmitted specialized signal encoded with the unique suspected interfering device identifier is received and decoded by the candidate victim device that is of the same type, the identifier may be used by the candidate victim device or the ASA controller to identify the suspected interfering device that transmitted the specialized signal having the embedded identifier encoded therein.

In some examples, the suspected interfering devices (i.e., trial transmitters) may transmit multiple specialized signals, which may or may not be received by the respective candidate devices. In other examples, when multiple candidate devices are selected, more than one of the multiple candidate (i.e., victim) devices may receive a specialized signal from the same suspected interfering devices. Each of the candidate victim receivers that received a transmitted specialized signal may make a separate measurements (the measurement may be made simultaneously, which allows the fewest possible separate specialized signal flash transmissions to be used in the trial and conserves transmissions) (1175). The measurements of received power may be time stamped to help identify the source of the interference. If it was a same air interface pairing (the transmit-receive pair were both of the same air interface type (e.g., LTE to LTE, Wi-Fi to Wi-Fi, or WiMAX to WiMAX), in which case, an embedded identifier may be recovered by demodulating and decoding the signal at the receiver. Alternatively, if the suspected interfering device and the candidate victim device are of a different air interface pairing (i.e., the transmit-receive pair were of different same air interface types (i.e., LTE to Wi-Fi, WiMAX to LTE or the like), then the candidate victim device receiver may or may not apply the cross air interface calibration coefficient locally. In an example, each of the received signal measurements may correspond to a different suspected interfering device. In another example, a suspected interfering device may transmit multiple specialized signals (each specialized signal being different or each being the same) in which case the candidate victim device may make multiple RSSI measurements. In the case of multiple RSSI measurements, an average RSSI value may be determined for each of the respective suspected interfering devices. Of course, instead of an average value, a customized mathematical function may be applied to the multiple RSSI measurements.

The respective candidate victim device may receive a number of specialized signals from different potentially interfering devices, or may receive multiple specialized signals from the same potentially interfering device(s), and may process each of the received specialized signals. Also, at 1175, the measurement reports may be sent individually back to the ASA controller, or may be batched in various manners and sent as part of a batch reporting process to the ASA controller. For example, the respective candidate victim device may upload all of the signal measurements to the ASA controller 106 in a single batch message or as each measurement is completed or the like. Upon receipt of the signal measurement reports from the respective candidate receivers, the ASA controller 106 may store the measurement information in a database, such as ASA database 115 or the like. For example, the ASA controller may be configured to store each of the received signal measurement values with information related to the candidate victim device including a signal type of the specialized signal in an interference database (e.g., within ASA database 115) for the candidate victim device. By storing this information for later use, the ASA controller may create a 'previously populated' database or map of interference pathways from nearby transmitter devices. This apriori information can be used later by the ASA controller 106 when determining how to best assign channels (e.g., for most efficient reuse or limiting interference), without having to attempt to conduct sampling measurements quickly in response to 'real time' channel requests. For example, the batch may include multiple measurements at the same receivers for averaging purposes to overcome noise variations. In an alternative example, the batch may include reports having multiple measurements from different same-type victim receivers in the same victim area to represent one metric for the victim area that may be an average value or worst case value of the measured signal strength or path loss. The reports may continue to be sent for all receptions (e.g., if multiple suspected interfering devices are transmitting) of that specific transmission of the specialized signal.

At 1176, a determination is made whether there is another same type suspected interfering device transmitter in the same potentially interfering area is to be trialed. If YES, the specialized signal transmissions and reception measurements may be repeated for the next same-type suspected interfering device transmitter in the same or nearby area (1160). If NO, the process proceeds to 1177.

At 1177, a determination is made whether there is a different suspected interfering device transmitter type in the same potentially interfering area is to be trialed. If YES, the specialized signal transmissions and reception measurements can then be repeated for the next different-type transmitter in the same or nearby potentially interfering area (1150). If NO, the process proceeds to 1178.

At 1178, a determination is made whether there is a different candidate victim receiver type for the same potentially interfering area is to be trialed. If YES, the specialized signal transmissions and reception measurements can then be repeated for the next different-type candidate victim receiver for one receiver or a set of receivers (1120). If NO, the process proceeds to 1180.

Some or all of the specialized signals may be received by the candidate device (i.e., victim device) receiver (or multiple candidate victim devices' receivers). In other words, a unique specialized signal will be received by the candidate victim device (or multiple candidate victim devices) from each of a plurality of the suspected interfering devices that were indicated by the ASA controller 106. In an example, the received specialized signals may be time stamped by the candidate victim device. At the respective, selected candidate device receiver(s), in response to the reception of the specialized signal, the local candidate device processor measures a signal parameter value, such as RSSI or the like, of each of the received specialized signals. In some examples, the identifier of the suspected interfering device may be encoded in the specialized signal waveform. In these examples, if the air interface between the potential interfering device and the selected candidate victim device is the same (e.g., both LTE-like), the receiver is able to decode the specialized signal. As a result, the candidate victim device processor retrieves from each of the received specialized signals a suspected interfering device identifier identifying the suspected interfering device that transmitted the received specialized signal.

For each set of specialized signal measurements obtained from candidate victim devices in a candidate victim device coverage area, an interference metric representative of the entire candidate victim area may be established by the ASA controller. For example, using the specialized signal measurements and known interference determination methods, the ASA controller may calculate an interference metric for the respective candidate victim device coverage area (1180). In response to determining the representative interference measurement for the candidate victim device coverage area, a determination, at 1183, may be made whether another candidate victim device coverage area is scheduled for trialing (i.e. SAIM).

If, at 1183, the determination is YES, the process 1000 proceeds to step 1110 of FIG. 10A, where the specialized signal transmissions and reception measurements may be repeated for a next candidate victim area.

If the determination at 1183 is NO, the process 1000 proceeds to step 1185. After all the measurements in the campaign of interest have been conducted and no other candidate victim device coverage area is scheduled for a trial, the ASA controller, at 1185, may use the transmitter type information and transmitter parameters (including power level, antenna gain, time stamp, and location), as well as the receiver information and parameters (receiver power level, receiver settings, time stamp, antenna gain, location) to determine the trialing source of the interference signal (i.e., suspected interfering device), the distance between the specific transmitter and specific receiver, and/or the average range between the transmission area and the reception area. The obtained or derived information may include at least the identifiers of the suspected potentially interfering devices, the transmitted power level (e.g., RSSI) and antenna gains (for both the suspected potentially interfering device and candidate victim device), and their (i.e., the suspected potentially interfering devices and candidate victim device) respective locations for an accurate path loss estimate. Of course additional information, such as past interference information and the like may be obtained from the database. The received signal measurement values, information related to the identified suspected interfering devices (e.g., transmitted signal power level, type of device, device location, device manufacturer, and the like), and information related to the candidate device (e.g., type of device, device location, device manufacturer and the like) are analyzed by the ASA controller 106.

Using some or all of this information and/or other information, an effective path loss for the transmitter-receiver pair or for the transmitter area-receiver coverage area pair may be determined by the ASA controller (1185). For example, some or all of the information may be analyzed for the amount of path loss between the identified suspected interfering device and the candidate victim device, for the amount of interference generated by each of the suspected interfering devices, and the total amount of interference experienced by candidate victim device from all of the identified suspected interfering devices from which specialized signals were received and the like.

The measured power level or calculated path loss information may be used to populate a database indicating or generate a map to show for the areas in the trialing (i.e. SAIM) campaign or for the communication channels used in the trialing campaign, the potential interference levels from suspected interfering devices in particular coverage areas (1190). This information can be used later in real time to aid channel selection algorithms when assigning co-channel or adjacent channels when requested. These measurement trialing campaigns may also be used to assess adjacent channel interference by tuning to the appropriate channels during the trialing measurements.

In addition, the ASA controller may analyze the uploaded information that may include the identifier (when both the air interface between the potentially interfering device and the selected candidate victim device is the same), the RSSI measurement, and a timestamp, is sent (i.e., reported) by the candidate victim device, to the ASA controller 106. For example, using the provided information, the ASA controller 106 may positively determine the actual identity of the suspected interfering device because of the embedded identifier in the reported waveform sent back from the candidate device receiver. Alternatively, if the air interface between the potential interfering device and the selected candidate victim device is not the same, only the RSSI signal strength and time stamp may be reported. In this case, the ASA controller 106 may infer the actual identity of the suspected interfering device that transmitted the received specialized signal based on the timestamp of the received specialized signal because of the communication channel and specialized signal transmission timing were chosen by the ASA controller 106 for the specific potentially interfering device. For example, the ASA controller 106 may access a database containing the communication channel and specialized signal transmission timing and compare the time stamp to the database and determine the actual identity of the suspected interfering device because of the embedded identifier in the reported waveform sent back from the candidate device receiver. Alternatively, when the air interface between the potentially interfering device and the candidate victim device(s) is the same, a signal measurement value (such as a RSSI) of a transmitted specialized signal received by the candidate device and the identifier identifying the suspected interfering device that transmitted the received specialized signal may be sent to the ASA controller 106 from the respective candidate victim device(s).

Upon completion of the analysis, the database may be updated, or a database entry for the respective candidate victim device may be generated. For example, based on results of the analysis, a shared access system radio frequency spectrum interference database, such as DB 115 of FIG. 1, for the candidate device including an indication of the over-the-air interference experienced by the candidate device from each of the neighboring suspected interfering devices may be updated or generated. The above referenced analysis may be performed after or during one or more of the steps of process 1000.

By conducting a systemic campaign of trials (transmitting specialized signals from suspected interfering devices, and sampling at candidate victim receivers, and sampling different communication channels (e.g., frequencies), the database can be prepopulated. Assuming that many or most of the candidate victim receivers (i.e., transceivers of interest) are stationary (e.g., BTS transceivers or AP transceivers), these trial measurement campaigns can be performed during time intervals of low actual traffic (say, for example, the middle of the night) and then used later for channel assignment decisions by the ASA controller 106, rather than relying, for example, on generic RF propagation models (or generic keep-out radii). For example, if AP locations move (as discovered by new GPS position location reports), a new set of trials can be performed for the area surrounding the moved AP. The moved AP can be trialed as both a suspected interfering device (e.g., as a transmitter) and as a possible candidate victim device (e.g., as a sampling receiver) to re-determine the local (with respect to the respective AP) interference environment and to update the database.

Of course, at various times during the process 1000, signal information related to the received specialized signals, such as each of the received signal measurement values (e.g., RSSI), along with the identifier of the suspected interfering devices that transmitted the specialized signal, and with information related to the candidate device including the signal type (i.e. specialized signal based on air interface type (e.g., a LTE-like specialized signal)) in the interference database for the candidate victim device may be stored. The stored signal information may be stored in a local memory of the respective candidate victim devices for future upload via the ASA controller 106 to the ASAS 105, or sent immediately to the ASA controller 106 or ASA database 115.

As mentioned above, the specialized signals generated by the suspected interfering devices (i.e., trialing transmitters, for example, at 1175 of FIG. 10B, may have a waveform suitable for receipt by a Wi-Fi compatible device. For example, in the previous example, the selected candidate device was an AP, such as the coverage area 1641 AP of FIG. 5A, capable of receiving signals having a waveform that was otherwise compliant, or compliant at least in part, with the 802.11 Wi-Fi standards (e.g., the specialized signals may not or may not be transmitted in a frequency mentioned in the 802.11 standard, such as IEEE 802.11Y-2008). In some examples, the candidate device may be configured with an additional receiver that is capable of decoding LTE-like signals. In which case, the process of FIG. 10 may be repeated except that the suspected interfering devices are devices, such as a BTS, that is capable of generating an LTE-like specialized signal (i.e., the specialized signal is otherwise compliant, or at least compliant in part, with the LTE standard except for the transmit frequency of the specialized signal). The interference database for the candidate device may also include the signal measurements for the LTE-like specialized signals.

In an example, the receiver communication path (i.e., the antenna parameters, receiver parameters and other components) of the respective candidate device may be characterized to determine the losses in receiver communication path. Using this information as well as the measured RSSI, a determination of the specialized signal path loss may be determined from the location of the transmitting, suspected potentially interfering device to the selected candidate device. When the transmitting, suspected potentially interfering device and the selected candidate device are using the same air interface, the path loss determination may be a straightforward calculation.

However, when the transmitting, suspected potentially interfering device and the selected candidate device are using the disparate air interfaces (e.g., Wi-Fi versus LTE, Wi-Fi versus CDMA, and the like), the measured RSSI may not be an accurate representation of the actual signal strength of the specialized signal transmitted from the suspected potentially interfering device. To account for this potential inaccuracy, the response of the measurement receivers in the candidate devices to specialized signals of the disparate air interfaces may be characterized (during and/or after development and/or manufacturing, for example). For example, a plurality of specialized signals having a known waveform, signal strength, duration and other known signal parameters, but in a different air interface than the receiver is configured to decode, may be applied to the receiver, and the receiver's output response may be measured. Using the measured output response information, a "mismatch" table of calibration coefficients may be formulated. In response to information reported by a candidate victim receiver, the ASA controller 106 using the specialized signal timing information and other information may be able to determine an identity of a suspected potentially interfering device. By determining the identity of the suspected potentially interfering device, the ASA controller is able to apply, in this example, the specific mismatch calibration coefficients, which are specific to that disparate transmitter receiver pairing. For example, a suspected interfering device having a LTE air interface may transmit a specialized signal waveform configured for optimum reception by a Wi-Fi receiver (i.e. "Wi-Fi optimized" specialized signal from the LTE transmitter). A candidate victim device having a Wi-Fi air interface receiver that receives the Wi-Fi-optimized specialized signal may forward a RSSI measurement of the received specialized signal to the ASA controller 106. The RSSI measurement may be, for example, −50 dBm. The ASA controller 106 may locate on the mismatch table of calibration coefficients a value of, for example, 4 dB. This calibration coefficient value corresponds to the specific disparate pairing (LTE to Wi-Fi) with the use of the "Wi-Fi optimized" specialized signal and based on the settings of the Wi-Fi candidate victim receiver. The 4 dB represents an additional loss that actually occurs in the receiver because of the mismatched (disparate) air interfaces, but does not represent actual propagation loss. The 4 dB indicates that the measurement needs to be corrected by adding 4 dB to the −50 dBm measurement to arrive at the 'corrected' measurement of −46 dBm. This −46 dBm value then represents the actual propagation loss, assuming it had already been corrected for other factors such as transmitting antenna gain, receiving antenna gain, etc.

Figure 11A:
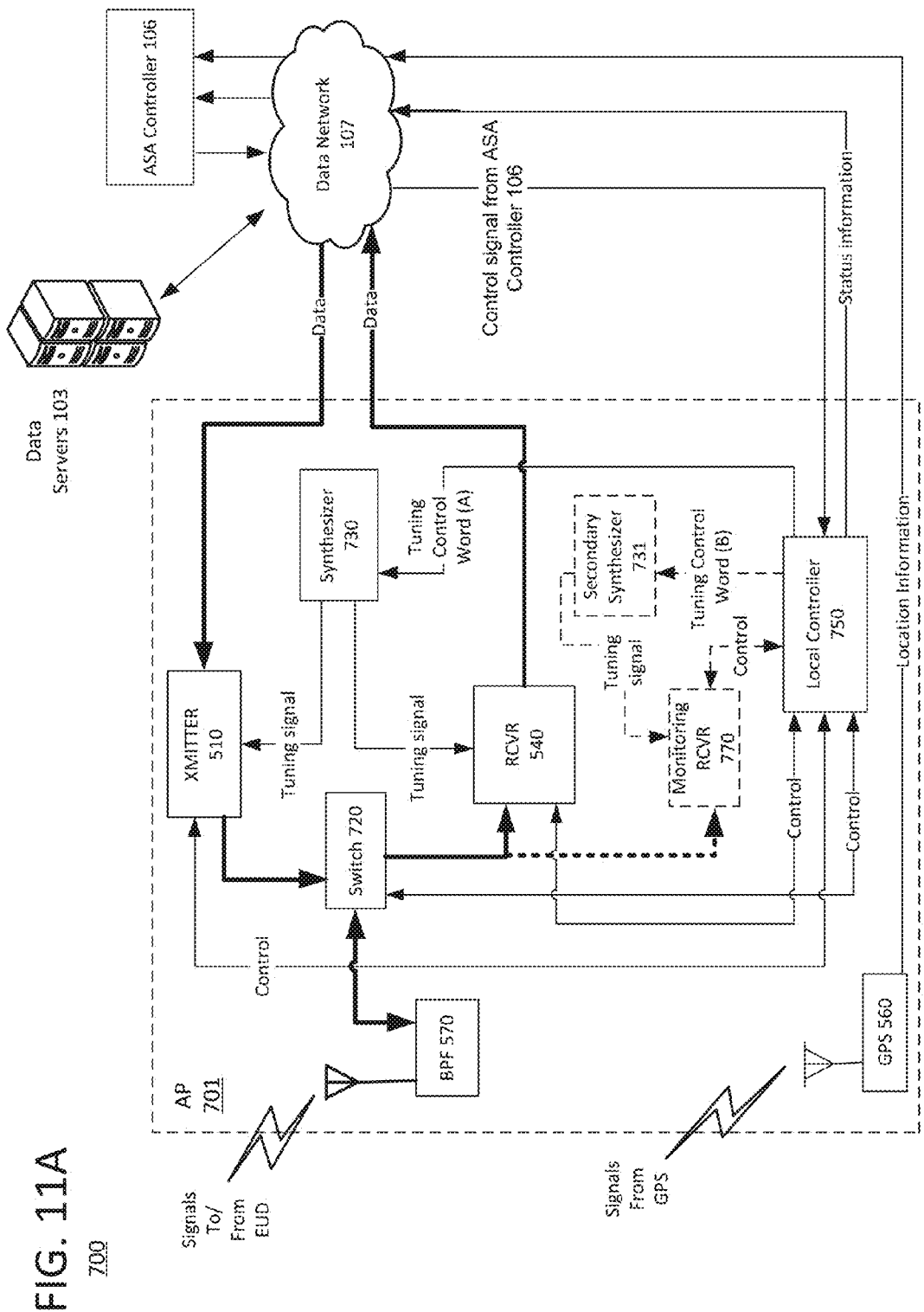
FIG. 11A is a high-level functional block diagram of an example of an access point device implemented in a TDD configuration for providing station assisted interference measurement of a shared radio frequency spectrum.

Examples of devices configured to receive the specialized signals will now be discussed with reference to FIGS. 11A and 11B. For example, FIG. 11A is a high-level functional block diagram of an example of a Tier 3 AP device implemented in a time division duplex (TDD) configuration for providing access to shared radio frequency spectrum. The shared radio frequency spectrum may include frequencies in the approximate range of 3550.0-3700.0 MHz or the like. The example of an AP device, shown in FIG. 11A, may have different configurations, and may include depending upon the configuration, among other components, an optional monitoring receiver that can be instructed to monitor the shared radio frequency spectrum described in the examples herein. The optional monitoring receiver (e.g., M. RCVR (549) in FIG. 11B) may be configured differently (e.g. configured to receive a different signal type, such as an LTE-like signal as compared to a Wi-Fi-like signal or vice versa) than the primary receiver of the AP device.

In a first configuration, the system 700 may include an AP device 701, a data network 107, an external controller, such as the ASA controller 106, and data servers 103. The data servers 103 provide data and other services to devices (e.g. AP 701 and any served EUDs) and systems, servers, or services that access the data network 107. Also, connected to data network 107 is the ASA controller 106, which is part of the ASAS 105 described above with respect to FIGS. 1 and 2. The ASA controller 106 has access to the database 115 and other resources of the ASAS 105. The ASA controller 106 may be configured to determine which communication channel to assign to the requesting AP 701 from the available communication channels in the shared radio frequency spectrum. In addition, the ASA controller 106 may determine the extent of coverage areas and the transmit power settings of the AP 701 and any EUDs served by the AP 701. The ASA controller 106 is able to communicate with the AP 701 through the data network 107 via a communication channel (e.g., Wi-Fi, fiber optic, Bluetooth, coaxial cable and the like) that is different from the shared frequency spectrum used for communication between the AP 701 and any served EUDs.

The TDD AP 701 includes a transmitter (XMITTER) 510, a duplex switch 720, a synthesizer 530, a receiver (RCVR) 540, a local controller 750, a GPS receiver/reporter 560, a switch 720, and a band pass filter 570. Under control of the local controller 750, the AP 701 performs routing functions typical of, for example, a Wi-Fi router or other type of signal router, but only in the communication channel assigned by the ASA controller 106.

In the present example, the AP 701 is an access point for connecting one or more EUDs (not shown) to the data network 107 and the data servers 103. The AP 701 and any of its served EUDs (which communicate with the data network via to the AP 701 within a Tier 3 coverage area) communicate in the channel (or channel set) assigned by the ASA controller 106. Of course, the AP 701 may also be configured to function as a BTS for communication with one or more MSs.

When performing data communication operations, the AP 701 may connect to an external network, such as the data network 107, via a connection through an interface that is wired or wireless. If using a wireless interface, the connection is via a frequency spectrum band different (i.e., not in the shared radio frequency spectrum of the ASAS) from the frequency band or communication channel used by the wireless AP 701 to connect to an end user device or the like. The data network 107 may be any form of data network, such as the Internet, an intranet, a campus-wide LAN, metropolitan LAN or other form of data network that allows an external managing controller, such as ASA controller 105, to communicate with the AP 701. Data signals, shown by the heavier lines labeled "Data," are delivered from the data network via data connections (not shown) to the AP 701. The data from the data servers 103 may be provided through the data network 107 to the AP 701 via a wired (e.g. coaxial cable, fiber optic cable or otherwise hard-wired connection) or wirelessly, via a cellular connection, Wi-Fi, Bluetooth or some other wireless format in a frequency range outside the shared radio frequency spectrum. The AP 701, in an example of TDD communications, simply passes data, via the transmission path that includes the transmitter 510, the switch 720, and the band pass filter (BPF) 570, and an airlink (not shown), to an EUD that has requested the data. The AP 701 receives data from served EUD user devices on the same channel that the AP 701 uses to transmit. The AP 701 receive channel includes the airlink to the AP device antenna, which is coupled to the BPF 570, the BPF 570, the switch 720 (configured to a receive state), receiver 540, and the AP data output connections to the data network and data servers 103.

Under control of a local controller 750, the AP 701 performs routing functions, for example, typical of a Wi-Fi router, but only in the frequency channel assigned by the ASA controller 106. However, in this example, of an access point, the AP 701 also provides the additional functionality of receiving specialized signals on designated communication channels of the shared radio frequency spectrum, and reporting measurements related to the received specialized signals to the ASA controller 106.

The local controller 750 of AP 701 also distributes control signals within the AP 701 based on signals received from the ASA controller 106. The ASA controller 106 is coupled to the data network 107, and transmits and receives control signals to/from multiple APs, such as AP 701, connected to the data network 107, or other networks (not shown) that connect to the data network 107. The AP 701 through connections to the data network 107, such as, for example, via a control connection with the external network, such as data network 107, is configured to receive control signals from the ASA controller 106. The control signals from the ASA controller 106 are received by the local controller 750 and are either processed, or simply passed through to the secure synthesizer 530. Control signals that are processed by the local controller 750 may be status signals related to the status of the transmitter 510, switch 720 and the receiver 540, or requests for retransmission of the AP 701 secure ID, and the like. The control signals processed by the local controller 750 may also be specialized signals as discussed above.

The synthesizer 530 has control signal connections to the local controller 750 for receiving the tuning control word, to the transmitter 510 for providing a tuning signal for transmitting data in the transmit frequency band indicated in the tuning control word, and to the receiver 540 for providing a tuning signal for receiving data signals in the receive frequency band indicated in the tuning control word. In TDD implementations, these frequencies may be identical. In FDD implementations, each logical communication channel is in fact a pair of actual frequencies, one for access point downlink transmission to the served EUDs and one for access point uplink reception from the served EUDs. The interface between the synthesizer 530 and the local controller 750 may be via an inter-integrated circuit (I2C), a universal asynchronous receiver/transmitter (UART), and universal serial bus (USB), or the like.

In this example, the synthesizer 530 processor executes program instructions retrieved from a memory accessible only by the synthesizer 530 processor to decode the tuning control word provided by the local controller 750. Using the decoded tuning control word, the synthesizer 530 tunes the transmitter 510 and the receiver 540 to a channel indicated by the decoded tuning control word, which was provided as a tuning control word by the ASA controller 106. The tuning control word corresponds to the assigned communication channel.

When the ASA controller 106 is determining the channel assignment, the transmission permission parameters and other parameters (e.g. transmit power levels) for each of the respective APs, such as AP 701, the ASA controller 106 consults the database of the ASAS 105 to determine the availability of channels and the locations of higher priority Tier 1 and Tier 2 users. For example, the ASA controller 106 uses AP location information to check for possible interference conditions to/from higher priority users (e.g. the Tier 1 or Tier 2 users) as determined based on the use of different techniques, (such as the signal propagation model, an interference model, spectrum monitoring data provided in some examples, or a hybrid technique that uses a combination of both) and information in the ASAS 105 database.

As a result, the location of the AP 701 in a respective coverage area, such as coverage area 130A, is one parameter useful for appropriate assignment of the frequency channels in the shared radio frequency spectrum. Other parameters may include signal power levels of other Tier 1/2/3 devices in the vicinity of an AP requesting access to available shared radio frequency spectrum.

The location determining and location reporting functions of the AP 701 are performed by the GPS receiver/reporter 560. Location information of the local EUD served by the AP are assumed to be 'local' to the serving station (either the serving AP or the serving Small Cell).

A GPS chipset (not shown), which may include a processor, GPS antenna, and other circuits, within the GPS receiver/reporter 560 provides the functions of measuring satellite signals and location determination. Also, the GPS receiver/reporter 560 may provide location reports to the ASA controller 106 at different times. For example, the GPS receiver/reporter 560 transmits location reports of the AP 701, after the occurrence of an event, such as a request to download content that will consume bandwidth, shutdown of the AP 701 local controller 750, just prior to start up, or similar events; or upon specific request by the ASA controller 106. In some examples, the GPS receiver/reporter 560 provides location report updates to the ASA controller 106 over time, which may or may not be periodically. In this manner, if the AP 701 unit is moved, the ASA controller 106 will automatically know the new location via the GPS report from the GPS receiver/reporter 560 without user intervention.

Normal operation of the AP 701 will now be discussed in more detail. Prior to the AP 701 establishing or maintaining a communication session with a served EUD (not shown), in response to a request from an EUD for data services received via the receiver RCVR 540, the AP 701 local controller 550 generates an access request that includes an identification (ID) of the AP 701. The access request is sent to the ASA controller 106 in a communication channel established through the data network 107 with the ASA controller 106 that is different from the communication (i.e., frequency) channel used by the AP 701 to communicate with a EUD. The ASA controller 106 may authenticate the AP 701 by accessing, for example the database 115 of the ASAS 105 (also not shown).

In an example, the ASA controller 106 is configured to, in response to the request from the AP 701, determine an available channel, make the channel assignment, and provide the communication channel indication (e.g., tuning control word) via a communication path through the data network 107 to the AP 701. An available communication channel, while not a communication channel being used at the time of the access request by devices in the shared access system, may not be an appropriate candidate for use by the AP 701. For example, based on information in the database 115, the available communication channel may be used by another device in another coverage area and, as a result, may be susceptible to interference from this device (AP 701) or the other device may potentially interfere with (to) this device (AP 701). However, to confirm this suspicion, the ASA controller 106 may determine that a trial of the communication channel assignment to the AP 701 is to be performed. Alternatively, the ASA controller 106 may have, for example, one or more of old interference data, an outdated propagation model, no interference data for the particular combination of communication channel and AP 701, or the like stored in the database 115 for the particular AP 701.

Prior to fulfilling the communication channel assignment request from the AP 701, the ASA controller 106 may determine that the AP 701 is a candidate device for investigating interference (i.e., a candidate victim receiver) from surrounding devices. The candidate victim device determination may be based on the type of signals (e.g., Wi-Fi compatible or LTE compatible) the AP 701 is able to receive and/or other information, such as whether any surrounding devices transmit the type of signals the AP 701 is configured to receive, whether any higher priority devices are scheduled to be in the area thereby precluding the interference investigation and the like.

In an example, the ASA system 105 may have preselected a geographical area for investigation and the location of the AP 701 may fall within the preselected geographical area. Upon determining the AP 701 is located within the preselected geographical region, the ASA controller 106 may implement a process similar to the process 1000 of FIG. 10.

Alternatively, the AP 701 may provide a quality indication of one or more communication channels as reported in a quality of service (QOS) report (e.g. number of bits lost, or corrupted, number of requests for retransmission of data and the like) to the ASA controller 106. For example, the local controller 750 of AP 701 may indicate to the ASA controller 106 that the authorized channel 3 is degraded each time it is assigned to the AP 701. As a result, the ASA controller 106 may, for example, initiate an interference investigation, for example, to determine whether an adjacent coverage area device is too close in distance to this device (700) using the same channel (i.e., co-channel), or otherwise affecting (e.g. overpowering) the AP 701.

Alternatively for these scenarios, these determinations of the need to perform such interference investigations may have occurred earlier, and the ASA controller may have elected to perform these various measurements during a non-busy time and stored these results in the database for later use, such as when making assignment decisions.

In the first configuration of FIG. 11A, the AP 701 has a single receiver 540 that may only communicate via a single type of signal, such as a Wi-Fi compatible signal, with an end user device. For example, based on the candidate communication channel and the signal type of the AP 701, the ASA controller 106 identifies suspected interfering devices capable of generating signals of the type that the requesting AP 701 (i.e., candidate) device is capable of receiving. Alternatively, by using the special waveforms, it may be that the various suspected interfering devices do possess the appropriate prerecorded waveform within their local device library. In this case, even if the specific suspected interferer is of a differing air interface than the device (700), the ASA controller 106 can instruct (by sending a selection indicator) the other suspected interfering device transmitter to use the appropriate waveform for the trial sampling measurement.

Upon identifying potentially suspecting interfering transmitting devices, the ASA controller 106 may access location information of the potentially suspected interfering devices in the database 115 and choose the suspected interfering devices for use in the trial based on those that are the nearest neighbors (i.e., in closest proximity) to AP 701, the candidate victim receiver. For example, all suspected interfering devices within a certain radius, e.g., 10 kilometers in a rural area, or 100 meters in an urban setting, are used in the interference investigation. Alternatively, propagation model data may be used to choose the suspected interfering devices that are considered, within a certain probability, such as 80%, to interfere with the AP 701. The suspected interfering devices that fall within the 80% are chosen for use in the investigation. In yet another alternative, the ASA controller 106 may be instructed to investigate whether any of the more distant suspected interfering devices are interfering with the AP 701. For example, devices at the edges of the areas indicated by the propagation models as being unlikely to interfere with the candidate victim device. Of course, the ASA controller 106 may choose individual groups of potential suspected interfering devices based on certain criteria, e.g., all devices east of the AP 701, all devices manufactured by a particular manufacturer (presuming that this information is in the database 115), or the like for use in an interference investigation.

Since the ASA controller 106 manages devices in the ASAS 105, the ASA controller 106 is able to identify, in some examples, timeslots (or even longer time periods) in the TDD protocol that are becoming available for transmitting specialized signals. Alternatively, there may be times when the AP 701 is not providing service to an EUD, which may allow the AP 701 to be used solely in the station assisted interference measurement system in an interference investigation, and process specialized signals until an EUD requests service. In other words, when the AP 701 is idle, the AP 701 may be selected as a candidate victim device for participation in an interference investigation.

Data within a control signal indicates to the AP 701 that the AP 701 is a candidate victim device and includes information related to performing sampling measurements on an indicated communication channel at the appropriate time. For example, a certain bit(s) in a data field of the control signal are set to a specific value(s) indicating to the local controller 750 that the AP 701 is a candidate victim device.

Alternatively, the certain bits in the data field of the control signal sent from the ASA controller 106 to the AP 701 may have a value indicating that AP 701 is a suspected interfering device. In this example, the ASA controller 106 instructions may not only indicate the trial channel and time, but also indicate which waveform to employ for the trial transmission.

In the above examples, the specialized signal indication, the communication channel indication, and timeslot indication for transmitting the specialized signals may all be included in a separate control signal to the device.

In response to obtaining the control signal via the data network 107, the local controller 750 parses the control signal to determine, for example, whether the AP 701 is either a candidate victim device (e.g., a sampling receiver) or a suspected interfering device (e.g., a transmitter), the indication of the specialized signal waveform, the communication channel on which to tune to receive specialized signals (if a candidate victim receiver) or to tune a transmitter for transmission of specialized signals (if a suspected interfering transmitting device) indication, and time at which to receive/transmit the specialized signal. Within the control signal, the trial communication channel may be indicated as a tuning control word. The local controller 750 further parses the communication channel from the control signal for tuning receiver 540 to the communication channel on which the specialized signal will be transmitted.

In addition, an indication of the specialized signal will be included in the control signal. The indication informs the local controller 750 of the format of the specialized signal, so the local controller 750 is able to identify and choose the specialized (i.e., 'flash') signal waveform, either from local stored memory, or from a data transmission from the ASA controller. Alternatively, for use as a candidate victim receiver, the indication from the ASA controller 106 informs the local controller 750 of the format of the specialized signal, so the local controller 750 is able to set the receivers settings (such as, for example, sub-block filter, intermediate frequency (IF) bandwidth, demodulation type, and the like) appropriately for substantially optimum reception of the specialized signal waveform.

The local controller 750, in some implementations, may receive a control signal providing the communication channel and timing information for each of the suspected interfering devices' trial transmission. In other implementations, a control signal may include a batch of communication channels and timing information for each respective channel, and for each of the suspected interfering devices, in order to signify a series of trial flash transmissions (for transmitters) or candidate trial sampling measurements (for receivers).

Upon completion of the parsing of the control signal by the local controller 750, the local controller 750 based on the time information (e.g., TDD timeslot) forwards a tuning control word (A) to the synthesizer 730. The synthesizer 730 tunes the receiver 540 according to a tuning signal to the receiver 540 that tunes the receiver 540 to a communication channel for receiving the specialized signal(s) transmitted by the suspected interfering devices at the time indicated in the control signal. Also in time for reception of the specialized flash signal, the local controller 750 controls the switch 570 to complete the communication path between the BPF 570 and the receiver 540. Of course, the communication channel indicated in the control signal is within a frequency range compatible with the band pass filter BPF 570.

The specialized signal(s) transmitted by the suspected interfering device(s) is received by the receiver 540 from the suspecting interfering device via the over-the-air communication link, the antenna, the BPF 570, and the switch 720. Local controller 750 is configured to receive the specialized signal from the receiver 540, and process the specialized signal. During the processing of the specialized signal by the local controller 750, the local controller 750 measures the received signal strength of the received specialized signal from the respective suspected interfering device to generate a RSSI and sets a time stamp upon receipt of the specialized signal. In addition, if the AP 701 has the same air interface as the suspected interfering device(s), the receiver 540 may be configured to demodulate and decode the received specialized signal, which the local controller 750 may process to retrieve an identifier of the transmitting suspected interfering device that transmitted the received specialized signal.

The local controller 750 may be able to process multiple specialized signals as the specialized signals are received by the receiver 540. The local controller 750 may store the results of the processing, such as assigned time stamps, the suspected interfering device identifiers (if available) and the respective measured received signal strength indicator measurements in an AP 701 memory (not shown) for later reporting to the ASA controller 106. For example, the local controller 750 may send in a batch report a series of measurement results and time stamps to the local controller 750. Alternatively, the local controller 750 may provide the results of the specialized signal processing to the ASA controller 106 upon completion of the processing as individual reports.

In summary, when the AP 701 is operating in the station assisted interference monitoring system and selected as a candidate victim sampling receiver, the AP 701 is configured to respond to a control signal identifying a specialized signal that is to be received on a specific communication channel at a specific time by the AP 701. Upon reception of the specialized signal, the AP 701 is further configured to process the received specialized signal to identify the device that transmitted the signal and generate an RSSI. The identity of the suspected interfering transmitting device, the RSSI measured level, the channel, and possibly other information, such as a time at which the signal was received, signal duration and other signal related information is recorded and stored locally for later conveyance to the ASA controller, or conveyed immediately.

The AP 701 may also be selected to be a suspected interfering device in order to transmit trial flash waveforms. A similar process is performed in the case in which the AP 701 is selected as a suspected interfering device. However, instead of the control signal provided to the AP 701 indicating that the AP 701 is a candidate victim receiver, the control signal, in this example, indicates that the AP 701 is a suspected interfering device transmitter. The control signal includes the channel for the trial transmission, an indication of the specialized signal (one from a set of prerecorded waveforms stored in a memory (either local or external and that are available through the data network 107, or the waveform data may be sent directly from the ASA controller) and the timing (e.g., time slot) of the transmission. Further, the transmitted specialized signal waveform data may include an embedded device identifier that helps identify this specific device as the transmitter of the specialized signal.

Based on the indication of the specialized signal included in the control signal, the local controller 750 may access a memory within the local controller 750 to retrieve the format or waveform of the specialized signal. For example, the memory may have a library of specialized signals of differing formats depending upon the type of signal that the intended candidate victim receiver is configured to receive.

In some implementations, the AP 701 candidate receiver may be configured to receive Wi-Fi compatible signals, so the specialized signal may be optimized for Wi-Fi signal reception. In other implementations, such as a BTS, which receives LTE compatible signals, in which case, the specialized signal may be optimized to take advantage of the LTE-compatible features of a receiver.

Alternatively, the ASA controller 106 may provide the specialized signal format to the local controller 750. The special signal provided would include the following features and information: transmit signal strength (i.e. the power level (RSSI)), modulation format, duration (i.e., interval), waveform radiated, as well as signal preamble and header information (e.g., information identifying the signal as a specialized signal)). An example of the specialized signal waveform will be discussed in more detail with reference to FIG. 12.

Since the configuration of AP 701 is a TDD implementation, the local controller 750 parses from the control signal received from the ASA controller 106 a tuning control word that identifies the communication channel on which the AP 701 suspected interferer will be transmitting the specialized signal. The local controller 750 provides the tuning control word (i.e., tuning control word (A)) to synthesizer 730. The synthesizer 730 decodes the tuning control word and provides a tuning signal to the transmitter 510 to tune to the communication channel for transmission of the specialized signal. When the AP 701 is the suspected interfering device, the local controller 750 determines the waveform and format of the specialized signal that will be transmitted by the transmitter 510. As mentioned above, the waveform and format information may be obtained either directly from information provided by ASA controller 106, or from the memory of the local controller 750. For example, a look-up process with the specialized signal indication (indication from the ASA controller 106) as an index into the local memory table. The local memory table may be stored in a memory (not shown) of the local controller 750, or the like. The local memory table may include one or more special waveforms. Alternatively, the control signal provided by the ASA controller 106 may include the waveform (e.g., more than the previously described indication) and format (and/or signal type) information of the specialized signal. In yet another alternative, the local controller 750 may have to access, or send a request (using the indication of the specialized signal in the control signal) to, one or more of data servers 103 to obtain the specialized signal waveform and format information.

Using the specialized signal waveform and format information, the local controller 750 causes the transmitter 510 to transmit a specialized signal having a waveform and format as indicated by the specialized signal indication in the control signal and at the prescribed time via the air interface.

In another example also illustrated in FIG. 11A, the AP 701 is configured differently. In this example of a second configuration, the AP 701 includes, as in the previous example, the transmitter (XMITTER) 510, the switch 720, the synthesizer 730, the receiver (RCVR) 540, the local controller 750, the GPS receiver/reporter 560, and the band pass filter 570, but also includes a monitoring receiver 770 and secondary synthesizer 731. Additional and revised components of AP 701 are configured to provide additional functionality. For example, the revised components in AP 701 include switch 720, local controller 750, and band pass filter BPF 570. In this second configuration example, the configuration and function of the switch 720 is revised to provide another connection to the monitoring receiver 770 and the band pass filter 570 may be revised, for example, to allow signals from a greater frequency range. The local controller 750 is further configured to provide added functionality enabling the AP 701 to operate in coordination with the ASA controller 106 to utilize the monitoring receiver 770 for interference monitoring.

In this example, the local controller 750 in addition to control connections to the synthesizer 730, transmitter 510 and receiver 540 also includes another control connection to the monitoring receiver 770 and yet another control connection to the secondary synthesizer 731. The secondary synthesizer 731 provides tuning signals via a communication pathway to the monitoring receiver 770.

The additional components allow the AP 701 to continue to receive data communications in an assigned communication channel and at an assigned timeslot using receiver 540 while monitoring receiver 770 receives specialized signals in another timeslot and on another communication channel. This frees the local controller 750 from having to instruct the synthesizer 730 to tune the receiver to another communication channel and at a precise timeslot. By having a dedicated monitoring receiver 770, the timing of tuning to the indicated communication channel and at the indicated timeslot need not be as precise as using only the receiver 540 to perform both specialized signal monitoring and data communications.

In operation, the monitoring receiver 770 and secondary synthesizer 731 respond to control commands from the local controller 750. For example, the ASA controller 106 may instruct the AP 701 to sample (i.e., trial or monitor) on a communication channel of interest by measuring parameters of specialized signals transmitted by suspected interfering devices on a particular communication channel.

To provide the data needed to satisfy the interference investigation, the ASA controller 106 may determine a spectrum monitoring mode of all APs registered with the ASAS 105 or only those APs, such as AP 701, in a location relevant to the channel investigation are targeted. Location information, for example, received from GPS receiver/reporter 560 and maintained in the ASAS database 115 from previous AP access requests may be used to identify the location relevant APs that may be suspected interfering devices or future candidate victim receivers.

In this example of an interference investigation, the AP 701 may provide several control signals that each corresponds to one of a set of candidate channels in the shared radio frequency spectrum that the ASA controller 106 has selected for investigation based on an indication from ASAS 105. For example, the control words may correspond to communication channels in which the ASAS 105 is interested for purposes of refining propagation models for determining keep out zones, determining path loss statistics for a particular AP or the like. The control words include an indicator that identifies the monitoring receiver 770 to the local controller 750 as the receiver to be tuned using the received control words.

Upon receipt of the several control signals for each of the communication channels of interest, the local controller 750 forwards the several control signals to the synthesizer 730. The synthesizer 750 parses the control signals, either iteratively or as a batch, and tunes the monitoring receiver 770 to each of the respective channels for detected specialized signals in the respective channels.

The local controller 750 enters the second configuration for providing detected signals or measured power levels for the respective channels of interest, and sends a tuning control word (B) to the secondary synthesizer 731. Using the tuning control word (B), the synthesizer 730 tunes the monitoring receiver 770 to the respective communication channels at the prescribed times indicated in the control signal. The detected specialized signals are processed to determine or measure one or more signal parameters, such as a received signal strength, and/or a signal quality. The results of the specialized signal processing may be stored in a memory (not shown) for later reporting by the local controller 750. For example, measured power levels (e.g., RSSI) may be formed into reports for individual delivery to the ASA controller 106. Alternatively, the measured power levels and/or signal quality reports may be provided as a batch report to the ASA controller 106, or in separate reports as the individual specialized signals are processed.

Alternatively, the ASA controller 106 may send a set of control signals corresponding to the list of candidate channels. The local controller 750 will receive the one or more control signals in the set of control signals from which the ASA controller 103, and forward the one or more control signals to the synthesizer 730 or secondary synthesizer 731 for monitoring. The synthesizer 730 or secondary synthesizer 731 may iteratively tune to the communication channels indicated by the control signals in the list corresponding to each candidate channel, and process the signals on each channel to provide different signal parameters, such as receives signal strength indicators (RSSI) or the like. The receiver 540, monitoring receiver 770, or both (depending upon the configuration) may forward the results of the monitoring to the local controller 750, which forwards the monitoring results to the ASA controller 106.

In another example, a secondary synthesizer 731 may be used to monitor, or "sniff," other channels on a rolling basis. In other words, periodically the AP 701A may receive an indication that the monitoring receiver is to be used as a candidate victim receiver. The secondary synthesizer 731 is a synthesizer configured in the same manner as synthesizer 730. The secondary synthesizer 731, via a control connection with the local controller 750, may receive a tuning control word B.

If the interference investigation is to occur when the TDD or FDD system is not actively receiving traffic, the AP of FIG. 11A and synthesizer 730 can be used to temporarily retune receiver 540 to another frequency for interference measurement purposes. If the timing is such that the synthesizer 530 cannot retune fast enough to support both data traffic reception and transmission, as well as the additional interleaved interference measurement tasks, then the architecture with monitoring receiver 770 and secondary synthesizer 731 may be used. Similarly, if the interference measurement is intended to occur simultaneously, on another frequency channel, while the AP supports traffic reception and transmission, then the architecture including monitoring receiver 770 and secondary synthesizer 731 is deployed. In this example, the BPF 570 is configured to allow the reception of both data traffic signals and specialized signals. The secondary synthesizer 731 also facilitates non-alternating, simultaneous reception use in an interference investigation operation in which the respective receivers 540 and 770 are able to be tuned to two different communication channels simultaneously. In which case, one or both (depending upon whether the active data communications may be interrupted) of the receivers 540 and 770 may be monitoring for specialized signals on the different communication channels.

In another alternative, the monitoring receiver 770 may be a receiver that is configured to receive signals generated by a device does not typically communicate with the AP 701, such as, for example, a BTS. In an example of an implementation, the monitoring receiver 770 may be capable of receiving and decoding LTE compatible signals transmitted in a communication channel that is the same as or different from the communication channel assigned to the AP 701 for receipt of a Wi-Fi compatible specialized signal via receiver 540. In this configuration, the AP 701 will be able to detect specialized signals from suspected interfering APs, MSs, BTSs and EUDs.

Figure 11B:
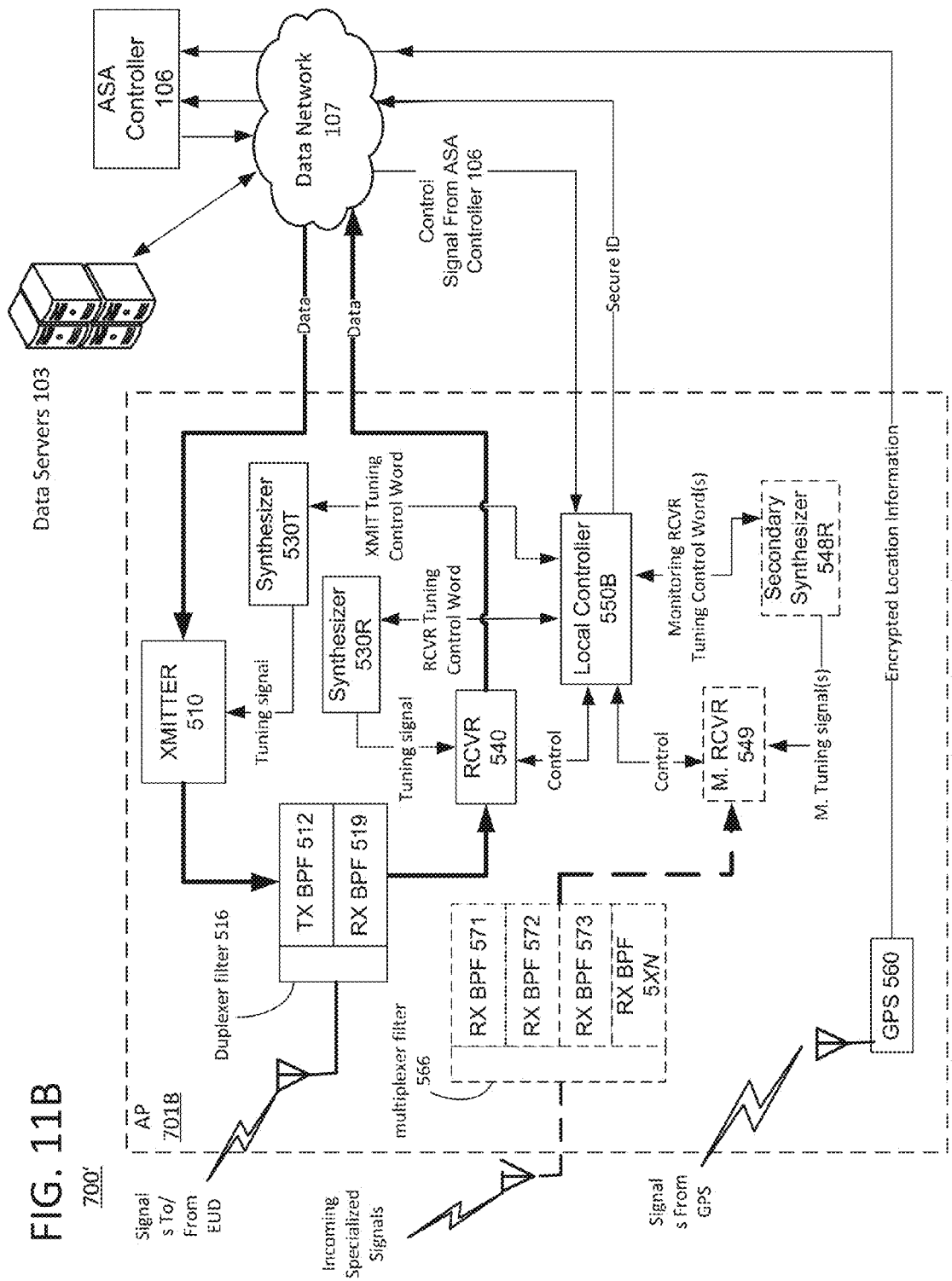
FIG. 11B is a high-level functional block diagram of an example of an access point device implemented in a FDD configuration for providing access to shared radio frequency spectrum.

FIG. 11B is a high-level functional block diagram showing an example of an access point implemented in a frequency division duplex (FDD) architecture for providing access to shared radio frequency spectrum. The system 700' includes an FDD-configured AP 701B that interacts with the same external system components as AP 701A, such as the data servers 103, ASA controller 106 and network 107. As for the components of AP 701B, the GPS receiver/reporter 560, the transmitter 510 and the receiver 540 are configured the same in AP 701B as the same components in the AP 701A of FIG. 11A. However, instead of synthesizer 730, which provides a single tuning signal to both the transmitter 510 and receiver 540 as in FIG. 11A, the FDD-configured AP 501B uses a pair of synthesizers 530T and 530R.

In FDD systems, the transmitter 510 and receiver 540 functions may operate simultaneously or substantially simultaneously, and the duplexer or diplexer switch (e.g., 720 in FIG. 11A) is replaced by a duplexer filter 516 (also known as a diplexer filter). The duplexer filter 516 is connected to the antenna, and has two separate branches, one supported by a band pass filter (BPF) tuned to the transmitter band (i.e., TX BPF 512), and the second branch supported by a BPF tuned to the receiver band (i.e., RX BPF 519). The duplexer filter 516 is configured to allow the receiver 540 to receive signals on the first communication (i.e., frequency) channel and to transmit signals, such as specialized signals, on the second (i.e., frequency) channel. The first communication channel and the second communication channel are considered paired communication channels. The control signal in a FDD implementation may include at least a pair of tuning control words (e.g., one for transmitter 510 tuning and another for receiver 540 tuning) are provided by the ASA controller 106. Each of the individual tuning control words in the pair of tuning control words is different from the other tuning control word in the pair, and do not produce the same frequency channel for tuning both of the transmitter 510 and receiver 540.

While in an FDD implementation, different channels for transmitting (referred to as uplink or UL) and receiving (referred to as downlink or DL) are assigned to the AP 701B and a fixed relationship (duplex spacing) between the uplink and downlink channel frequencies may be employed, such that one control signal communication channel indication indicates a pair of channel frequencies: one for uplink and one for downlink, which have a predetermined fixed separation in frequency. In the case of an FDD implementation, the control word includes a tuning word that indicates a pair of communication channel frequencies (e.g. two frequencies or two channel) assignments to be parsed by the secure synthesizer processor.

For example, the local controller 550B is configured to provide a receiver (RCVR) control word to receiver synthesizer 530R and a transmitter (XMIT) control word to a transmitter synthesizer 530T. The local controller 550B is configured to identify the respective control signals. For example, the control signals provided by the AP may include a data field indicating whether the tuning control word is intended for transmitter or receiver. In other embodiments, the order of the tuning control word may always be the same. In other words, the control signals delivered by the AP 701 may always have the receiver tuning control word first and the transmitter tuning control word second, or vice versa. The respective synthesizer (530R and 530T) generates a tuning signal that is output to the receiver 540 and transmitter 510, respectively. For example, the receiver synthesizer 530R receives the receiver (RCVR) tuning control word from the local controller 550B, processes the tuning control word to derive a receiver tuning signal. The derived receiver tuning signal may correspond to a first communication channel. The receiver 540 uses the derived receiver tuning signal to tune to the first communication channel. In a similar manner, the transmitter synthesizer 530T receives the transmitter (XMIT) tuning control word from the local controller 550B, processes the tuning control word to derive a transmitter tuning signal. The derived transmitter tuning signal may correspond to a second frequency channel that is different from the first frequency channel. The transmitter 510 uses the derived transmitter tuning signal to tune to the second frequency channel. The first frequency channel and second frequency channel may be paired, and, in which case, may always be assigned together as a pair to a respective device, such as a BTS, an AP, a MS or an EUD.

The FDD AP 701B may be used as either a candidate victim receiver or a suspected interfering device. In either case, the ASA controller 106 transmits control signals via the data network 107 that are received by the local controller 550B. The local controller 550B parses the control signals in the same manner as described above to determine whether the AP 701B is to be a candidate victim receiver or a suspected interfering device. Based on the determination, the local controller forwards the tuning word to the synthesizer 530T, if the control signal indicates the AP 701B is a suspected interfering device, or to synthesizer 530R, if the control signal the AP 701B is a candidate victim receiver. In the case in which the AP 701B is a suspected interfering device, the control signal indicates the specialized signal format, waveform and time for transmission. Similarly, in the case in which the AP 701B is a suspected interfering device, the control signal indicates the specialized signal format, waveform, respective uplink and downlink frequencies and time for reception.

When indicated as a suspected interfering device, after transmission of the specialized signal, the AP 701B, like any suspected interfering device, has no further responsibility in the interference investigation. However, when the AP 701B is acting in the role of candidate victim receiver, the AP 701B receives and processes the received specialized signals as discussed above with respect to AP 701A of FIG. 11A.

Similar to the second configuration of the TDD AP 701A, the AP 701B may also have a second configuration. The second configuration of the AP 701B includes a monitoring receiver 549, a secondary synthesizer 548R, a bank of receiver band pass filters 571-5XN and multiplexer filter 566 that allow the reception of specialized signals in the respective communication channels. The multiplexer filter 566 may respond to controls from the local controller to allow the appropriate filter (RX BPF 571-5XN) to be connected to complete the transmission path between the antenna and the monitoring receiver 549. As discussed above with respect to an interference investigation and the AP 701A second configuration illustrated in FIG. 11A, the local controller 550B parses the control signals received from the ASA controller 106 via data network 107, and provides monitoring receiver tuning control words to the secondary synthesizer 548R for tuning the monitoring receiver 549 to the communication channel(s) being used in an interference investigation. The secondary synthesizer 548R processes the tuning control words and sends a monitor tuning signal to the monitoring receiver 549. Once tuned, the monitoring receiver 549 is able to receive specialized signals transmitted by suspected interfering FDD devices. Upon receipt of the specialized signals, the monitoring receiver 549 forwards the signals to the local controller 550B for processing as described above with respect to FIG. 11A.

The effectiveness of the station assisted interference measurement system is improved by using specialized signals that are easily detectable by the candidate victim device as a specialized signal. In other words, it is beneficial for the specialized signals to be sufficiently different from typical data communication signals that the respective devices receive. A discussion of the specialized signals in a TDD implementation follows with reference to FIG. 8. For example, FIG. 12 shows that the duration interval of an example of a specialized signal that may be stretched to twice or three times as long as a conventional TDD transmit signal duration, such that regardless of phase offset or even different TDD timing or RX/TX percentages, the reception interval of the candidate victim receiver is substantially guaranteed to be filled for the entire reception duration. For example, the specialized signal TX signal duration is substantially three times as long as the waveform 1410 TX TDD interval. Thus, the reception interval in waveform 1430 is substantially guaranteed to have at least one full reception TDD interval to detect the specialized signal (shown in grey). The bottom-most waveform shows an alternate phasing. It is advantageous to avoid the partial RX receiver interval overlaps of FIG. 3B, such as 1180, in which case, the reception interval is not fully filled by the specialized signal 1470 TX duration. For example, partial overlaps would give a lower resultant RSSI, and would make it appear that the suspected interfering transmitters (e.g., MS 1372 and/or BTS 1361) in coverage area 1351 have greater path loss than they actually have, thus making it appear that they are not as much of an interference threat. In an example, it is advantageous to lengthen the specialized signal to cover more than one TDD timeslot interval to overcome synchronization issues and to ensure reception by the candidate victim receiver.

For example, referring back to FIG. 3A, a specialized waveform for BTS 1361 is not a real downlink data communication traffic signal, and the specialized waveform for MS 1372 is not a real uplink data communication traffic signal because the specialized waveforms do not carry data communication traffic. As a result, the specialized signal waveforms may be better tailored to match the victim receivers. For example, the specialized signal waveform may be configured such as specialized signal 1470 of FIG. 12. Thus, the downlink specialized waveform from BTS 1361 (that mimics IDL 1363) would be matched for the characteristics of MS DL receiver 1321. In other words, the power level, bandwidth, modulation, timing, OFDM carrier occupancy, or other characteristics of the specialized signal would be set to maximize the probability of interception by the candidate victim receiver and to maximize the received signal strength at the candidate victim receiver(s) in order that the measurement be a more accurate measurement of the actual path loss(es) between the suspected interfering device(s) and the candidate victim receiver(s). Similarly, an uplink specialized waveform from MS 1372 (that mimics IUL 1375) would be optimized in order to exhibit the characteristics of the BTS UL receiver 1311. This is relevant if, for example, the two coverage areas, such as coverage areas 1351 and 1301, are served by dissimilar systems, such as, for example, by an AP communicating via Wi-Fi compatible signaling and a BTS communicating via an LTE compatible signaling.

Returning to the discussion of FIG. 12, by choosing specific waveforms of the specialized signals for the respective receivers, the interference sampling may be more efficient. For example, an LTE specialized signal can be tailored to be a better match the format of a signal intended for a Wi-Fi receiver. For example, the LTE specialized signal waveform may be formatted according to a number of parameters, such as signal strength level settings, bit formatting settings, and the like that optimizes the probability of the reception of the LTE specialized signal by the Wi-Fi receiver.

Likewise, by choosing specific data stream formats, a Wi-Fi specialized transmission can be tailored to be a better match for an LTE receiver. By using IP protocols, the ASA controller 106 can inject these data streams as the specialized signal, thus overcoming or partially overcoming inherent transmitter to receiver mismatches between dissimilar systems (e.g., Waveform A: LTE DL transmitter to Wi-Fi receiver, Waveform B: LTE UL transmitter to Wi-Fi receiver, Waveform C: Wi-Fi transmitter to LTE UL receiver, and the like). These pre-supplied specialized signal waveforms (i.e., designed data streams) do not represent real data communication traffic, and are instead designed to fully fill the bandwidths, timeslots, resource blocks, or other characteristics, to optimize cross system measurements for timing, precision and accuracy. These pre-supplied waveforms that correspond to a specific dissimilar transmitter-to-receiver pair may be stored locally in the AP or BTS transmitter device's local memory, where the indicator (A, B, C . . . etc.) can be used by the ASA controller to select the appropriate waveform for trial transmission.

As mentioned above, the specialized signals may be transmitted into communication channels (e.g., frequencies and codings) that will not interfere with other nearby uses, or at times of day when data communication traffic is less likely. Also, the power level can be chosen by the ASA controller 106 to be substantially the same as a real data communication signal, or higher for a better resultant signal-to-noise (SNR) ratio at the victim receiver, or at a lower power for reduced interference to other nearby co-channel users, if present. By setting specific characteristics (e.g., set power level, bandwidth, modulation and the like) of the specialized signal, the specialized signal better matches the bandwidth of the candidate victim receiver which provides more accurate (i.e., more reflective of the actual signal path loss) and realistic signal measurements.

As mentioned above, the ASA controller 106 has the opportunity to employ custom designed specialized signal pulses, waveforms, timings, and the like because the ASAS 105 is not merely opportunistically using a real traffic waveform from coverage area 1351. For example, a specialized signal, such as a TX signal on a specific candidate communication channel, or more than one communication channel, may be transmitted in order to know the characteristics of the candidate communication channel (which is useful in a multiband system) from actual transmissions in the environment in which the channel will be used. In another example, a specialized signal may be transmitted on a specific communication channel (or series of communication channels) in order to know the characteristics of that specific communication channel or series of communication channels.

Another benefit realizable by the disclosed examples is that because a different communication channel or waveform type is used, the resultant signal strength measurement at the candidate victim receiver can be separated from other competing signals and noise. As mentioned above, using this information as well as the identifier of the suspecting interfering device, the candidate victim receiver, via the ASA controller 106, can actually identify which suspected interfering transmitter device from nearby coverage areas is in actuality the real interferer. Alternatively, the information (e.g., transmitting device identifier) is delivered to the ASA controller 106 from the victim receiver, which identifies the suspected interfering transmitter device.

Alternatively, where the candidate victim receiver cannot properly decode the dissimilar waveform to decode the transmitting device identifier, the exact time and the communication channel can be used by the ASA controller to deduce which device is the suspected transmitting device, and hence the location, distance, and path loss can be determined.

For example, as mentioned above, the ASA controller 106 may be configured to, in response to obtaining a station assisted interference monitoring report from a candidate victim receiver, process data in the obtained report. The ASA controller 106 may access a database (either locally or remote (such as a server 103 or database 115)) containing a listing for the respective candidate victim receiver that includes, for example, timing information related to when the respective candidate victim receiver was to be receiving specialized signals from suspected potentially interfering devices. The ASA controller 106 using the communication channel assigned to the candidate victim receiver and specialized signal transmission timing in the database may compare time stamp information included in the monitoring report to a listing of times at which each of an identified suspected interfering device was to transmit a unique specialized signal.

Other example implementations of station assisted interference measurements are also contemplated. For example, the system may be configured for simultaneously sampling (for performing interference detection) on a number of candidate victim devices using a pre-defined specialized signal for a specific communication channel and time. For example, a number of suspected interfering devices may transmit the pre-defined specialized signals that are received by a number of candidate victim devices. The transmitted specialized signals may be of different formats (e.g., Wi-Fi, LTE or the like), which provides a realistic scenario that more closely approximates the actual operating environment of each of the number of surrounding candidate victim devices. Alternatively or in addition to, instead of simultaneously sampling a number of candidate victim devices, a station assisted interference measurement scheme may be implemented that sequentially flashes (i.e., transmits a specialized signal) to a number of candidate victim devices. Of course, in an example, the candidate victim devices are at different locations, but may be in close proximity (e.g., adjacent coverage areas, within the same coverage areas, close to a suspected interfering device, or far away from a suspected interfering device). In another example, a station assisted interference measurement scheme may be implemented that sequentially flashes (i.e., transmits a specialized signal) on a number of different communication channels at different times (e.g., multiple time slots) or at the same time (e.g., at the same time slot).

The foregoing provides examples of a specialized signal waveform that may be used with the disclosed examples of system components. Of course, other specialized signals may be selected for use with the disclosed examples of system components. The above described system components may be implemented in and controlled by a number of different system component configurations. An example of a system component configuration will be described with reference to FIG. 13.

Figure 13:
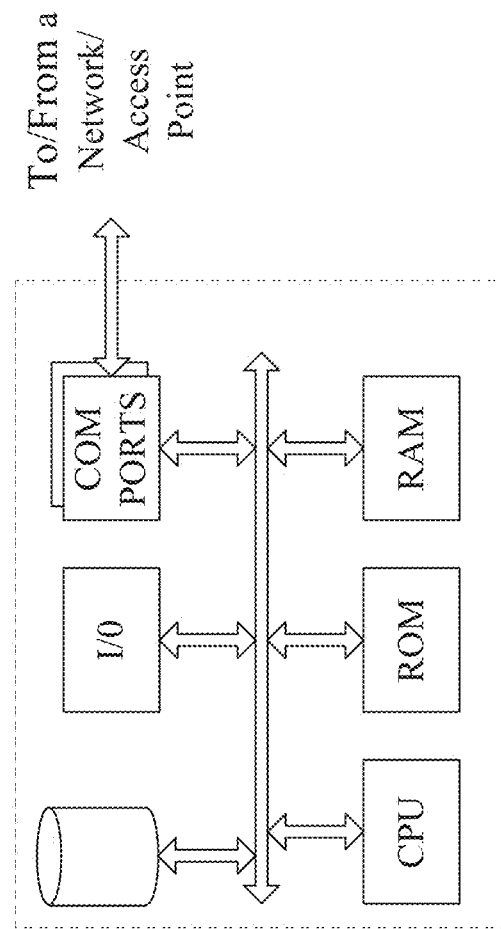
FIG. 13 is a simplified functional block diagram of a computer that may be configured, for example, to function as a local controller or ASA controller in, or coupled to, an access point and/or an end user device in the examples of station assisted interference measurement in an authorized shared access system of FIGS. 2A-12.

FIG. 13 is a simplified functional block diagram of a computer that may be configured, for example, to function as a local controller or other controller in, or coupled to, an access point and/or an end user device, or as an ASA controller, in the examples of an authorized shared access system of FIGS. 1-12.

A controller, for example a local controller or an ASA controller, includes a data communication interface for packet data communication. The controller also includes a central processing unit (CPU), in the form of one or more processors, for executing program instructions. The controller platform typically includes an internal communication bus, program storage and data storage for various data files to be processed and/or communicated by the controller, although the controller often receives programming and data via network communications. The hardware elements, operating systems and programming languages of such controllers are conventional in nature. Of course, the controller functions may be implemented in a distributed fashion on a number of similar platforms, to distribute the processing load.

Hence, aspects of the methods of a station assisted interference measurement system outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the authorized shared access system into the computer platform of an AP, a BTS, a MS and/or an EUD that will be the local controller or ASA controller. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the local controller, the ASA controller, or station assisted interference measurement processes, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    sending, by a device and to at least one suspected interfering device, a suspected interfering device control signal comprising:
        an indication of a specialized signal,
        first information indicating a communication channel, and
        second information indicating a time when the specialized signal is to be transmitted by the at least one suspected interfering device;

sending, by the device and to at least one candidate victim device in a shared radio frequency spectrum access system, a candidate victim device control signal including:
the indication of the specialized signal,
the first information indicating the communication channel, and
the second information indicating the time when the specialized signal is to be transmitted by the at least one suspected interfering device,
the specialized signal being different from normal communication channel traffic signals of the shared radio frequency spectrum access system; and
obtaining, by the device and from the at least one candidate victim device, a signal measurement value for a specialized signal transmission received by the at least one candidate victim device,
the signal measurement value being associated with a timestamp indicating when the at least one candidate victim device received the specialized signal transmission.

2. The method of claim 1, further comprising:
accessing a database containing an identity of the at least one suspected interfering device, the indication of the specialized signal, the first information indicating the communication channel, and the second information indicating the time when the specialized signal is to be transmitted to the at least one suspected interfering device; and
using the timestamp to determine the identity of the at least one suspected interfering device by comparing the timestamp to the time in which the specialized signal is to be transmitted to the at least one suspected interfering device.

3. The method of claim 1, further comprising:
access a database containing an identity of the at least one suspected interfering device, the indication of the specialized signal, the first information indicating the communication channel, and the second information indicating the time when the specialized signal is to be transmitted to the at least one suspected interfering device;
processing the signal measurement value for each specialized signal received by the at least one candidate victim device; and
determining, based on processing the signal measurement value, a single representative interference measurement metric for a coverage area associated with the at least one candidate victim device.

4. The method of claim 3, further comprising:
generating, based on determining the single representative interference measurement metric, at least one of an interference database or interference map for the at least one candidate victim device including an indication of over-the-air interference experienced by the at least one candidate victim device from the at least one suspected interfering device.

5. The method of claim 1, further comprising:
determining a first air interface of a receiver of the at least one candidate victim device;
determining a second air interface of a transmitter of the at least one suspected interfering device,
the first air interface and the second air interface being different;
pairing together the first air interface and the second air interface;
accessing a database containing a list of air interfaces pairings and an indication of a specialized signal having a waveform optimized for each of the air interface pairings in the list;
identifying a match of a pairing of the first air interface and the second air interface in the list of air interface pairings; and
retrieving the specialized signal indication from the list.

6. The method of claim 1, further comprising:
determining that an air interface of the at least one candidate victim device and an air interface of the at least one suspected interfering device are the same air interface.

7. The method of claim 6, further comprising:
including, based on determining that the air interface of the at least one candidate victim device and the air interface of the at least one suspected interfering device are the same air interface, a unique identifier of the at least one suspected interfering device in the specialized signal and the suspected interfering device control signal.

8. The method of claim 1, further comprising:
providing receiver setting parameters to the at least one candidate victim device based on the indication of the specialized signal,
the receiver setting parameters being used to modify receiver settings of a receiver of the at least one candidate victim device.

9. The method of claim 1, further comprising:
identifying, for the obtained signal measurement value, the at least one suspected interfering device;
determining a first air interface of the at least one suspected interfering device and a second air interface of the at least one candidate victim device;
accessing a table of calibration coefficients based on the first air interface and the second air interface being different,
the calibration coefficients in the table compensating for air interface differences in signal measurement values;
obtaining the calibration coefficients from the table based on determining the first air interface and the second air interface; and
applying the calibration coefficients from the table to the signal measurement value to correct a received signal strength and reflect path loss between the at least one suspected interfering device and the at least one candidate victim device.

10. A method, comprising:
obtaining, by a device and from a candidate victim device, a signal measurement value of each specialized signal transmission received by the candidate victim device from a plurality of suspected interfering devices,
the candidate victim device being located in a candidate victim device coverage area;
analyzing, by the device, the obtained signal measurement value and information related to timing of each specialized signal transmission by the plurality of suspected interfering devices;
determining, by the device and based on analyzing the obtained signal measurement value, an identity and a location of each of the plurality of suspected interfering devices;
determining, by the device and based on determining the identity and the location of each of the plurality of suspected interfering devices, distances to each of the plurality of suspected interfering devices from the candidate victim device; and calculating, by the device and based on the signal measurement value and the distances to each of the plurality of suspected interfering devices from the candidate victim device, a path loss value for a communication path between each of the plurality of suspected interfering devices and the candidate victim device.

11. The method of claim 10, wherein the signal measurement value is a received signal strength indication.

12. The method of claim 10, wherein the distances to each of the plurality of suspected interfering devices from the candidate victim device is based on a known location of the candidate victim device and a known location of each of the plurality of suspected interfering device.

13. The method of claim 10, wherein calculating the path loss value occurs prior to assignment of a traffic communication channel to the candidate victim device.

14. The method of claim 10, wherein a path loss value between a particular suspected interfering device of the plurality of suspected interfering devices and the candidate victim device is calculated based on at least one of:
 a known of location of the particular suspected interfering device,
 a known location of the candidate victim device,
 a transmitted signal strength by a transmitter of the particular suspected interfering device,
 a transmitter antenna gain of the particular suspected interfering device,
 a signal power loss attributable to transmitter component losses of the particular suspected interfering device,
 a candidate victim device receiver antenna gain,
 a signal power loss attributable to component losses of a candidate victim device receiver,
 a signaling protocol between the particular suspected interfering device and the candidate victim device,
 a mismatch effect of a difference in signaling protocol between the particular suspected interfering device and the candidate victim device,
  the mismatch effect being compensated for by application of calibration coefficients to a signal measurement value associated with the particular suspected interfering device, or
 an air interface between the particular suspected interfering device and the candidate victim device.

15. A method, comprising:
 receiving, by a candidate victim device, a candidate victim device control signal,
  the candidate victim device control signal including:
   an indication of a specialized signal,
   a first information indicating a communication channel, and
   a second information indicating a time when the specialized signal is to be transmitted by a suspected interfering device;
 determining, by the candidate victim device and based on the indication of the specialized signal, that the specialized signal is to be transmitted, at the time indicated in the second information, from the suspected inferring device,
  the suspected interfering device having a transmitter air interface different from a receiver air interface of the candidate victim device;
 obtaining, by the candidate victim device and based on determining that the specialized signal is to be transmitted, receiver setting parameters from a database;
 modifying, by the candidate victim device and prior to the time indicated in the second information, settings of a receiver of the candidate victim device according to setting parameters for desired reception of the specialized signal by the candidate victim device; and
 receiving, by the candidate victim device, a signal on the communication channel indicated in the first information at the time indicated in the second information.

16. The method of claim 15, wherein the indication of the specialized signal includes a data field indicating a transmitter type of the suspected interfering device.

17. The method of claim 15, wherein the indication of the specialized signal includes an identifier of a specialized signal waveform and duration of the specialized signal.

18. The method of claim 15, further comprising:
 sending a request for receiver setting parameters to a controller,
  the request including the indication of the specialized signal; and
 receiving, based on the request, the receiver setting parameters via a network connection outside a communication path of a receiver of the candidate victim device.

19. The method of claim 15, further comprising:
 analyzing records in the database to determine parameters of the indication of the specialized signal,
  the determined parameters including at least one of:
   an identifier of a specialized signal waveform,
   duration of the specialized signal, or
   a transmit signal strength of the specialized signal.

20. The method of claim 15, further comprising:
 performing a receiver setting adjustment based on at least one of:
  the indication of the specialized signal,
  the communication channel, or
  the time in which the specialized signal is to be transmitted by the suspected interfering device.

* * * * *